(12) United States Patent
Silverbrook et al.

(10) Patent No.: US 7,657,128 B2
(45) Date of Patent: Feb. 2, 2010

(54) OPTICAL FORCE SENSOR

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 725 days.

(21) Appl. No.: 11/495,822

(22) Filed: Jul. 31, 2006

(65) Prior Publication Data

US 2007/0014490 A1   Jan. 18, 2007

Related U.S. Application Data

(63) Continuation-in-part of application No. 11/155,556, filed on Jun. 20, 2005, now Pat. No. 7,590,311, which is a continuation of application No. 10/291,823, filed on Nov. 12, 2002, now Pat. No. 6,980,704, which is a continuation of application No. 09/575,174, filed on May 23, 2000, now Pat. No. 6,870,966.

(30) Foreign Application Priority Data

Aug. 19, 2005   (AU) ............................... 2005904511

(51) Int. Cl.
*G06K 9/22* (2006.01)
(52) U.S. Cl. ........................ 382/313; 382/312
(58) Field of Classification Search ......... 382/312–315; 345/179; 235/375; 358/473–474; 73/818; 178/18–20

See application file for complete search history.

(56) References Cited

U.S. PATENT DOCUMENTS

| 4,814,553 | A | 3/1989 | Joyce |
| 4,864,618 | A | 9/1989 | Wright et al. |
| 4,896,543 | A | 1/1990 | Gullman |

(Continued)

FOREIGN PATENT DOCUMENTS

DE   218458 A1   2/1985

(Continued)

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

*Primary Examiner*—Duy M Dang

(57) ABSTRACT

A force sensor particularly suited for use in an electronic stylus that senses the contact force on its nib for recording pen strokes and handwriting recognition. The sensor has a housing for a load bearing member for receiving an input force to be sensed and associated circuitry for converting the input force into an output signal indicative of the input force. The bearing member is movably mounted within the elongate body (up to 100 microns). The input force acting on the load bearing member is caused by contact on the nib. The load bearing member is biased against the direction of the input force.

The force sensor also has a light source and photo-detector for sensing levels of illumination from the light source. Associated circuitry converts a range of illumination levels sensed by the photo-detector into a range of output signals, so that the illumination level sensed by the photo-detector varies with movement of the load bearing member within the elongate body such that the output signal from the circuitry is indicative of the input force. Using an optical sensor avoids the need to use a delicate piezo-resistive sensor that requires careful tolerancing during production.

20 Claims, 53 Drawing Sheets

U.S. PATENT DOCUMENTS

| | | |
|---|---|---|
| 5,051,736 A | 9/1991 | Bennett et al. |
| 5,231,386 A | 7/1993 | Brandenburg et al. |
| 5,285,860 A | 2/1994 | Wirth |
| 5,290,972 A | 3/1994 | Someya et al. |
| 5,477,012 A | 12/1995 | Sekendur |
| 5,500,512 A | 3/1996 | Goldblatt |
| 5,541,622 A | 7/1996 | Engle et al. |
| 5,543,592 A | 8/1996 | Gaultier |
| 5,652,412 A | 7/1997 | Lazzouni et al. |
| 5,661,506 A | 8/1997 | Lazzouni et al. |
| 5,692,073 A | 11/1997 | Cass |
| 5,852,434 A | 12/1998 | Sekendur |
| 5,994,710 A | 11/1999 | Knee et al. |
| 6,076,734 A | 6/2000 | Dougherty et al. |
| 6,201,903 B1 | 3/2001 | Wolff et al. |
| 6,212,296 B1 | 4/2001 | Stork et al. |
| 6,279,395 B1 | 8/2001 | Insalaco et al. |
| 6,425,514 B1 | 7/2002 | Oui et al. |
| 7,523,672 B2 * | 4/2009 | Lapstun et al. ............ 73/818 |
| 7,567,241 B2 * | 7/2009 | King et al. ............ 345/179 |

FOREIGN PATENT DOCUMENTS

| | | |
|---|---|---|
| EP | 0285773 A | 10/1988 |
| EP | 1498703 A2 | 1/1998 |
| GB | 2306669 A | 5/1997 |
| JP | 10-333822 A | 12/1998 |
| WO | WO 99/18487 A2 | 4/1999 |
| WO | WO 99/23545 A | 5/1999 |
| WO | WO 99/50787 A1 | 10/1999 |

* cited by examiner

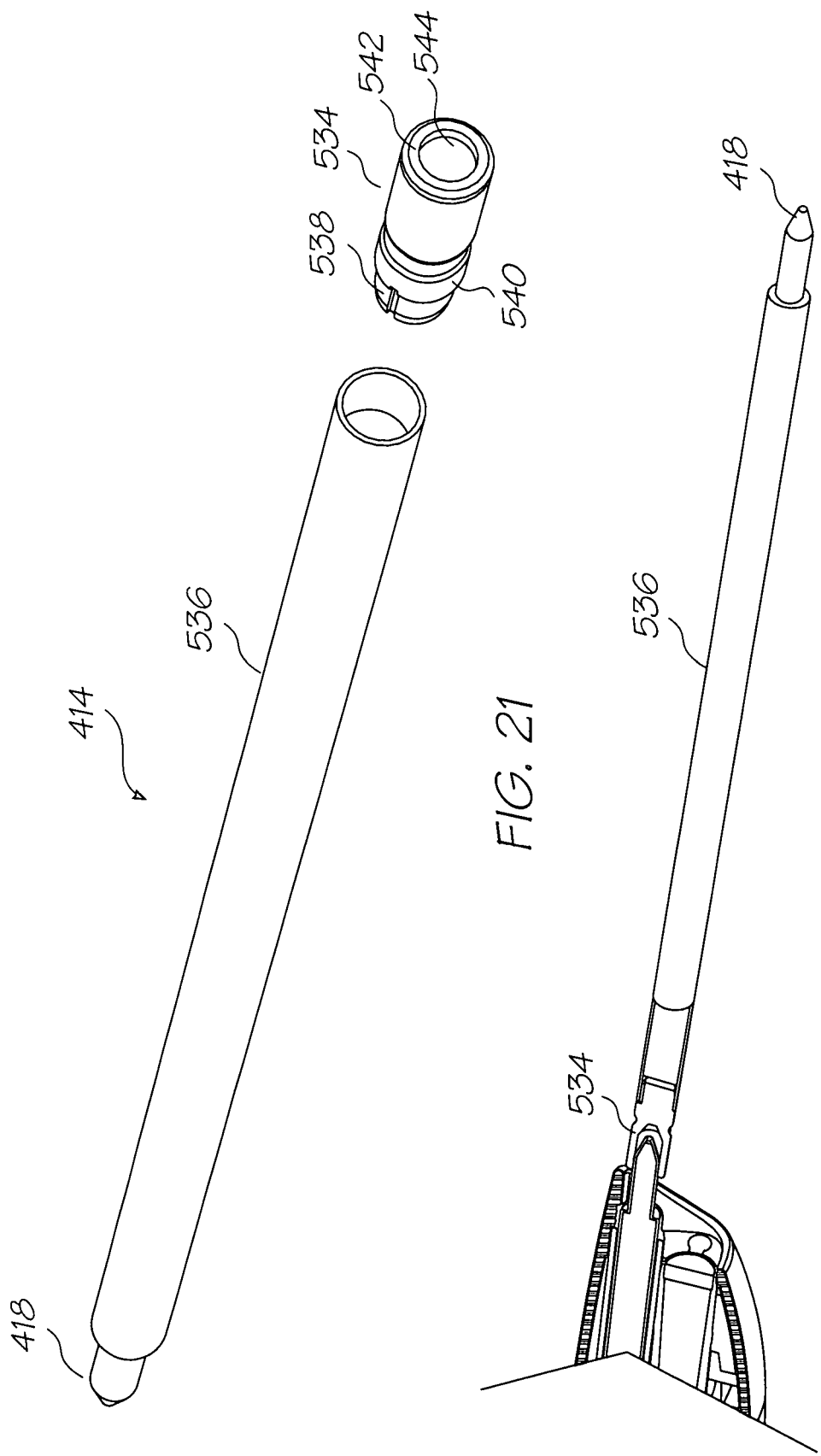

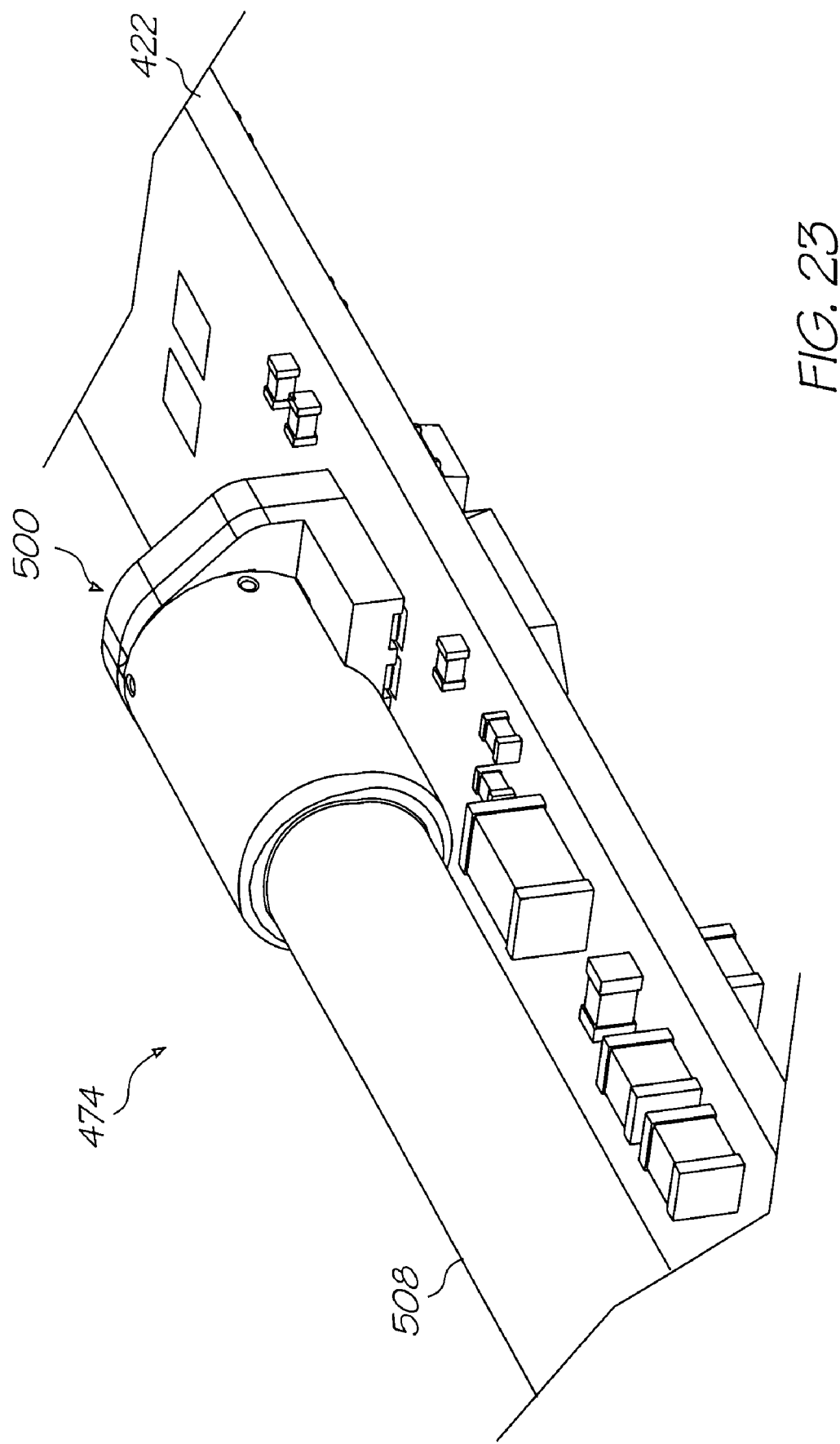

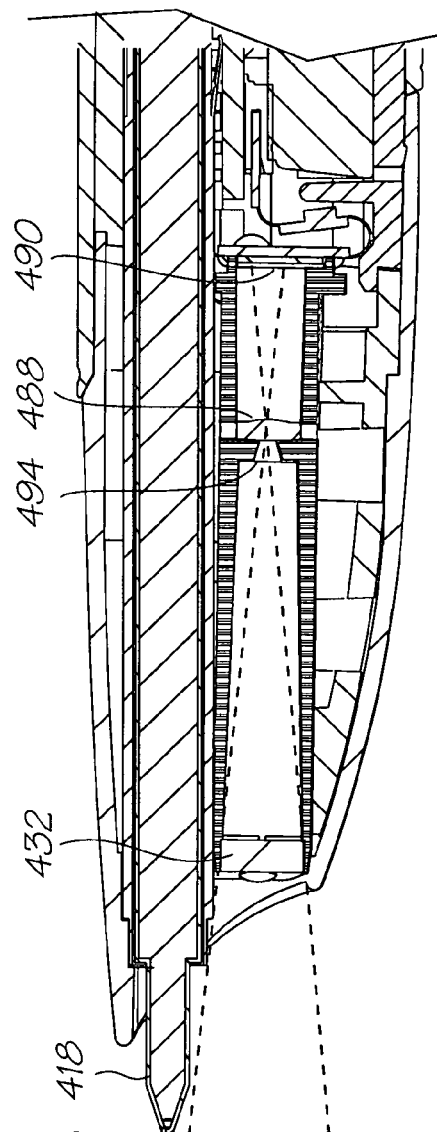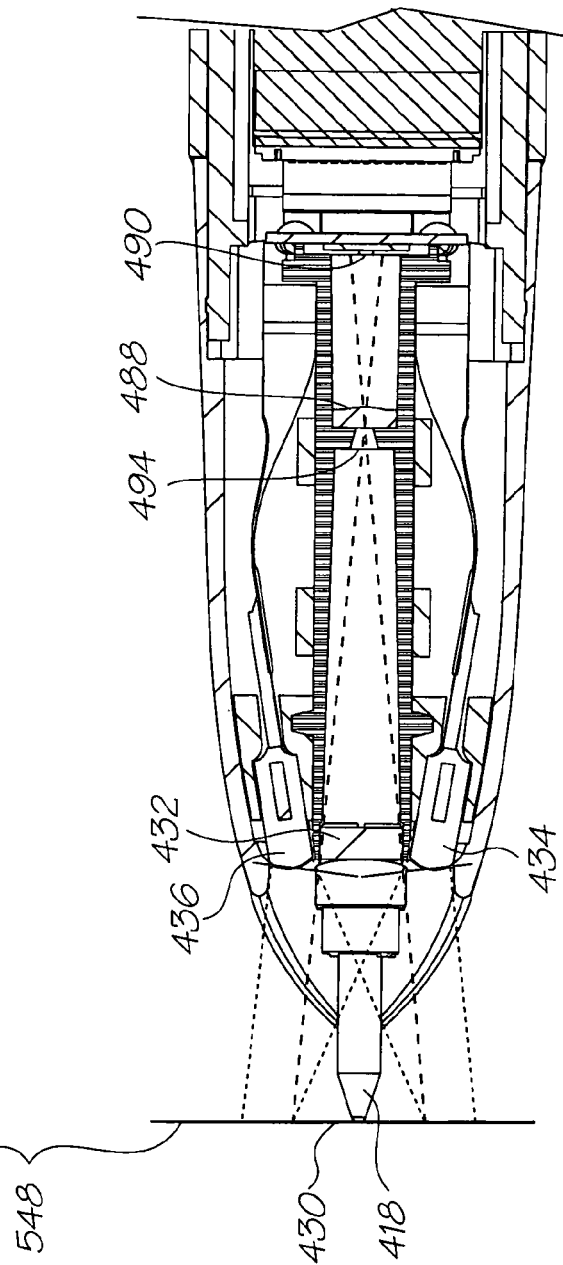

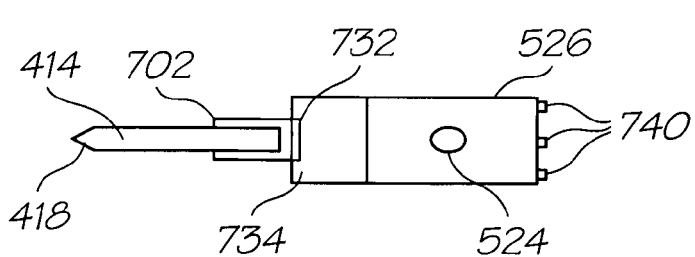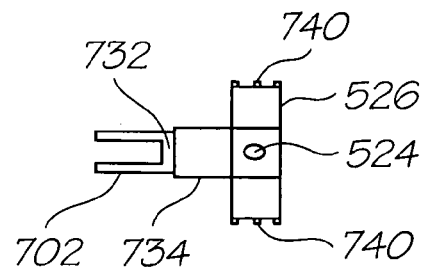
FIG. 37A  FIG. 38
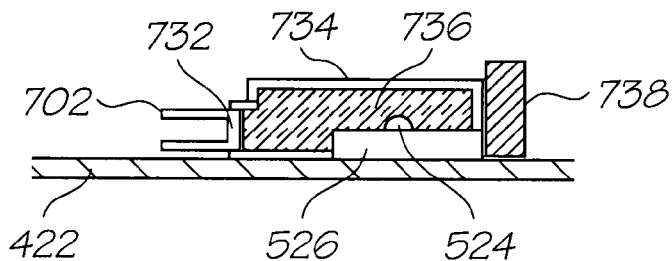
FIG. 37B
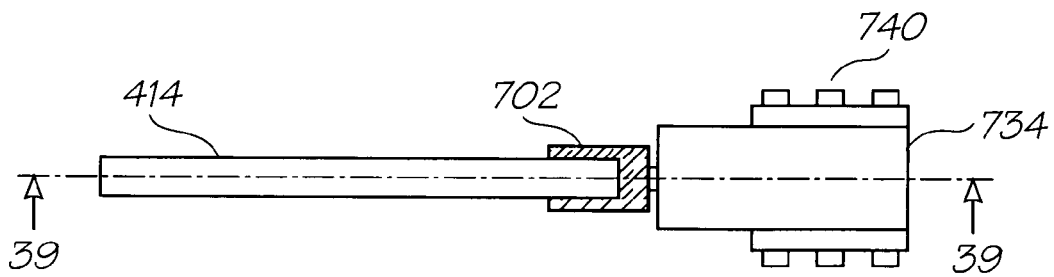
FIG. 39A
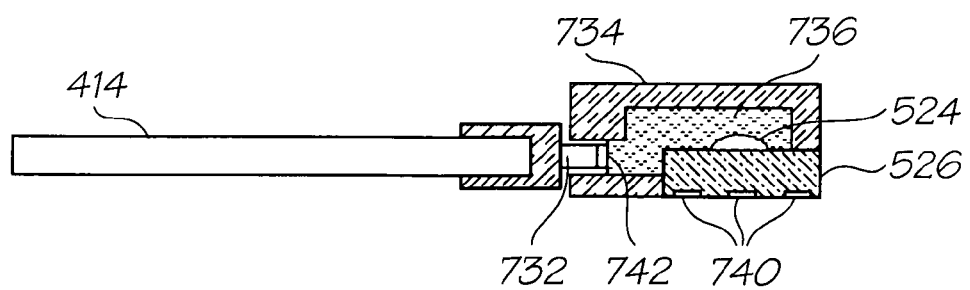
FIG. 39B

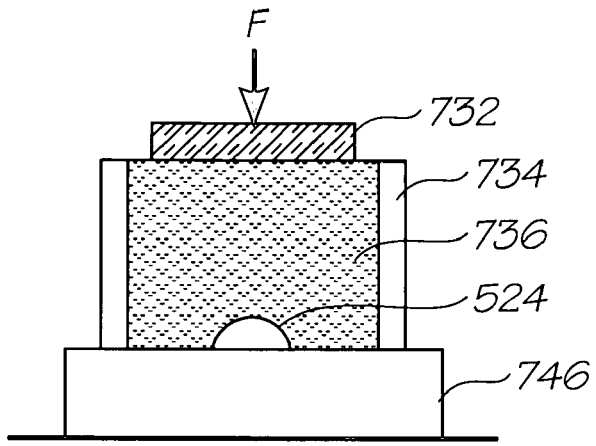
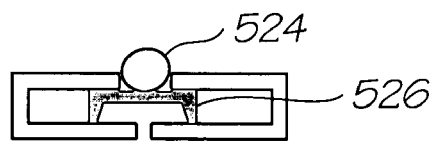
FIG. 40
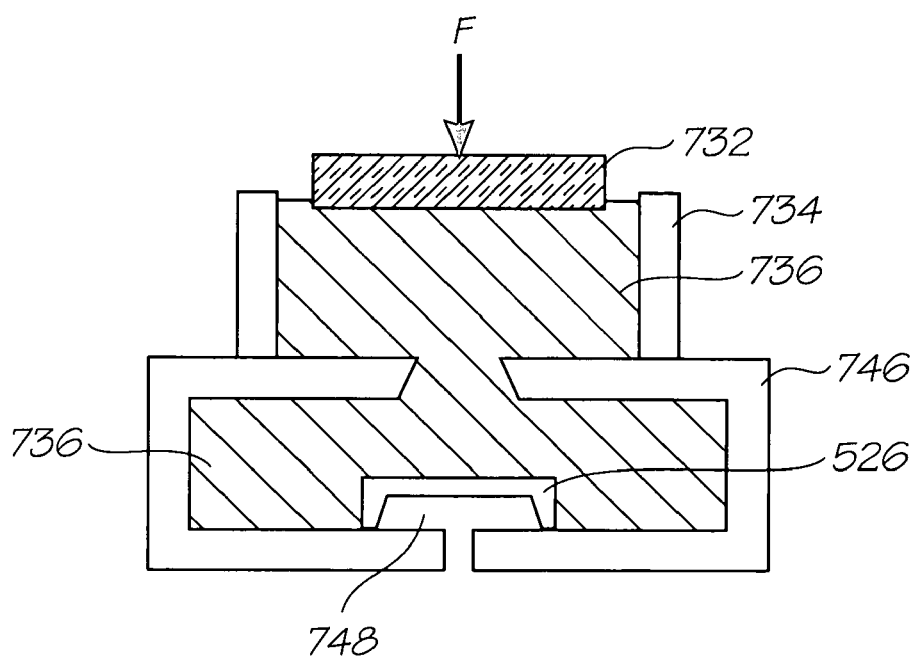
FIG. 41

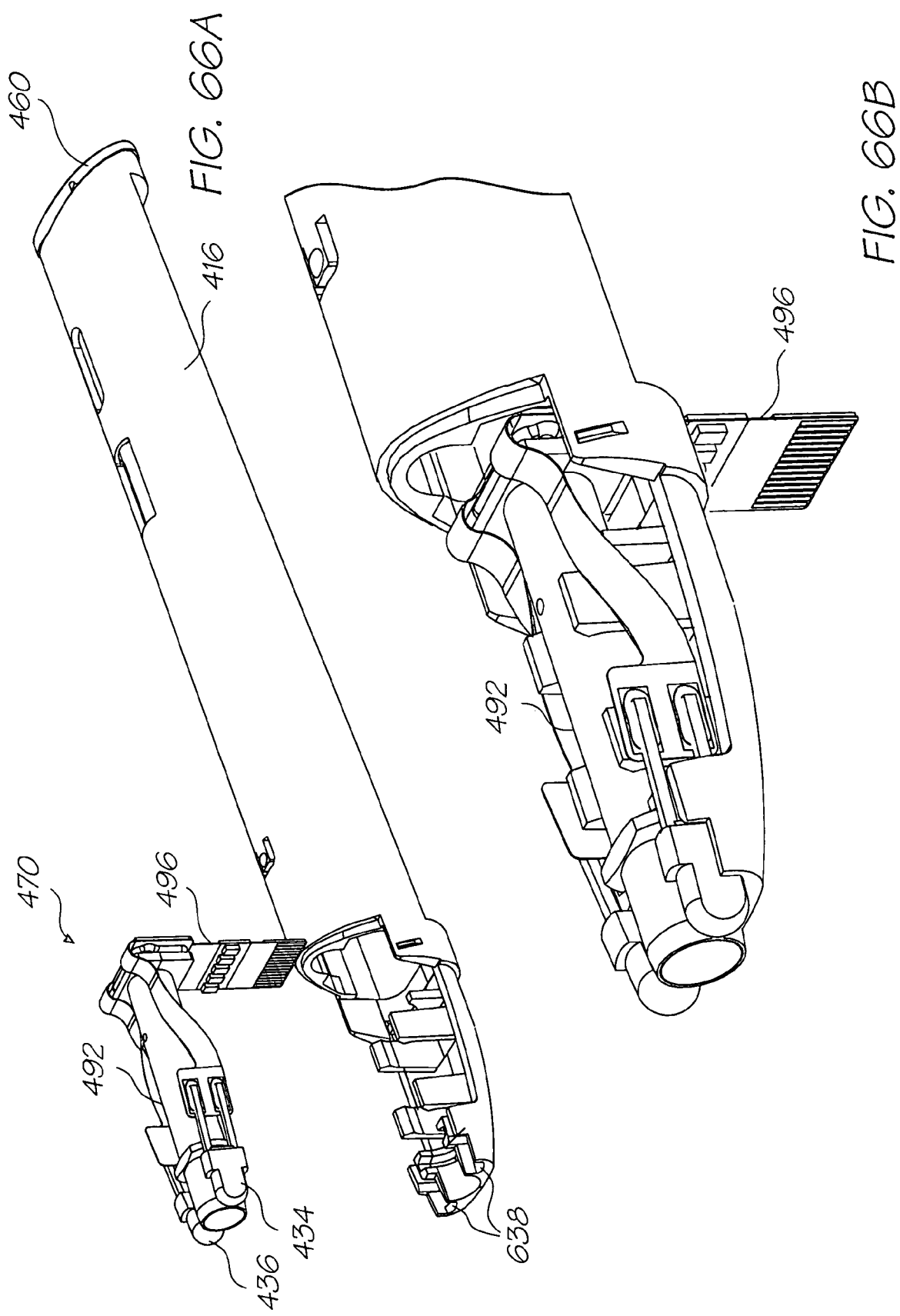

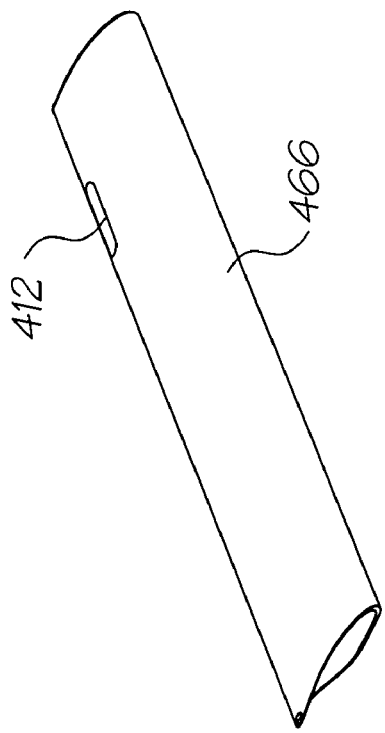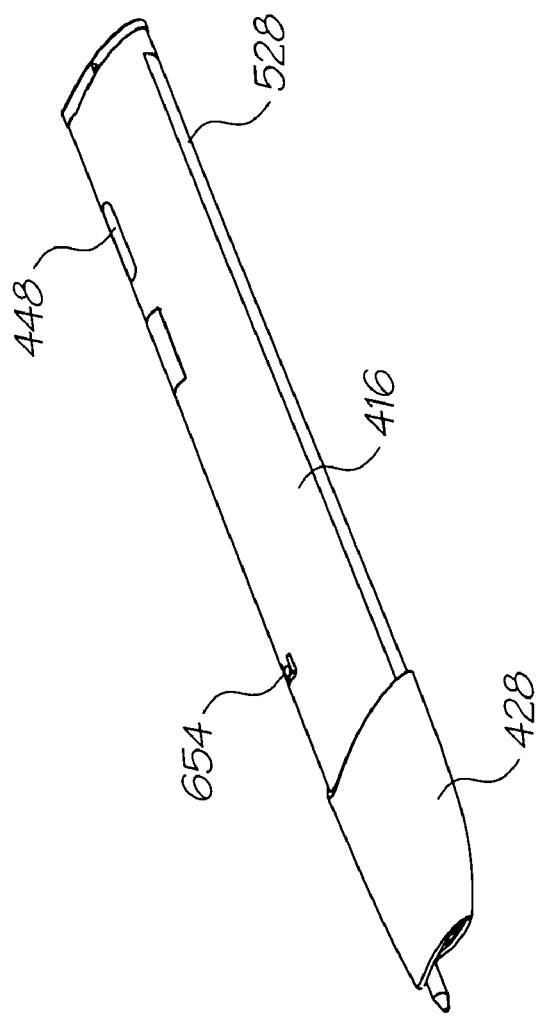
FIG. 73

OPTICAL FORCE SENSOR

CROSS REFERENCE TO RELATED APPLICATIONS

The present application is a Continuation-In-Part of U.S. application Ser. No. 11/155,556 filed Jun. 20, 2005, now issued as U.S. Pat. No. 7,590,311, which is a continuation of U.S. application Ser. No. 10/291,823 filed Nov. 12, 2002, now issued as U.S. Pat. No. 6,980,704, which is a continuation of U.S. application Ser. No. 09/575,174, filed on May 23, 2000, now issued as U.S. Pat. No. 6,870,966.

FIELD OF THE INVENTION

The present invention relates to the fields of interactive paper, printing systems, computer publishing, computer applications, human-computer interfaces using styli with force sensors and information appliances.

CO-PENDING APPLICATIONS

The following applications have been filed by the Applicant simultaneously with the present application:

| | | | | | |
|---|---|---|---|---|---|
| 11/495,814 | 11/495,823 | 7,523,672 | 11/495,820 | 11/495,818 | 11/495,819 |
| 7,581,812 | 11/495,816 | 11/495,817 | | | |

The disclosures of these co-pending applications are incorporated herein by reference. The above applications have been identified by their filing docket number, which will be substituted with the corresponding application number, once assigned.

CROSS REFERENCES

Various methods, systems and apparatus relating to the present invention are disclosed in the following U.S. patents/patent applications filed by the applicant or assignee of the present invention:

| | | | | | | |
|---|---|---|---|---|---|---|
| 09/517,539 | 6,566,858 | 6,331,946 | 6,246,970 | 6,442,525 | 09/517,384 | 09/505,951 |
| 6,374,354 | 09/517,608 | 09/505,147 | 6,757,832 | 6,334,190 | 6,745,331 | 09/517,541 |
| 10/203,559 | 10/203,560 | 10/203,564 | 10/636,263 | 10/636,283 | 10/866,608 | 10/902,889 |
| 10/902,833 | 10/940,653 | 10/942,858 | 10/727,181 | 10/727,162 | 10/727,163 | 10/727,245 |
| 10/727,204 | 10/727,233 | 10/727,280 | 10/727,157 | 10/727,178 | 10/727,210 | 10/727,257 |
| 10/727,238 | 10/727,251 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 | 10/727,227 |
| 10/727,160 | 10/934,720 | 11/212,702 | 11/272,491 | 11/474,278 | 10/296,522 | 6,795,215 |
| 10/296,535 | 09/575,109 | 10/296,525 | 09/575,110 | 09/607,985 | 6,398,332 | 6,394,573 |
| 6,622,923 | 6,747,760 | 10/189,459 | 10/884,881 | 10/943,941 | 10/949,294 | 11/039,866 |
| 11/123,011 | 11/123,010 | 11/144,769 | 11/148,237 | 11/248,435 | 11/248,426 | 11/478,599 |
| 10/922,846 | 10/922,845 | 10/854,521 | 10/854,522 | 10/854,488 | 10/854,487 | 10/854,503 |
| 10/854,504 | 10/854,509 | 10/854,510 | 10/854,496 | 10/854,497 | 10/854,495 | 10/854,498 |
| 10/854,511 | 10/854,512 | 10/854,525 | 10/854,526 | 10/854,516 | 10/854,508 | 10/854,507 |
| 10/854,515 | 10/854,506 | 10/854,505 | 10/854,493 | 10/854,494 | 10/854,489 | 10/854,490 |
| 10/854,492 | 10/854,491 | 10/854,528 | 10/854,523 | 10/854,527 | 10/854,524 | 10/854,520 |
| 10/854,514 | 10/854,519 | 10/854,513 | 10/854,499 | 10/854,501 | 10/854,500 | 10/854,502 |
| 10/854,518 | 10/854,517 | 10/934,628 | 11/212,823 | 10/728,804 | 10/728,952 | 10/728,806 |
| 10/728,834 | 10/728,790 | 10/728,884 | 10/728,970 | 10/728,784 | 10/728,783 | 10/728,925 |
| 10/728,842 | 10/728,803 | 10/728,780 | 10/728,779 | 10/773,189 | 10/773,204 | 10/773,198 |
| 10/773,199 | 10/773,190 | 10/773,201 | 10/773,191 | 10/773,183 | 10/773,195 | 10/773,196 |
| 10/773,186 | 10/773,200 | 10/773,185 | 10/773,192 | 10/773,197 | 10/773,203 | 10/773,187 |
| 10/773,202 | 10/773,188 | 10/773,194 | 10/773,193 | 10/773,184 | 11/008,118 | 11/060,751 |
| 11/060,805 | 11/188,017 | 11/298,773 | 11/298,774 | 11/329,157 | 6,623,101 | 6,406,129 |
| 6,505,916 | 6,457,809 | 6,550,895 | 6,457,812 | 10/296,434 | 6,428,133 | 6,746,105 |
| 10/407,212 | 10/407,207 | 10/683,064 | 10/683,041 | 6,750,901 | 6,476,863 | 6,788,336 |
| 11/097,308 | 11/097,309 | 11/097,335 | 11/097,299 | 11/097,310 | 11/097,213 | 11/210,687 |
| 11/097,212 | 11/212,637 | 11/482,953 | 11/482,977 | 11/246,687 | 11/246,718 | 11/246,685 |
| 11/246,686 | 11/246,703 | 11/246,691 | 11/246,711 | 11/246,690 | 11/246,712 | 11/246,717 |
| 11/246,709 | 11/246,700 | 11/246,701 | 11/246,702 | 11/246,668 | 11/246,697 | 11/246,698 |
| 11/246,699 | 11/246,675 | 11/246,674 | 11/246,667 | 11/246,684 | 11/246,672 | 11/246,673 |
| 11/246,683 | 11/246,682 | 10/760,272 | 10/760,273 | 10/760,187 | 10/760,182 | 10/760,188 |
| 10/760,218 | 10/760,217 | 10/760,216 | 10/760,233 | 10/760,246 | 10/760,212 | 10/760,243 |
| 10/760,201 | 10/760,185 | 10/760,253 | 10/760,255 | 10/760,209 | 10/760,208 | 10/760,194 |
| 10/760,238 | 7,077,505 | 10/760,235 | 7,077,504 | 10/760,189 | 10/760,262 | 10/760,232 |
| 10/760,231 | 10/760,200 | 10/760,190 | 10/760,191 | 10/760,227 | 10/760,207 | 10/760,181 |
| 11/446,227 | 11/454,904 | 11/472,345 | 11/474,273 | 7,261,401 | 11/474,279 | 7,438,388 |
| 7,328,972 | 11/003,786 | 11/003,616 | 11/003,418 | 11/003,334 | 11/003,600 | 11/003,404 |
| 11/003,419 | 11/003,700 | 11/003,601 | 11/003,618 | 11/003,615 | 11/003,337 | 11/003,698 |
| 11/003,420 | 6,984,017 | 11/003,699 | 11/071,473 | 11/003,463 | 11/003,701 | 11/003,683 |

-continued

| | | | | | | |
|---|---|---|---|---|---|---|
| 11/003,614 | 11/003,702 | 11/003,684 | 11/003,619 | 11/003,617 | 11/293,800 | 11/293,802 |
| 11/293,801 | 11/293,808 | 11/293,809 | 11/482,975 | 11/482,970 | 11/482,968 | 11/482,972 |
| 11/482,971 | 11/482,972 | 11/246,676 | 11/246,677 | 11/246,678 | 11/246,679 | 11/246,680 |
| 11/246,681 | 11/246,714 | 11/246,713 | 11/246,689 | 11/246,671 | 11/246,670 | 11/246,669 |
| 11/246,704 | 11/246,710 | 11/246,688 | 11/246,716 | 11/246,715 | 11/246,707 | 11/246,706 |
| 11/246,705 | 11/246,708 | 11/246,693 | 11/246,692 | 11/246,696 | 11/246,695 | 11/246,694 |
| 7,530,663 | 7,467,846 | 11/482,962 | 11/482,963 | 11/482,956 | 11/482,954 | 11/482,974 |
| 7,604,334 | 11/482,987 | 11/482,959 | 11/482,960 | 11/482,961 | 11/482,964 | 11/482,965 |
| 7,510,261 | 11/482,973 | 11/482,980 | 11/482,967 | 11/482,966 | 11/482,988 | 11/482,989 |
| 11/293,832 | 11/293,838 | 11/293,825 | 11/293,841 | 11/293,799 | 11/293,796 | 11/293,797 |
| 11/293,798 | 11/293,804 | 11/293,840 | 11/293,803 | 11/293,833 | 11/293,834 | 11/293,835 |
| 11/293,836 | 11/293,837 | 11/293,792 | 11/293,794 | 11/293,839 | 11/293,826 | 11/293,829 |
| 11/293,830 | 11/293,827 | 11/293,828 | 11/293,795 | 11/293,823 | 11/293,824 | 11/293,831 |
| 11/293,815 | 11/293,819 | 11/293,818 | 11/293,817 | 11/293,816 | 11/482,978 | 10/760,254 |
| 10/760,210 | 10/760,202 | 10/760,197 | 10/760,198 | 10/760,249 | 10/760,263 | 10/760,196 |
| 10/760,247 | 10/760,223 | 10/760,264 | 10/760,244 | 10/760,222 | 10/760,248 | |
| 10/760,236 | 10/760,192 | 10/760,203 | 10/760,204 | 10/760,205 | 10/760,206 | 10/760,267 |
| 10/760,270 | 10/760,259 | 10/760,271 | 10/760,275 | 10/760,274 | 10/760,268 | 10/760,184 |
| 10/760,195 | 10/760,186 | 10/760,261 | 10/760,258 | 11/442,178 | 11/474,272 | 11/474,315 |
| 11/014,764 | 11/014,763 | 11/014,748 | 11/014,747 | 11/014,761 | 11/014,760 | 11/014,757 |
| 11/014,714 | 11/014,713 | 11/014,762 | 11/014,724 | 11/014,723 | 11/014,756 | 11/014,736 |
| 11/014,759 | 11/014,758 | 11/014,725 | 11/014,739 | 11/014,738 | 11/014,737 | 11/014,726 |
| 11/014,745 | 11/014,712 | 11/014,715 | 11/014,751 | 11/014,735 | 11/014,734 | 11/014,719 |
| 11/014,750 | 11/014,749 | 11/014,746 | 11/014,769 | 11/014,729 | 11/014,743 | 11/014,733 |
| 11/014,754 | 11/014,755 | 11/014,765 | 11/014,766 | 11/014,740 | 11/014,720 | 11/014,753 |
| 11/014,752 | 11/014,744 | 11/014,741 | 11/014,768 | 11/014,767 | 11/014,718 | 11/014,717 |
| 11/014,716 | 11/014,732 | 11/014,742 | 11/097,268 | 11/097,185 | 11/097,184 | 11/293,820 |
| 11/293,813 | 11/293,822 | 11/293,812 | 11/293,821 | 11/293,814 | 11/293,793 | 11/293,842 |
| 11/293,811 | 11/293,807 | 11/293,806 | 11/293,805 | 11/293,810 | 10/815,621 | 10/815,612 |
| 10/815,630 | 10/815,637 | 10/815,638 | 10/815,640 | 10/815,642 | 10/815,643 | 10/815,644 |
| 10/815,618 | 10/815,639 | 10/815,635 | 10/815,647 | 10/815,634 | 10/815,632 | 10/815,631 |
| 10/815,648 | 10/815,641 | 10/815,645 | 10/815,646 | 10/815,617 | 10/815,620 | 10/815,615 |
| 10/815,613 | 10/815,633 | 10/815,619 | 10/815,616 | 10/815,614 | 60/702,191 | 11/488,162 |
| 11/488,163 | 11/488,164 | 11/488,167 | 11/488,168 | 11/488,165 | 11/488,166 | 10/815,636 |
| 10/815,649 | 11/041,650 | 11/041,651 | 11/041,652 | 11/041,649 | 11/041,610 | 11/041,609 |
| 11/041,626 | 11/041,627 | 11/041,624 | 11/041,625 | 11/041,556 | 11/041,580 | 11/041,723 |
| 11/041,698 | 11/041,648 | 10/815,609 | 10/815,627 | 10/815,626 | 10/815,610 | 10/815,611 |
| 10/815,623 | 7,070,110 | 10/815,629 | 7,469,836 | 10/815,625 | 10/815,624 | 10/815,628 |
| 10/913,375 | 10/913,373 | 10/913,374 | 10/913,372 | 10/913,377 | 10/913,378 | 10/913,380 |
| 10/913,379 | 10/913,376 | 10/913,381 | 10/986,402 | 11/172,816 | 11/172,815 | 11/172,814 |
| 11/482,990 | 11/482,986 | 11/482,985 | 10/409,876 | 10/409,848 | 10/409,845 | 11/084,796 |
| 11/084,742 | 11/084,806 | 09/575,197 | 7,079,712 | 09/575,123 | 6,825,945 | 09/575,165 |
| 6,813,039 | 09/693,415 | 6,987,506 | 6,824,044 | 09/608,970 | 7,038,797 | 6,980,318 |
| 6,816,274 | 09/575,139 | 09/575,186 | 6,681,045 | 6,678,499 | 6,679,420 | 6,963,845 |
| 6,976,220 | 6,728,000 | 09/693,219 | 09/575,145 | 6,976,035 | 6,813,558 | 6,766,942 |
| 6,965,454 | 6,995,859 | 09/575,192 | 09/663,640 | 09/609,303 | 6,922,779 | 6,978,019 |
| 6,847,883 | 09/693,647 | 09/721,895 | 09/607,843 | 09/693,690 | 6,959,298 | 6,973,450 |
| 09/609,553 | 6,965,882 | 09/608,022 | 09/575,181 | 09/722,174 | 09/721,896 | 10/291,522 |
| 6,718,061 | 10/291,523 | 10/291,471 | 7,012,710 | 6,825,956 | 10/291,481 | 10/291,509 |
| 10/291,825 | 10/291,519 | 7,031,010 | 6,972,864 | 6,862,105 | 7,009,738 | 6,989,911 |
| 6,982,807 | 10/291,576 | 6,829,387 | 6,714,678 | 6,644,545 | 6,609,653 | 6,651,879 |
| 10/291,555 | 10/291,510 | 10/291,592 | 10/291,542 | 7,044,363 | 7,004,390 | 6,867,880 |
| 7,034,953 | 6,987,581 | 10/291,556 | 10/291,821 | 10/291,525 | 10/291,586 | 10/291,822 |
| 10/291,524 | 10/291,553 | 6,850,931 | 6,865,570 | 6,847,961 | 10/685,523 | 10/685,583 |
| 10/685,455 | 10/685,584 | 10/757,600 | 10/804,034 | 10/793,933 | 6,889,896 | 10/831,232 |
| 10/884,882 | 6,996,274 | 10/943,938 | 10/943,874 | 10/943,872 | 10/944,044 | 10/943,942 |
| 10/944,043 | 10/949,293 | 10/943,877 | 6,986,459 | 10/954,170 | 10/981,773 | 10/981,626 |
| 10/981,616 | 10/981,627 | 10/974,730 | 10/986,337 | 10/992,713 | 11/006,536 | 11/020,256 |
| 11/020,106 | 11/020,260 | 11/020,321 | 11/020,319 | 11/026,045 | 11/059,696 | 11/051,032 |
| 11/059,674 | 11/107,944 | 11/107,941 | 11/082,940 | 11/082,815 | 11/082,827 | 11/082,829 |
| 6,991,153 | 6,991,154 | 11/124,256 | 11/123,136 | 11/154,676 | 11/159,196 | 11/182,002 |
| 11/202,251 | 11/202,252 | 11/202,253 | 11/203,200 | 11/202,218 | 11/206,778 | 11/203,424 |
| 11/222,977 | 11/228,450 | 11/227,239 | 11/286,334 | 11/298,632 | 11/349,143 | 11/442,428 |
| 11/442,385 | | 7,271,931 | 7,068,382 | 7,007,851 | 6,957,921 | 6,457,883 |
| 10/743,671 | 7,044,381 | 11/203,205 | 09/928,055 | 09/927,684 | 09/928,108 | 7,038,066 |
| 09/927,809 | 7,062,651 | 6,789,194 | 6,789,191 | 10/900,129 | 10/900,127 | 10/913,328 |
| 10/913,350 | 10/982,975 | 10/983,029 | 11/331,109 | 6,644,642 | 6,502,614 | 6,622,999 |
| 6,669,385 | 6,827,116 | 7,011,128 | 10/949,307 | 6,549,935 | 6,987,573 | 6,727,996 |
| 6,591,884 | 6,439,706 | 6,760,119 | 09/575,198 | 7,064,851 | 6,826,547 | 6,290,349 |
| 6,428,155 | 6,785,016 | 6,831,682 | 6,741,871 | 6,927,871 | 6,980,306 | 6,965,439 |
| 6,840,606 | 7,036,918 | 6,977,746 | 6,970,264 | 7,068,389 | 10/659,027 | 10/659,026 |
| 10/884,885 | 10/884,883 | 10/901,154 | 10/932,044 | 10/962,412 | 10/962,510 | 10/962,552 |
| 10/965,733 | 10/965,933 | 10/974,742 | 10/982,974 | 10/983,018 | 10/986,375 | 11/107,817 |
| 11/148,238 | 11/149,160 | 11/250,465 | 11/327,491 | 6,982,798 | 6,870,966 | 6,822,639 |
| 6,474,888 | 6,627,870 | 6,724,374 | 6,788,982 | 09/722,141 | 6,788,293 | 6,946,672 |
| 6,737,591 | 09/722,172 | 09/693,514 | 6,792,165 | 09/722,088 | 6,795,593 | 6,980,704 |
| 6,768,821 | 10/291,366 | 7,041,916 | 6,797,895 | 7,015,901 | 10/782,894 | 10/782,895 |
| 10/778,056 | 10/778,058 | 10/778,060 | 10/778,059 | 10/778,063 | 10/778,062 | 10/778,061 |
| 10/778,057 | 10/846,895 | 10/917,468 | 10/917,467 | 10/917,466 | 10/917,465 | 10/917,356 |

-continued

| | | | | | | |
|---|---|---|---|---|---|---|
| 10/948,169 | 10/948,253 | 10/948,157 | 10/917,436 | 10/943,856 | 10/919,379 | 7,019,319 |
| 10/943,878 | 10/943,849 | 7,043,096 | 11/071,267 | 11/144,840 | 11/155,556 | 11/155,557 |
| 11/193,481 | 11/193,435 | 11/193,482 | 11/193,479 | 11/255,941 | 11/281,671 | 11/298,474 |
| 7,055,739 | 09/575,129 | 6,830,196 | 6,832,717 | 09/721,862 | 10/473,747 | 10/120,441 |
| 6,843,420 | 10/291,718 | 6,789,731 | 7,057,608 | 6,766,944 | 6,766,945 | 10/291,715 |
| 10/291,559 | 10/291,660 | 10/531,734 | 10/409,864 | 10/309,358 | 10/537,159 | 10/410,484 |
| 7,077,333 | 6,983,878 | 10/786,631 | 10/853,782 | 10/893,372 | 6,929,186 | 6,994,264 |
| 7,017,826 | 7,014,123 | 10/971,051 | 10/971,145 | 10/971,146 | 7,017,823 | 7,025,276 |
| 10/990,459 | 11/059,684 | 11/074,802 | 7,334,739 | 10/492,169 | 10/492,152 | 10/492,168 |
| 10/492,161 | 10/492,154 | 10/502,575 | 10/531,229 | 10/683,151 | 10/531,733 | 10/683,040 |
| 10/510,391 | 10/510,392 | 10/919,261 | 10/778,090 | 6,957,768 | 09/575,162 | 09/575,172 |
| 09/575,170 | 09/575,171 | 09/575,161 | 6,982,701 | 6,982,703 | 10/291,538 | 6,786,397 |
| 6,947,027 | 6,975,299 | 10/291,714 | 7,048,178 | 10/291,541 | 6,839,053 | 7,015,900 |
| 7,010,147 | 10/291,713 | 6,914,593 | 10/291,546 | 6,938,826 | 10/913,340 | 10/940,668 |
| 6,992,662 | 11/039,897 | 11/074,800 | 11/074,782 | 11/074,777 | 11/075,917 | 11/102,698 |
| 11/102,843 | 11/202,112 | 11/442,114 | 6,454,482 | 6,808,330 | 6,527,365 | 6,474,773 |
| 6,550,997 | 10/181,496 | 6,957,923 | 10/309,185 | 10/949,288 | 10/962,400 | 10/969,121 |
| 11/185,722 | 11/181,754 | 11/203,180 | 11/124,158 | 11/124,196 | 11/124,199 | 11/124,162 |
| 11/124,202 | 11/124,197 | 11/124,154 | 11/124,198 | 11/124,153 | 11/124,151 | 11/124,160 |
| 11/124,192 | 11/124,175 | 11/124,163 | 11/124,149 | 11/124,152 | 11/124,173 | 11/124,155 |
| 11/124,157 | 11/124,174 | 11/124,194 | 11/124,164 | 11/124,200 | 11/124,195 | 11/124,166 |
| 11/124,150 | 11/124,172 | 11/124,165 | 11/124,186 | 11/124,185 | 11/124,184 | 11/124,182 |
| 11/124,201 | 11/124,171 | 11/124,181 | 11/124,161 | 11/124,156 | 11/124,191 | 11/124,159 |
| 11/124,175 | 11/124,188 | 11/124,170 | 11/124,187 | 11/124,189 | 11/124,190 | 11/124,180 |
| 11/124,193 | 11/124,183 | 11/124,178 | 11/124,177 | 11/124,148 | 11/124,168 | 11/124,167 |
| 11/124,179 | 11/124,169 | 11/187,976 | 11/188,011 | 11/188,014 | 7,530,446 | 11/228,540 |
| 11/228,500 | 11/228,501 | 11/228,530 | 11/228,490 | 11/228,531 | 11/228,504 | 11/228,533 |
| 11/228,502 | 11/228,507 | 11/228,482 | 11/228,505 | 11/228,497 | 11/228,487 | 11/228,529 |
| 11/228,484 | 11/228,489 | 11/228,518 | 11/228,536 | 11/228,496 | 11/228,488 | 11/228,506 |
| 11/228,516 | 11/228,526 | 11/228,539 | 11/228,538 | 11/228,524 | 11/228,523 | 11/228,519 |
| 11/228,528 | 11/228,527 | 11/228,525 | 11/228,520 | 11/228,498 | 11/228,511 | 11/228,522 |
| 11/228,515 | 11/228,537 | 11/228,534 | 11/228,491 | 11/228,499 | 11/228,509 | 11/228,492 |
| 11/228,493 | 11/228,510 | 11/228,508 | 11/228,512 | 11/228,514 | 11/228,494 | 11/228,495 |
| 11/228,486 | 11/228,481 | 11/228,477 | 11/228,485 | 11/228,483 | 11/228,521 | 11/228,517 |
| 11/228,532 | 11/228,513 | 11/228,503 | 11/228,480 | 11/228,535 | 11/228,478 | 11/228,479 |
| 6,238,115 | 6,386,535 | 6,398,344 | 6,612,240 | 6,752,549 | 6,805,049 | 6,971,313 |
| 6,899,480 | 6,860,664 | 6,925,935 | 6,966,636 | 7,024,995 | 10/636,245 | 6,926,455 |
| 7,056,038 | 6,869,172 | 7,021,843 | 6,988,845 | 6,964,533 | 6,981,809 | 11/060,804 |
| 11/065,146 | 11/155,544 | 11/203,241 | 11/206,805 | 11/281,421 | 11/281,422 | 11/482,981 |
| 7,571,906 | 11/482,982 | 11/482,983 | 11/482,984 | | | |

The disclosures of these applications and patents are incorporated herein by reference. Some of the above applications have been identified by their filing docket number, which will be substituted with the corresponding application number, once assigned.

BACKGROUND OF THE INVENTION

The Netpage system involves the interaction between a user and a computer network (or stand alone computer) via a pen and paper based interface. The 'pen' is an electronic stylus with a marking or non-marking nib and an optical sensor for reading a pattern of coded data on the paper (or other surface).

The Netpage pen is an electronic stylus with force sensing, optical sensing and Bluetooth communication assemblies. A significant number of electronic components need to be housed within the pen casing together with a battery large enough to provide a useful battery life. Despite this, the overall dimensions of the pen need to be small enough for a user to manipulate it as they would a normal pen.

The force sensor circuitry typically utilizes a piezo-electric element which demands precision assembly and careful tolerancing so that full deflection of the nib does not break the delicate crystal element. The considerations complicate the production of the pen particularly given the constricted space available within the stylus body.

SUMMARY OF THE INVENTION

Accordingly, this aspect provides a pen comprising:
an elongate chassis moulding; and,
a cartridge with a nib and an elongate body; wherein,
the cartridge is configured for insertion and removal from the elongate chassis moulding from a direction transverse to the longitudinal axis of the chassis moulding.

According to a closely related aspect, the present invention provides an ink cartridge for a pen, the ink cartridge comprising:
an elongate ink reservoir; and,
a writing nib in fluid communication with the ink reservoir; wherein,
the elongate ink reservoir has an enlarged transverse cross section along a portion of its length intermediate its ends.

By configuring the pen chassis and cartridge so that it can be inserted and removed from the side rather than through the ends, the capacity of the cartridge can be significantly increased. An enlarged section between the ends of the ink cartridge increases the capacity while allowing the relatively thin ends to be supported at the nib moulding and opposing end of the pen chassis. In a Netpage pen, inserting the cartridge from the side avoids the need to remove the force sensor when replacing the cartridge. Again, the thinner sections at each end of the cartridge allow it to engage a ball point nib supported in the nib moulding and directly engage the force sensor at the other end, while the enlarged middle portion increases the ink capacity.

Optionally, the cartridge is an ink cartridge and the elongate body houses an ink reservoir. Preferably, the pen is an electronic stylus with a force sensor assembly, and the cartridge is held in the stylus such that the nib is at one end of the elongate body and the other end of the elongate body engages the force sensor assembly. In some embodiments, the force sensor assembly has a load bearing member to receive an input force to be sensed and circuitry for converting the input force into an output signal indicative of the input force, the load bearing member abutting the opposite end of the elongate cartridge such that the input force comprises the axial component of the contact force on the nib transferred by the cartridge.

Preferably the elongate cartridge is biased against the load bearing member. In a further preferred form, the elongate cartridge has a flange surface proximate the nib end, and a biasing element between the flange surface and the chassis moulding biases the elongate cartridge against the load bearing member. Typically, this bias is between 0.1 Newtons and 0.2 Newtons (approx. 10 g-20 g).

Preferably, the circuitry is a piezoresistive bridge circuit. However, the circuitry could also be a capacitative or inductive force sensing circuit. In another option, the circuitry may be an optical force sensor. In a further preferred form, the load bearing member has a protrusion with round end for engagement with the cartridge. In another preferred form, the cartridge has a similar protrusion extending centrally from its end such that the distal end of the protrusion engages the rounded end of the protrusion from the load bearing member. In a particularly preferred form, the housing defines a recess for the circuitry, the rounded end of the protrusion from the load bearing member extends proud of the recess for engaging the cartridge. Preferably, a stop surface positioned around the opening to the recess engages the cartridge to limit elastic deformation of the force sensor assembly.

Typically, the force sensor assembly is configured to sense a maximum force of 5 Newtons (approx. 500 g). Preferaby, the load bearing member can move up to 100 microns relative to the chassis.

In a particularly preferred embodiment, the output signal from the circuitry support a hand writing recognition facility.

In a second aspect the present invention provides a force, sensor assembly comprising:

a load bearing member for receiving an input force;

a sensor circuit for converting the input force into a signal indicative of the input force; and, a force transfer coupling for receiving an applied force and at least partially transferring it to the load bearing member as the input force; wherein, the applied force and the input force are not co-linear.

According to a closely related aspect, the present invention provides an electronic stylus comprising:

an elongate body;

a nib extending from one end of the elongate body;

a load bearing member for receiving an input force;

a sensor circuit for converting the input force into a signal indicative of the input force; and, a force transfer coupling for receiving an applied force caused by contact on the nib, and at least partially transferring it to the load bearing member as the input force; wherein during use, the applied force and the input force are not co-linear.

With the use of a force transfer coupling, the sensor circuitry and load bearing member can remain fixed in the pen body while the ink cartridge is removed and replace. The force transfer coupling may need to be removed or shifted when the ink cartridge for the nib is being changed (assuming the stylus has a ball point nib) but there is less potential for damage to the force sensor. The deceleration shock from being bumped or dropped in its nib can break the sensor circuitry, which necessitates the replacement of the entire PCB.

Preferably, the force transfer coupling is an element configured for elastic deformation in a direction skew to the applied force. In a further preferred form, the element is a double bowed section that bows outwardly when axially compressed by the applied force. In a particularly preferred form, the load bearing member engages one of the bowed sections at its mid point such that the input force is perpendicular to the applied force. Preferably, the bowed section that does not contact the load bearing member is constrained against lateral displacement in order to stiffen the other bowed section. In some embodiments, the bowed sections have an arcuate lateral cross section to reduce contact friction with the load bearing member and the lateral constraint. Optionally, the load bearing member a rounded protrusion for contacting the bowed section of the force transfer coupling.

In some embodiments, the force transfer coupling is a hydraulic element that uses the applied force to create hydraulic pressure acting on the load bearing member. In a particularly preferred form, the hydraulic pressure acts such that the input force is perpendicular to the applied force. Preferably, the hydraulic fluid has low viscosity and low shear forces. In some embodiments, the hydraulic fluid is a silicon gel. Preferably the hydraulic fluid is contained in a reservoir at least partially defined by a flexible membrane such that the applied force acts on the hydraulic fluid via the flexible membrane. Optionally, the hydraulic fluid acts directly on the load bearing member.

In some preferred embodiments, the circuitry is a piezoresistive bridge circuit. Optionally, the nib of the electronic stylus is a ball point writing nib with a tubular ink cartridge extending from the nib toward the load bearing member such that the end of the cartridge opposite the nib transmits the applied force to the hydraulic coupling. Preferably, the output signal from the circuitry support a hand writing recognition facility. Preferably the circuitry is an integrated circuit (IC) mounted on a PCB (printed circuit board), the plane of the PCB being parallel to the longitudinal axis of the elongate body.

In some embodiments, the load bearing member can move up to 100 microns relative to the elongate body. Optionally, the input force is limited to a maximum of 5 Newtons. In a particularly preferred embodiment, the output signal from the circuitry support a hand writing recognition facility.

In a third aspect the present invention provides a force sensor assembly comprising:

a housing;

a load bearing member movably mounted in the housing for receiving an input force to be sensed, the load bearing member being biased against the direction of the input force;

a light source;

a photo-detector for sensing levels of illumination from the light source; and, circuitry for converting a range of illumination levels sensed by the photo-detector into a range of output signals; wherein, the illumination level sensed by the photo-detector varies with movement of the load bearing member within the housing such that the output signal from the circuitry is indicative of the input force.

According to a closely related aspect, the present invention provides an electronic stylus comprising:

an elongate body;

a nib extending from one end of the elongate body;

a load bearing member movably mounted to the elongate body for receiving an input force caused by contact on the nib, the load bearing member being biased against the direction of the input force;

a light source;

a photo-detector for sensing levels of illumination from the light source; and, circuitry for converting a range of illumination levels sensed by the photo-detector into a range of output signals; wherein, the illumination level sensed by the photo-detector varies with movement of the load bearing member within the elongate such that the output signal from the circuitry is indicative of the input force.

Using an optical force sensor is more robust than a piezo-resistive sensor. Installing an LED and photo-detector is less complex than the delicate requirements of a piezo-electric crystal. The full force deflection on the nib is relatively small, so the tolerancing in a piezo-resistive component needs to be high enough to prevent breakage.

Preferably, the light source is fixed to the housing for illuminating at least part of the load bearing member. Preferably, the photo-detector is mounted to the housing such that the load bearing member moves between the light source and the photo-detector. In a further preferred form, the load bearing member has an aperture through which light from the light source can illuminate the photo-detector, the aperture being positioned between the light source and the photo-detector at part of the load bearing member's travel within the housing. In a particularly preferred form, the load bearing member is biased with a spring, the spring having a spring constant equal to the maximum force the sensor is to sense, divided by the length in the direction of travel within the housing of the aperture. Optionally, the aperture is aligned with the light source and the photo-detector when the input force is the maximum force, and the load bearing member fully obscures the light source from the photo-detector when the input force is zero.

Conveniently, the light source is a LED. In some embodiments, the load bearing member has a maximum travel of 100 microns within the housing. In some embodiments, the nib of the electronic stylus is a ball point writing nib with a tubular ink cartridge extending from the nib toward the load bearing member such that the coupling is a detachable boot that fits over the end of the cartridge opposite the nib.

Typically, the force sensor is configured to sense a maximum force of 5 Newtons (approx. 500 g). In a particularly preferred embodiment, the output signal from the circuitry support a hand writing recognition facility.

In a fourth aspect the present invention provides a force sensor assembly comprising:

a load bearing member for receiving an input force to be sensed;

circuitry for converting the input force into an output signal indicative of the input force;

a coupling having an inner section for transmitting the input force to the load bearing member, an outer section for receiving an applied contact force and a collapsible section for allowing the outer section to move relative to the inner section when the contact force exceeds a threshold.

According to a closely related aspect, the present invention provides an electronic stylus comprising:

an elongate body;

a nib extending from one end of the elongate body; and, a load bearing member mounted to the elongate body for receiving an input force caused by contact on the nib;

circuitry for converting the input force into an output signal indicative of the input force;

a coupling having an inner section for transmitting the input force to the load bearing member, an outer section for receiving the contact force on the nib and a collapsible section for allowing the outer section to move relative to the inner section when the contact force exceeds a threshold.

Inserting a collapsible section between the nib and the force sensor will allows static and dynamic contacts loads up to a predetermined threshold to be transmitted to the sensor. However, any loads that exceed the threshold, regardless of whether they are static or shock loads, will simply force the outer section of the coupling to collapse toward the inner section. The input force at the sensor remains at or below the threshold.

Preferably, the collapsible section has a deformable structure. In some embodiments, the deformable structure deforms plastically when the contact force exceeds a threshold. In one preferred embodiment, the deformable structure is a series of struts extending between the inner section and the outer section such that the struts buckle when the contact force exceeds their combined buckling loads. Optionally, the struts are inclined to the direction of the contact force in order to promote buckling at a lower threshold. In other embodiments, the deformable structure deforms elastically when the contact force exceeds a threshold. Preferably, the deformable structure has a pair of abutting slip surfaces biased against each other by a resilient member, such that the slip surfaces slide relative to each other if the input force exceeds the threshold created by friction between the slip surfaces. In a particularly preferred form, the resilient member is an elastic sleeve tightly fitted around the two components that respectively define the slip surfaces, the slip surfaces being inclined relative to the direction of the input force.

In a particularly preferred form, the coupling is biased against the load bearing member. Typically, this bias is between 0.1 Newtons and 0.2 Newtons (approx. 10 g-20 g). In some embodiments, the nib of the electronic stylus is a ball point writing nib with a tubular ink cartridge extending from the nib toward the load bearing member such that the coupling is a detachable boot that fits over the end of the cartridge opposite the nib.

Typically, the force sensor is configured to sense a maximum force of 5 Newtons (approx. 500 g). Preferaby, the load bearing member can move up to 100 microns relative to the housing.

In a particularly preferred embodiment, the output signal from the circuitry support a hand writing recognition facility.

In a fifth aspect the present invention provides a force sensor assembly comprising:

a housing;

a load bearing member for receiving an input force to be sensed;

circuitry for converting the input force into an output signal indicative of the input force;

a coupling for transmitting the input force to the load bearing member; and, a compressible reservoir containing dilatant fluid mounted between the housing and the coupling to restrict the input force to the load bearing member caused by shock loading to the coupling.

According to a closely related aspect, the present invention provides an electronic stylus comprising:

an elongate body;

a nib extending from one end of the elongate body; and, a load bearing member mounted to the elongate body for receiving an input force caused by contact on the nib;

circuitry for converting the input force into an output signal indicative of the input force;

a coupling for transmitting the input force to the load bearing member; and, a compressible reservoir containing dilatant fluid mounted between the housing and the coupling to restrict the input force to the load bearing member caused by shock loading to the coupling.

A dilatant (or "shear thickening") fluid is a non-Newtonian fluid whose viscosity increases with rate of shear. At a low shear rate the particles are able to slide past each other and the fluid behaves as a liquid. Above a critical shear rate friction between the particles predominates and the fluid behaves as a solid.

To prevent force sensor damage from an impulse (shock loading), an additional stop containing a dilatant fluid can be inserted between the element that couples the nib to the force sensor. The dilatant fluid can be contained in a sack formed from a flexible membrane. During normal operation of the pen the dilatant fluid sack acts as a liquid and deforms in response to movement of the cartridge, allowing normal forces to be transmitted from the cartridge to the force sensor. When a damaging impulse occurs, the dilatant fluid effectively hardens in response to the high shear rate, preventing movement of the cartridge and thereby protecting the force sensor.

Preferably, the compressible reservoir of dilatant fluid maintains a gap between the load bearing member and the coupling when the input force is not applied, and the compressible reservoir compresses to allow the coupling to directly engage the load bearing member with a steady application of the input force. In a further preferred form, the compressible reservoir is secured to the housing and the coupling, and the coupling is biased away from the housing to maintain the gap between the coupling and load bearing member when the input force is not applied. Preferably, the circuitry is a piezoresistive bridge circuit. However, the circuitry could also be a capacitative or inductive force sensing circuit. In another option, the circuitry may be an optical force sensor. In a further preferred form, the load bearing member has a protrusion with round end for engagement with the coupling. In another preferred form, the coupling has a similar protrusion extending centrally from a flange such that the distal end of the protrusion engages the rounded end of the protrusion from the load bearing member, and the compressible reservoir of dilatant fluid is positioned between the housing and the flange. In a particularly preferred form, the housing defines a recess for the circuitry, the rounded end of the protrusion from the load bearing member extends proud of the recess for engaging the coupling. Preferably, the compressible reservoir has an annular shape and is positioned around the opening to the recess and around the central protrusion from the flange of the coupling.

In a particularly preferred form, the coupling is biased against the load bearing member. Typically, this bias is between 0.1 Newtons and 0.2 Newtons (approx. 10 g-20 g). In some embodiments, the nib of the electronic stylus is a ball point writing nib with a tubular ink cartridge extending from the nib toward the load bearing member such that the coupling is a detachable boot that fits over the end of the cartridge opposite the nib.

Typically, the force sensor is configured to sense a maximum force of 5 Newtons (approx. 500 g). Preferably, the load bearing member can move up to 100 microns relative to the housing.

In a particularly preferred embodiment, the output signal from the circuitry support a hand writing recognition facility.

BRIEF DESCRIPTION OF THE DRAWINGS

Embodiments of the invention will now be described by way of example only with reference to the accompanying drawings in which:

FIG. 21 is an exploded perspective of the ink cartridge tube and nib engaging removal tool;

FIG. 22 is a partially sectioned perspective of a new ink cartridge engaging the nib end of the currently installed ink cartridge;

FIG. 23 is a partial perspective of the packaged force sensor on the main PCB;

FIG. 27A is a partial longitudinal cross section of the nib and barrel molding;

FIG. 27B is a partial longitudinal cross section of the IR LED's and the barrel molding;

FIG. 37A is a schematic representation of a hydraulic force sensor coupling;

FIG. 37 B is a longitudinal section of the hydraulic force sensor coupling shown in FIG. 37A;

FIG. 38 is schematic representation of an alternative configuration of the hydraulic force sensor coupling;

FIG. 39A is a more detailed sketch of the hydraulic coupling between the cartridge and the force sensor;

FIG. 39B is a section view taken along line 39-39 of FIG. 39A;

FIG. 40 is a schematic section view of the input force acting on the plunger and the detail of the force sensor mounting;

FIG. 41 is a schematic section view of an alternative force senor mounting without the input ball bearing;

FIG. 66A is a perspective of the optics assembly lifted from the chassis molding;

FIG. 66B is an enlarged partial perspective of the optics assembly seated in the chassis molding;

FIG. 73 is a perspective of the tube molding being inserted over the chassis molding;

DETAILED DESCRIPTION

As discussed above, the invention is well suited for incorporation in the Assignee's Netpage system. In light of this, the invention has been described as a component of a broader Netpage architecture. However, it will be readily appreciated that electronic styli have much broader application in many different fields. Accordingly, the present invention is not restricted to a Netpage context.

Netpage Surfaces Coding

Introduction

This section defines a surface coding used by the Netpage system (described in co-pending application as well as many of the other cross referenced documents listed above) to imbue otherwise passive surfaces with interactivity in conjunction with Netpage sensing devices (described below).

When interacting with a Netpage coded surface, a Netpage sensing device generates a digital ink stream which indicates both the identity of the surface region relative to which the sensing device is moving, and the absolute path of the sensing device within the region.

Surface Coding

The Netpage surface coding consists of a dense planar tiling of tags. Each tag encodes its own location in the plane.

Each tag also encodes, in conjunction with adjacent tags, an identifier of the region containing the tag. In the Netpage system, the region typically corresponds to the entire extent of the tagged surface, such as one side of a sheet of paper.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

Tag Structure

Figure 1:
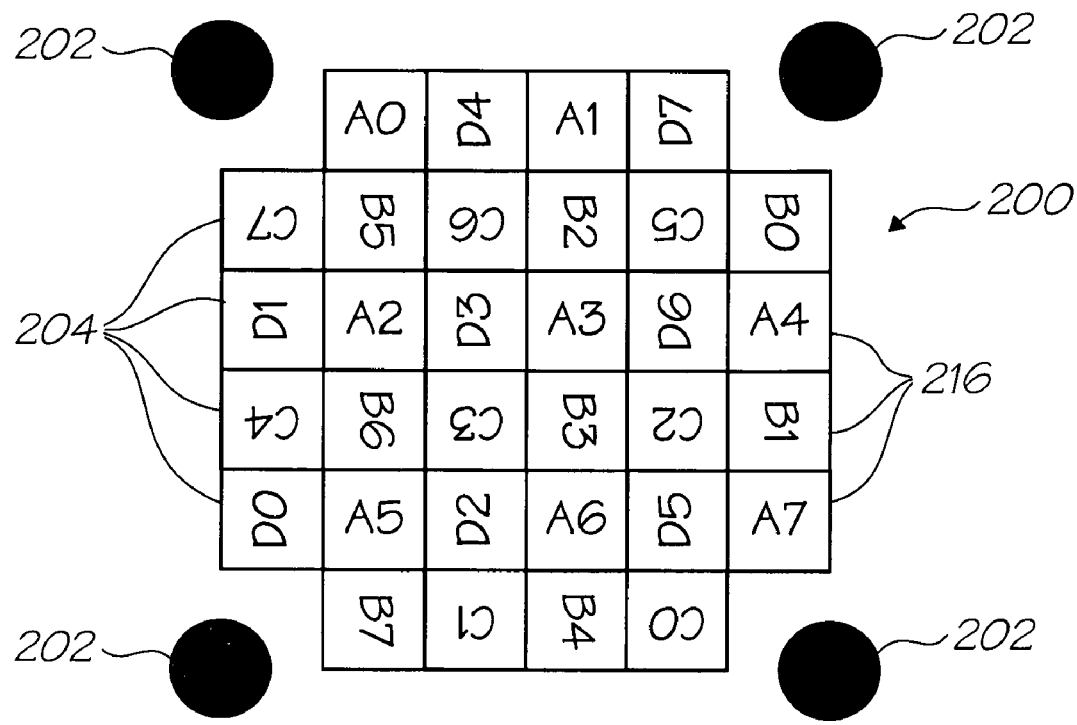
FIG. 1 shows the structure of a complete tag.

FIG. 1 shows the structure of a complete tag 200. Each of the four black circles 202 is a target. The tag 200, and the overall pattern, has four-fold rotational symmetry at the physical level.

Each square region represents a symbol 204, and each symbol represents four bits of information. Each symbol 204 shown in the tag structure has a unique label 216. Each label 216 has an alphabetic prefix and a numeric suffix.

Figure 2:
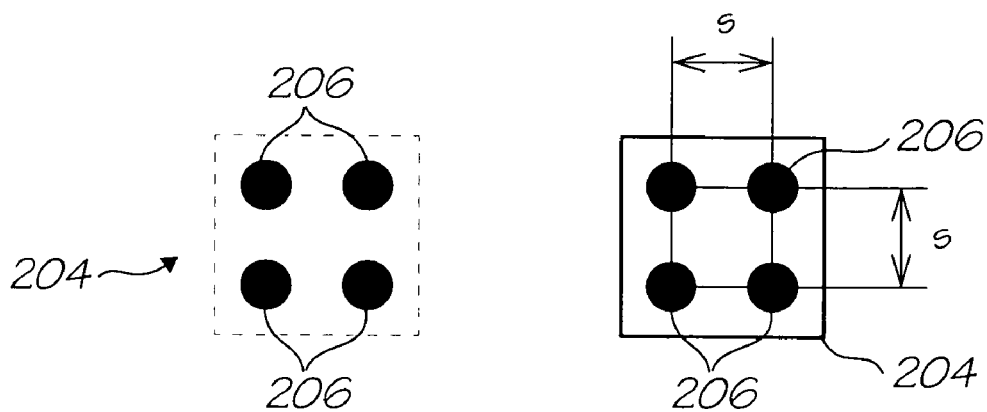
FIG. 2 shows a symbol unit cell.

FIG. 2 shows the structure of a symbol 204. It contains four macrodots 206, each of which represents the value of one bit by its presence (one) or absence (zero).

The macrodot 206 spacing is specified by the parameter S throughout this specification. It has a nominal value of 143 µm, based on 9 dots printed at a pitch of 1600 dots per inch. However, it is allowed to vary within defined bounds according to the capabilities of the device used to produce the pattern.

Figure 3:
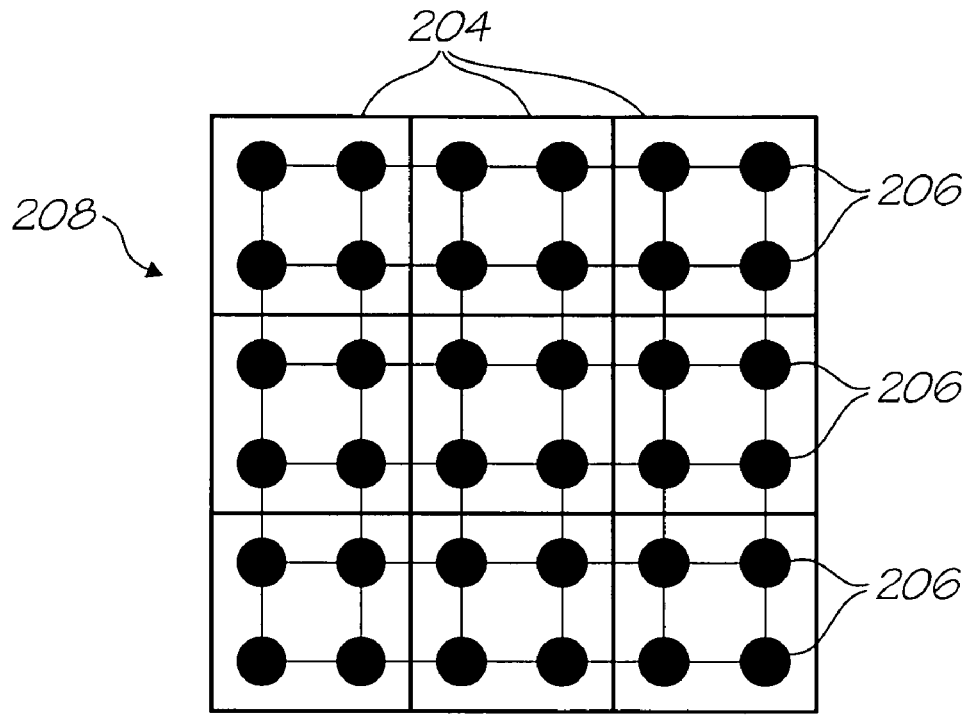
FIG. 3 shows nine symbol unit cells.

FIG. 3 shows an array 208 of nine adjacent symbols 204. The macrodot 206 spacing is uniform both within and between symbols 208.

Figure 4:
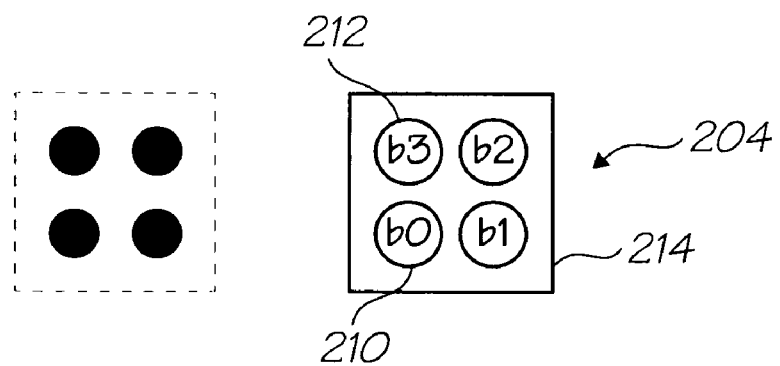
FIG. 4 shows the bit ordering in a symbol.

FIG. 4 shows the ordering of the bits within a symbol 204.

Bit zero 210 is the least significant within a symbol 204; bit three 212 is the most significant. Note that this ordering is relative to the orientation of the symbol 204. The orientation of a particular symbol 204 within the tag 200 is indicated by the orientation of the label 216 of the symbol in the tag diagrams (see for example FIG. 1). In general, the orientation of all symbols 204 within a particular segment of the tag 200 is the same, consistent with the bottom of the symbol being closest to the centre of the tag.

Figure 5:
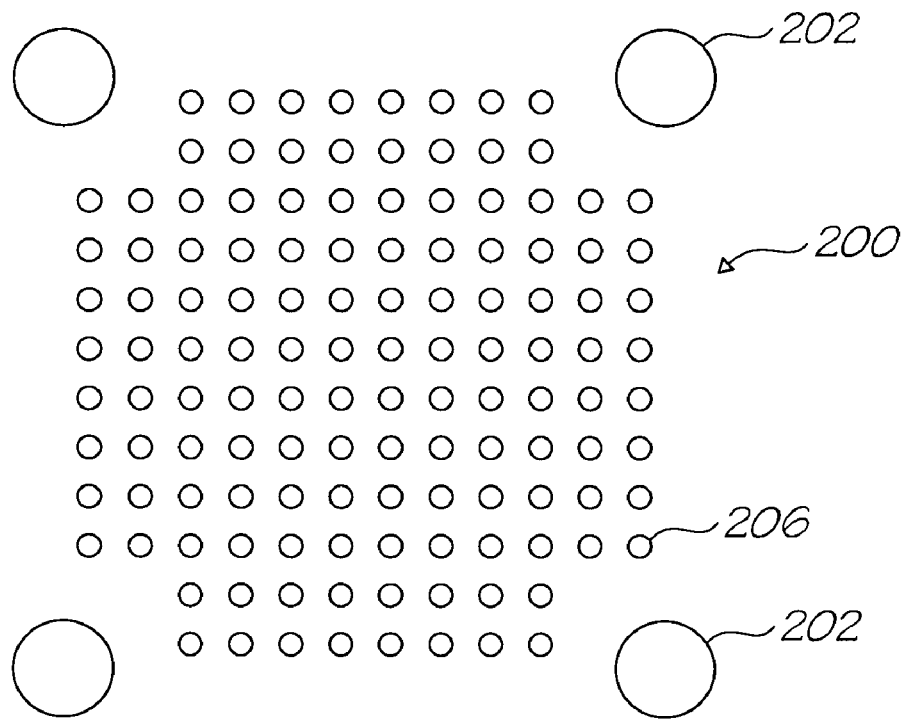
FIG. 5 shows a tag with all bits set.

Only the macrodots 206 are part of the representation of a symbol 204 in the pattern. The square outline 214 of a symbol 204 is used in this specification to more clearly elucidate the structure of a tag 204. FIG. 5, by way of illustration, shows the actual pattern of a tag 200 with every bit 206 set. Note that, in practice, every bit 206 of a tag 200 can never be set.

A macrodot 206 is nominally circular with a nominal diameter of (5/9)s. However, it is allowed to vary in size by ±10% according to the capabilities of the device used to produce the pattern.

A target 202 is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Tag Groups

Figure 6:
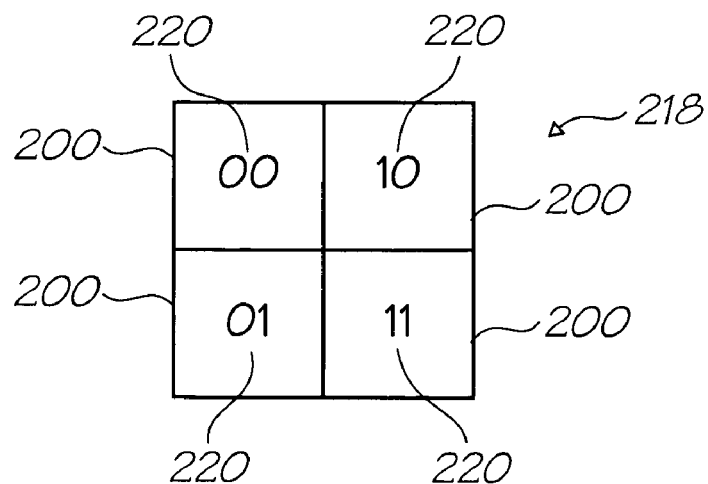
FIG. 6 shows a tag group made up of four tag types.

Tags 200 are arranged into tag groups 218. Each tag group contains four tags arranged in a square. Each tag 200 has one of four possible tag types, each of which is labelled according to its location within the tag group 218. The tag type labels 220 are 00, 10, 01 and 11, as shown in FIG. 6.

Figures 7, 8:
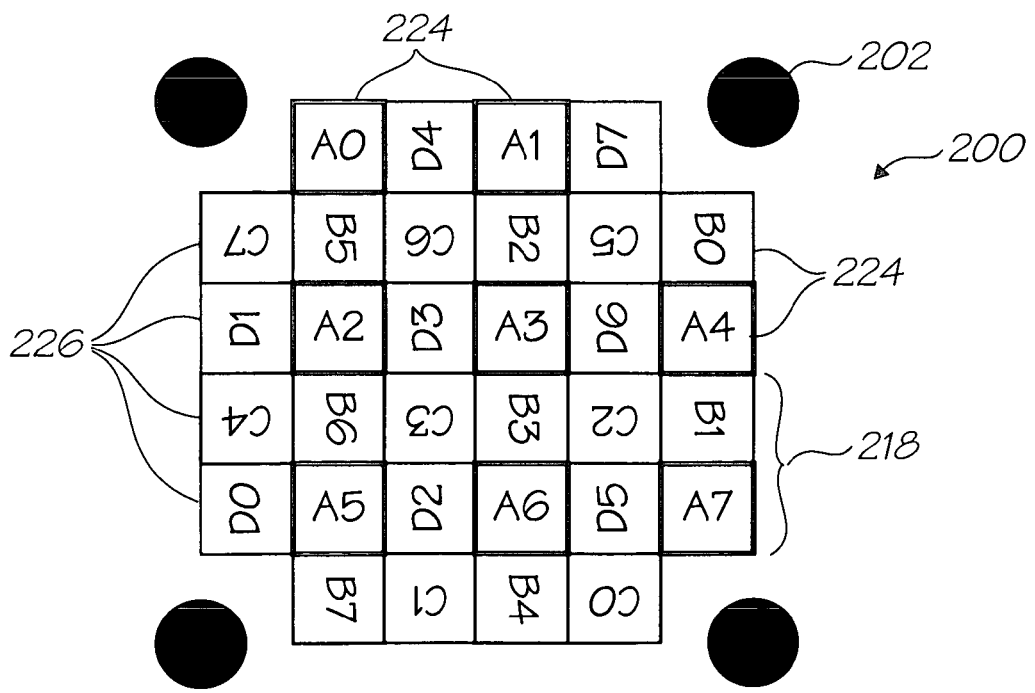
FIG. 7 shows the continuous tiling of tag groups.
FIG. 8 shows the interleaving of codewords A, B, C & D within a tag.

FIG. 7 shows how tag groups are repeated in a continuous tiling of tags, or tag pattern 222. The tiling guarantees the any set of four adjacent tags 200 contains one tag of each type 220.

Codewords

The tag contains four complete codewords. The layout of the four codewords is shown in FIG. 8. Each codeword is of a punctured $2^4$-ary (8, 5) Reed-Solomon code. The codewords are labelled A, B, C and D. Fragments of each codeword are distributed throughout the tag 200.

Two of the codewords are unique to the tag 200. These are referred to as local codewords 224 and are labelled A and B. The tag 200 therefore encodes up to 40 bits of information unique to the tag.

The remaining two codewords are unique to a tag type, but common to all tags of the same type within a contiguous tiling of tags 222. These are referred to as global codewords 226 and are labelled C and D, subscripted by tag type. A tag group 218 therefore encodes up to 160 bits of information common to all tag groups within a contiguous tiling of tags.

Reed-Solomon Encoding

Codewords are encoded using a punctured $2^4$-ary (8, 5) Reed-Solomon code. A $2^4$-ary (8, 5) Reed-Solomon code encodes 20 data bits (i.e. five 4-bit symbols) and 12 redundancy bits (i.e. three 4-bit symbols) in each codeword. Its error-detecting capacity is three symbols. Its error-correcting capacity is one symbol.

Figures 9, 10:
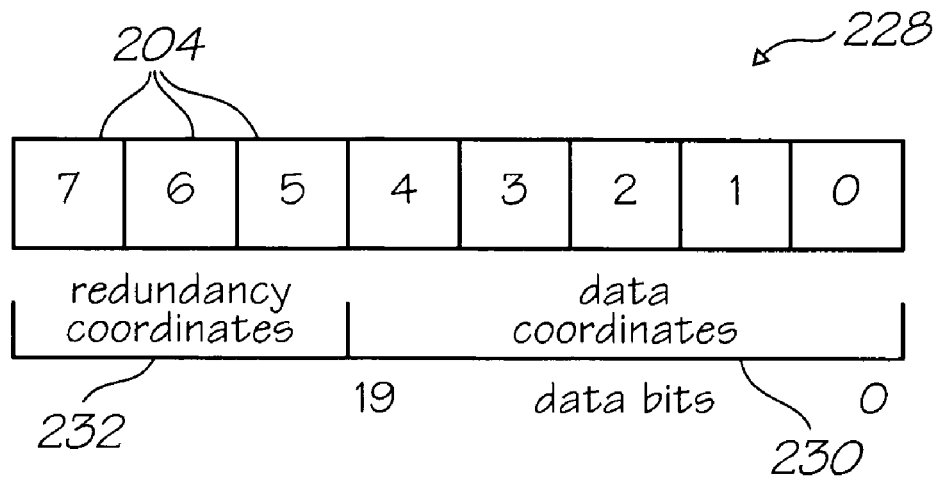
FIG. 9 shows a codeword layout.
FIG. 10 shows a tag and its eight immediate neighbours labelled with its corresponding bit index.

FIG. 9 shows a codeword 228 of eight symbols 204, with five symbols encoding data coordinates 230 and three symbols encoding redundancy coordinates 232. The codeword coordinates are indexed in coefficient order, and the data bit ordering follows the codeword bit ordering.

A punctured $2^4$-ary (8, 5) Reed-Solomon code is a $2^4$-ary (15, 5) Reed-Solomon code with seven redundancy coordinates removed. The removed coordinates are the most significant redundancy coordinates.

The code has the following primitive polynominal:

$$p(x)=x^4+x+1 \tag{EQ 1}$$

The code has the following generator polynominal:

$$g(x)=(x+\alpha)(x+\alpha^2)\ldots(x+\alpha^{10}) \tag{EQ 2}$$

For a detailed description of Reed-Solomon codes, refer to Wicker, S. B. and V. K. Bhargava, eds., *Reed-Solomon Codes and Their Applications, IEEE Press,* 1994, the contents of which are incorporated herein by reference.

The Tag Coordinate Space

The tag coordinate space has two orthogonal axes labelled x and y respectively. When the positive x axis points to the right, then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the position is taken to be the position of the centre of the target closest to the origin.

Tag Information Content

Table 1 defines the information fields embedded in the surface coding. Table 2 defines how these fields map to codewords.

TABLE 1

Field definitions

| field | width | description |
|---|---|---|
| per codeword | | |
| codeword type | 2 | The type of the codeword, i.e. one of A (b'00'), B (b'01'), C (b'10') and D (b'11'). |
| per tag | | |
| tag type | 2 | The type[1] of the tag, i.e. one of 00 (b'00'), 01 (b'01'), 10 (b'10') and 11 (b'11'). |
| x coordinate | 13 | The unsigned x coordinate of the tag[2]. |
| y coordinate | 13 | The unsigned y coordinate of the tag[b]. |
| active area flag | 1 | A flag indicating whether the tag is a member of an active area. b'1' indicates membership. |
| active area map flag | 1 | A flag indicating whether an active area map is present. b'1' indicates the presence of a map (see next field). If the map is absent then the value of each map entry is derived from the active area flag (see previous field). |
| active area map | 8 | A map[3] of which of the tag's immediate eight neighbours are members of an active area. b'1' indicates membership. |
| data fragment | 8 | A fragment of an embedded data stream. Only present if the active area map is absent. |
| per tag group | | |
| encoding format | 8 | The format of the encoding. 0: the present encoding Other values are TBA. |
| region flags | 8 | Flags controlling the interpretation and routing of region-related information. 0: region ID is an EPC 1: region is linked 2: region is interactive 3: region is signed 4: region includes data 5: region relates to mobile application Other bits are reserved and must be zero. |
| tag size adjustment | 16 | The difference between the actual tag size and the nominal tag size[4], in 10 nm units, in sign-magnitude format. |
| region ID | 96 | The ID of the region containing the tags. |
| CRC | 16 | A CRC[5] of tag group data. |
| total | 320 | |

Figure 29:
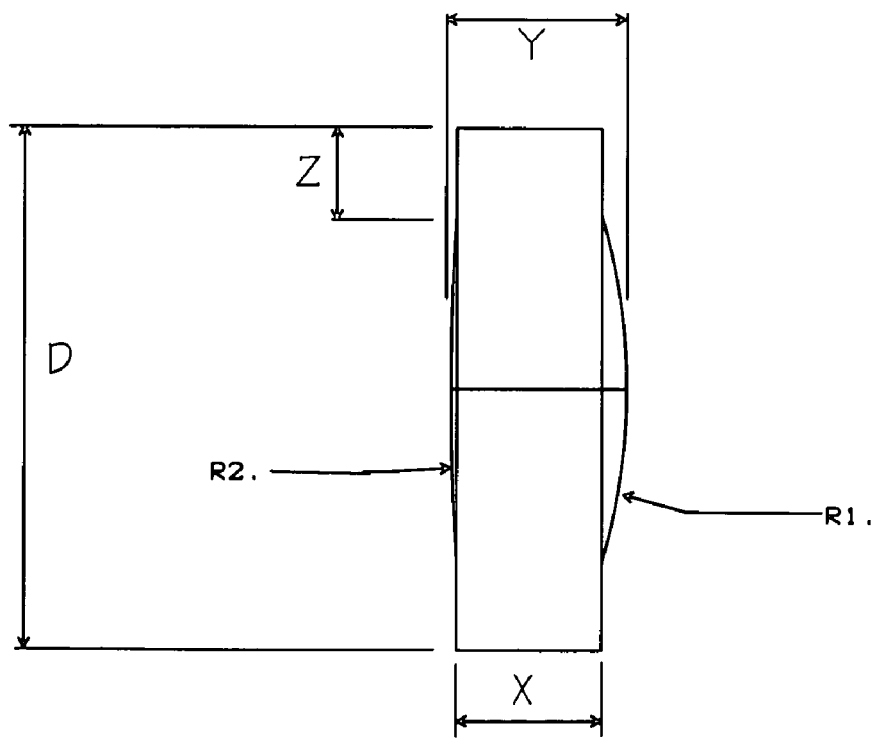
FIG. 29 is a side elevation of the lens.

[1]corresponds to the bottom two bits of the x and y coordinates of the tag
[2]allows a maximum coordinate value of approximately 14 m
[3]FIG. 29 indicates the bit ordering of the map
[4]the nominal tag size is 1.7145 mm (based on 1600 dpi, 9 dots per macrodot, and 12 macrodots per tag)
[5]CCITT CRC-16 [7]

FIG. 10 shows a tag 200 and its eight immediate neighbours, each labelled with its corresponding bit index in the active area map. An active area map indicates whether the corresponding tags are members of an active area. An active area is an area within which any captured input should be immediately forwarded to the corresponding Netpage server for interpretation. It also allows the Netpage sensing device to signal to the user that the input will have an immediate effect.

TABLE 2

Mapping of fields to codewords

| codeword | codeword bits | field | width | field bits |
|---|---|---|---|---|
| A | 1:0 | codeword type (b'00') | 2 | all |
|  | 10:2 | x coordinate | 9 | 12:4 |
|  | 19:11 | y coordinate | 9 | 12:4 |
| B | 1:0 | codeword type (b'01') | 2 | all |
|  | 2 | tag type | 1 | 0 |
|  | 5:2 | x coordinate | 4 | 3:0 |

TABLE 2-continued

Mapping of fields to codewords

| codeword | codeword bits | field | width | field bits |
|---|---|---|---|---|
|  | 6 | tag type | 1 | 1 |
|  | 9:6 | y coordinate | 4 | 3:0 |
|  | 10 | active area flag | 1 | all |
|  | 11 | active area map flag | 1 | all |
|  | 19:12 | active area map | 8 | all |
|  | 19:12 | data fragment | 8 | all |
| $C_{00}$ | 1:0 | codeword type (b'10') | 2 | all |
|  | 9:2 | encoding format | 8 | all |
|  | 17:10 | region flags | 8 | all |
|  | 19:18 | tag size adjustment | 2 | 1:0 |
| $C_{01}$ | 1:0 | codeword type (b'10') | 2 | all |
|  | 15:2 | tag size adjustment | 14 | 15:2 |
|  | 19:16 | region ID | 4 | 3:0 |
| $C_{10}$ | 1:0 | codeword type (b'10') | 2 | all |
|  | 19:2 | region ID | 18 | 21:4 |
| $C_{11}$ | 1:0 | codeword type (b'10') | 2 | all |
|  | 19:2 | region ID | 18 | 39:22 |
| $D_{00}$ | 1:0 | codeword type (b'11') | 2 | all |
|  | 19:2 | region ID | 18 | 57:40 |
| $D_{01}$ | 1:0 | codeword type (b'11') | 2 | all |
|  | 19:2 | region ID | 18 | 75:58 |
| $D_{10}$ | 1:0 | codeword type (b'11') | 2 | all |
|  | 19:2 | region ID | 18 | 93:76 |
| $D_{11}$ | 1:0 | codeword type (b'11') | 2 | all |
|  | 3:2 | region ID | 2 | 95:94 |
|  | 19:4 | CRC | 16 | all |

Note that the tag type can be moved into a global codeword to maximise local codeword utilization. This in turn can allow larger coordinates and/or 16-bit data fragments (potentially configurably in conjunction with coordinate precision). However, this reduces the independence of position decoding from region ID decoding and has not been included in the specification at this time.

Embedded Data

If the "region includes data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 3, a 200-bit data block encodes 160 bits of data. The block data is encoded in the data fragments of A contiguous group of 25 tags arranged in a 5☐5 square. A tag belongs to a block whose integer coordinate is the tag's coordinate divided by 5. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 3

Embedded data block

| field | width | description |
|---|---|---|
| data type | 8 | The type of the data in the superblock. Values include: 0: type is controlled by region flags 1: MIME Other values are TBA. |
| superblock width | 8 | The width of the superblock, in blocks. |
| superblock height | 8 | The height of the superblock, in blocks. |
| data | 160 | The block data. |
| CRC | 16 | A CRC[6] of the block data. |
| total | 200 | |

[6]CCITT CRC-16 [7]

Cryptographic Signature of Region ID

If the "region is signed" flag in the region flags is set then the surface coding contains a 160-bit cryptographic signature of the region ID. The signature is encoded in a one-block superblock.

In an online environment any signature fragment can be used, in conjunction with the region ID, to validate the signature. In an offline environment the entire signature can be recovered by reading multiple tags, and can then be validated using the corresponding public signature key. This is discussed in more detail in Netpage Surface Coding Security section of the cross reference co-pending application Ser. No. 11/193,479, which is entirely incorporated into the application with Ser. No. 11/193,481.

MIME Data

If the embedded data type is "MIME" then the superblock contains Multipurpose Internet Mail Extensions (MIME) data according to RFC 2045 (see Freed, N., and N. Borenstein, "Multipurpose Internet Mail Extensions (MIME)—Part One: Format of Internet Message Bodies", RFC 2045, November 1996), RFC 2046 (see Freed, N., and N. Borenstein, "Multipurpose Internet Mail Extensions (MIME)—Part Two: Media Types", RFC 2046, November 1996) and related RFCs. The MIME data consists of a header followed by a body. The header is encoded as a variable-length text string preceded by an 8-bit string length. The body is encoded as a variable-length type-specific octet stream preceded by a 16-bit size in big-endian format.

The basic top-level media types described in RFC 2046 include text, image, audio, video and application. RFC 2425 (see Howes, T., M. Smith and F. Dawson, "A MIME Content-Type for Directory Information", RFC 2045, September 1998) and RFC 2426 (see Dawson, F., and T. Howes, "vCard MIME Directory Profile", RFC 2046, September 1998) describe a text subtype for directory information suitable, for example, for encoding contact information which might appear on a business card.

Encoding and Printing Considerations

The Print Engine Controller (PEC) supports the encoding of two fixed (per-page) $2^4$-ary (15, 5) Reed-Solomon codewords and six variable (per-tag) $2^4$-ary (15, 5) Reed-Solomon codewords. Furthermore, PEC supports the rendering of tags via a rectangular unit cell whose layout is constant (per page) but whose variable codeword data may vary from one unit cell to the next. PEC does not allow unit cells to overlap in the direction of page movement. A unit cell compatible with PEC contains a single tag group consisting of four tags. The tag group contains a single A codeword unique to the tag group but replicated four times within the tag group, and four unique B codewords. These can be encoded using five of PEC's six supported variable codewords. The tag group also contains eight fixed C and D codewords. One of these can be encoded using the remaining one of PEC's variable codewords, two more can be encoded using PEC's two fixed codewords, and the remaining five can be encoded and pre-rendered into the Tag Format Structure (TFS) supplied to PEC.

PEC imposes a limit of 32 unique bit addresses per TFS row. The contents of the unit cell respect this limit. PEC also imposes a limit of 384 on the width of the TFS. The contents of the unit cell respect this limit.

Note that for a reasonable page size, the number of variable coordinate bits in the A codeword is modest, making encoding via a lookup table tractable. Encoding of the B codeword via a lookup table may also be possible. Note that since a Reed-Solomon code is systematic, only the redundancy data needs to appear in the lookup table.

Imaging and Decoding Considerations

The minimum imaging field of view required to guarantee acquisition of an entire tag has a diameter of 39.6 s (i.e. $(2 \times (12+2))\sqrt{2}$ s), allowing for arbitrary alignment between the surface coding and the field of view. Given a macrodot spacing of 143 μm, this gives a required field of view of 5.7 mm.

Table 4 gives pitch ranges achievable for the present surface coding for different sampling rates, assuming an image sensor size of 128 pixels.

TABLE 4

Pitch ranges achievable for present surface coding for different sampling rates; dot pitch = 1600 dpi, macrodot pitch = 9 dots, viewing distance = 30 mm, nib-to-FOV separation = 1 mm, image sensor size = 128 pixels

| sampling rate | pitch range |
|---|---|
| 2 | ⁻40 to 49 |
| 2.5 | ⁻27 to 36 |
| 3 | ⁻10 to 18 |

Given the present surface coding, the corresponding decoding sequence is as follows:
 locate targets of complete tag
 infer perspective transform from targets
 sample and decode any one of tag's four codewords
 determine codeword type and hence tag orientation
 sample and decode required local (A and B) codewords
 codeword redundancy is only 12 bits, so only detect errors
 on decode error flag bad position sample
 determine tag x-y location, with reference to tag orientation
 infer 3D tag transform from oriented targets
 determine nib x-y location from tag x-y location and 3D transform
 determine active area status of nib location with reference to active area map
 generate local feedback based on nib active area status
 determine tag type from A codeword sample and decode required global (C and D) codewords (modulo window alignment, with reference to tag type)

although codeword redundancy is only 12 bits, correct errors; subsequent CRC verification will detect erroneous error correction verify tag group data CRC on decode error flag bad region ID sample determine encoding type, and reject unknown encoding determine region flags determine region ID encode region ID, nib x-y location, nib active area status in digital ink route digital ink based on region flags Note that region ID decoding need not occur at the same rate as position decoding.

Note that decoding of a codeword can be avoided if the codeword is found to be identical to an already-known good codeword.

Netpage Pen

Functional Overview

The Netpage pen is a motion-sensing writing instrument which works in conjunction with a tagged Netpage surface (see Netpage Surface Coding and Netpage Surface Coding Security sections above). The pen incorporates a conventional ballpoint pen cartridge for marking the surface, a motion sensor for simultaneously capturing the absolute path of the pen on the surface, an identity sensor for simultaneously identifying the surface, a force sensor for simultaneously measuring the force exerted on the nib, and a real-time clock for simultaneously measuring the passage of time.

While in contact with a tagged surface, as indicated by the force sensor, the pen continuously images the surface region adjacent to the nib, and decodes the nearest tag in its field of view to determine both the identity of the surface, its own instantaneous position on the surface and the pose of the pen. The pen thus generates a stream of timestamped position samples relative to a particular surface, and transmits this stream to a Netpage server (see Netpage Architecture section in co-pending application Ser. No. 11/193,479). The sample stream describes a series of strokes, and is conventionally referred to as digital ink (DInk). Each stroke is delimited by a pen down and a pen up event, as detected by the force sensor.

The pen samples its position at a sufficiently high rate (nominally 100 Hz) to allow a Netpage server to accurately reproduce hand-drawn strokes, recognise handwritten text, and verify hand-written signatures.

The Netpage pen also supports hover mode in interactive applications. In hover mode the pen is not in contact with the paper and may be some small distance above the surface of the paper (or tablet etc.). This allows the position of the pen, including its height and pose to be reported. In the case of an interactive application the hover mode behaviour can be used to move the cursor without marking the paper, or the distance of the nib from the coded surface could be used for tool behaviour control, for example an air brush function.

The pen includes a Bluetooth radio transceiver for transmitting digital ink via a relay device to a Netpage server.

When operating offline from a Netpage server the pen buffers captured digital ink in non-volatile memory. When operating online to a Netpage server the pen transmits digital ink in real time.

The pen is supplied with a docking cradle or "pod". The pod contains a Bluetooth to USB relay. The pod is connected via a USB cable to a computer which provides communications support for local applications and access to Netpage services.

The pen is powered by a rechargeable battery. The battery is not accessible to or replaceable by the user. Power to charge the pen can be taken from the USB connection or from an external power adapter through the pod. The pen also has a power and USB-compatible data socket to allow it to be externally connected and powered while in use.

The pen cap serves the dual purpose of protecting the nib and the imaging optics when the cap is fitted and signalling the pen to leave a power-preserving state when uncapped.

Pen Form Factor

The overall weight (45 g), size and shape (159 mm×17 mm) of the Netpage pen fall within the conventional bounds of hand-held writing instruments.

Ergonomics and Layout

Figure 11:
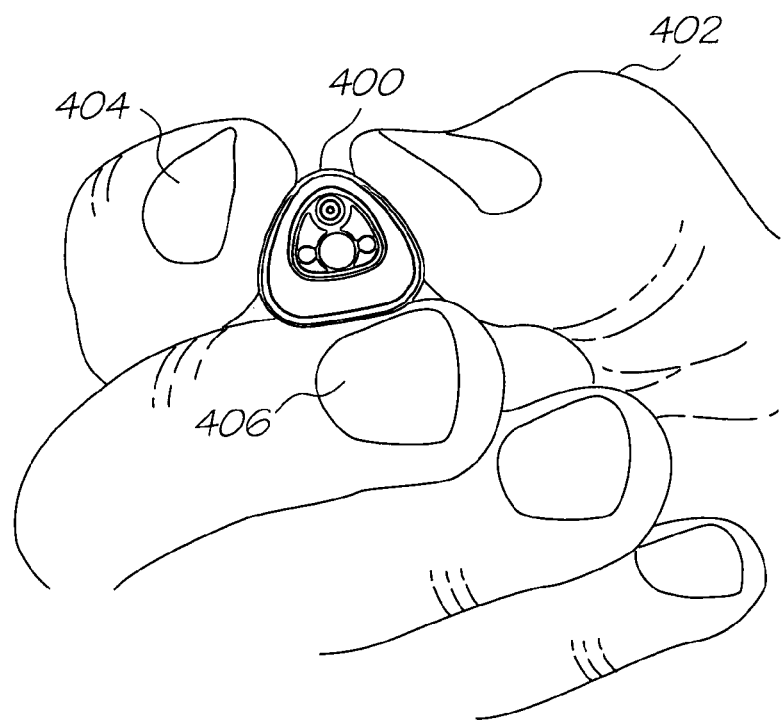
FIG. 11 shows a nib and elevation of the pen held by a user.

FIG. 11 shows a rounded triangular profile gives the pen 400 an ergonomically comfortable shape to grip and use the pen in the correct functional orientation. It is also a practical shape for accommodating the internal components. A normal pen-like grip naturally conforms to a triangular shape between thumb 402, index finger 404 and middle finger 406.

Figure 12:
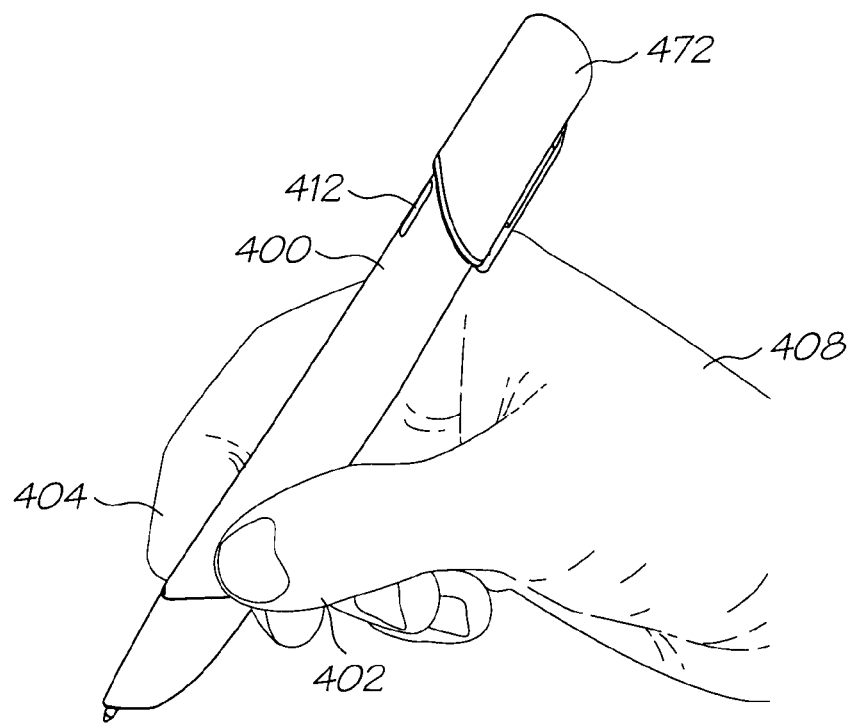
FIG. 12 shows the pen held by a user at a typical incline to a writing surface.

As shown in FIG. 12, a typical user writes with the pen 400 at a nominal pitch of about 30 degrees from the normal toward the hand 408 when held (positive angle) but seldom operates a pen at more than about 10 degrees of negative pitch (away from the hand). The range of pitch angles over which the pen 400 is able to image the pattern on the paper has been optimised for this asymmetric usage. The shape of the pen 400 helps to orient the pen correctly in the user's hand 408 and to discourage the user from using the pen "upside-down". The pen functions "upside-down" but the allowable tilt angle range is reduced.

The cap 410 is designed to fit over the top end of the pen 400, allowing it to be securely stowed while the pen is in use. Multi colour LEDs illuminate a status window 412 in the top edge (as in the apex of the rounded triangular cross section) of the pen 400 near its top end. The status window 412 remains un-obscured when the cap is stowed. A vibration motor is also included in the pen as a haptic feedback system (described in detail below).

Figure 13:
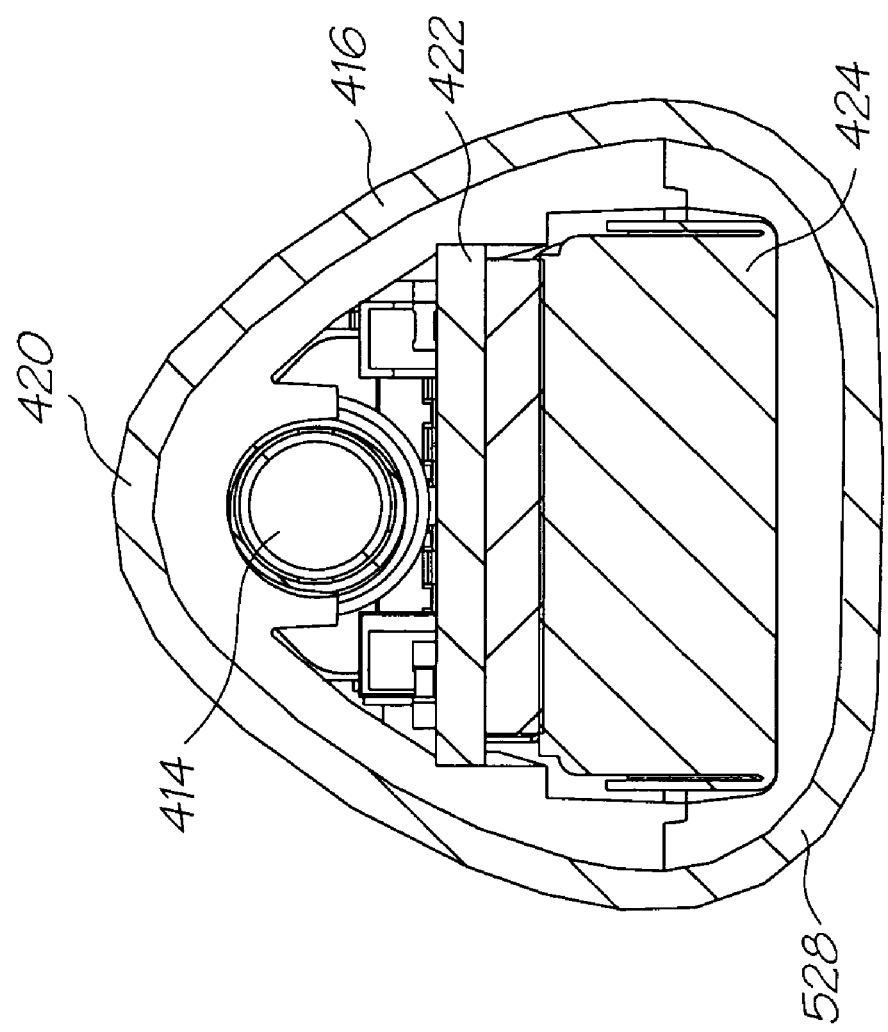
FIG. 13 is a lateral cross section through the pen.

As shown in FIG. 13, the grip portion of the pen has a hollow chassis molding 416 enclosed by a base molding 528 to house the other components. The ink cartridge 414 for the ball point nib (not shown) fits naturally into the apex 420 of the triangular cross section, placing it consistently with the user's grip. This in turn provides space for the main PCB 422 in the centre of the pen and for the battery 424 in the base of the pen. By referring to FIG. 14a, it can be seen that this also naturally places the tag-sensing optics 426 unobtrusively below the nib 418 (with respect to nominal pitch). The nib molding 428 of the pen 400 is swept back below the ink cartridge 414 to prevent contact between the nib molding 428 and the paper surface when the pen is operated at maximum pitch.

Figure 14:
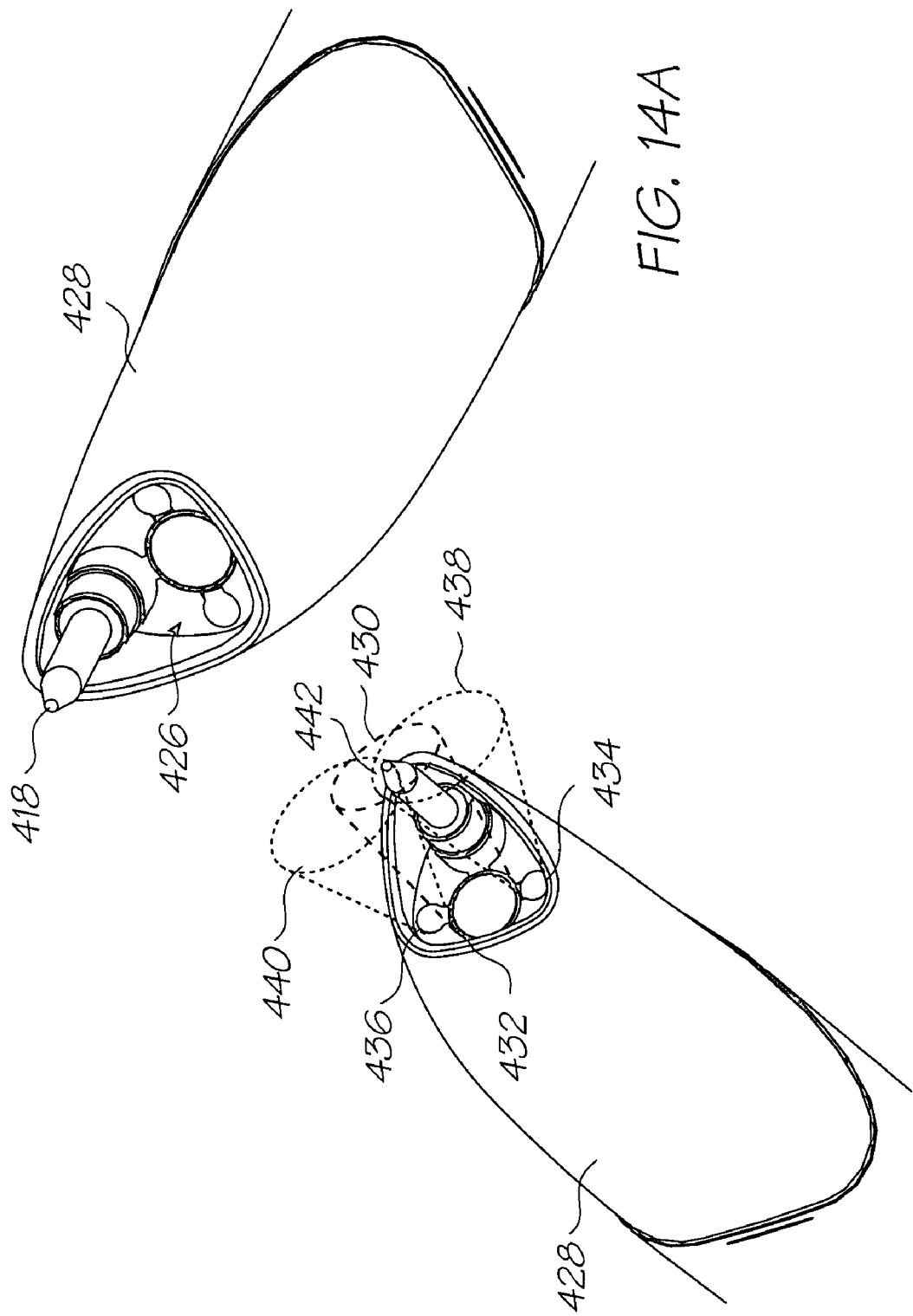
FIG. 14A is a bottom and nib end partial perspective of the pen.
FIG. 14B is a bottom and nib end partial perspective with the fields of illumination and field of view of the sensor window shown in dotted outline.

As best shown in FIG. 14b, the imaging field of view 430 emerges through a centrally positioned IR filter/window 432 below the nib 418, and two near-infrared illumination LEDs 434, 436 emerge from the two bottom corners of the nib molding 428. The use of two illumination LEDs 434, 436 ensures a more uniform illumination field 438, 440.

As the pen is hand-held, it may be held at an angle that causes reflections from one of the LED's that are detrimental to the image sensor. By providing more than one LED, the LED causing the offending reflections can be extinguished.

Pen Feedback Indications

Figure 17:
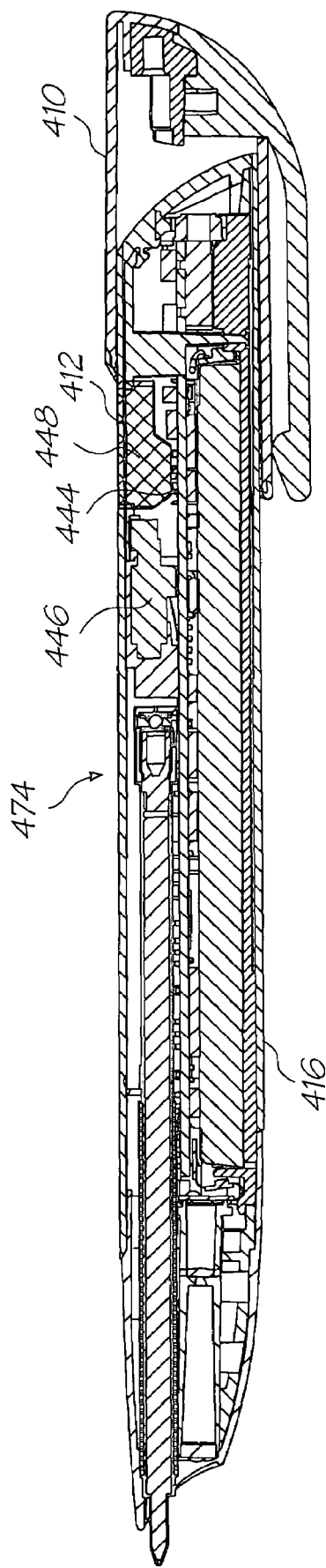
FIG. 17 is a longitudinal cross section of the pen.

FIG. 17 is a longitudinal cross section through the centre-line if the pen 400 (with the cap 410 stowed on the end of the pen). The pen incorporates red and green LEDs 444 to indicate several states, using colours and intensity modulation. A light pipe 448 on the LEDs 444 transmit the signal to the status indicator window 412 in the tube molding 416. These signal status information to the user including power-on, battery level, untransmitted digital ink, network connection on-line, fault or error with an action.

A vibration motor 446 is used to haptically convey information to the user for important verification functions during transactions. This system is used for important interactive indications that might be missed due to inattention to the LED indicators 444 or high levels of ambient light. The haptic system indicates to the user when:

The pen wakes from standby mode
There is an error with an action
To acknowledge a transaction

Pod Feedback Indications

Figure 31:
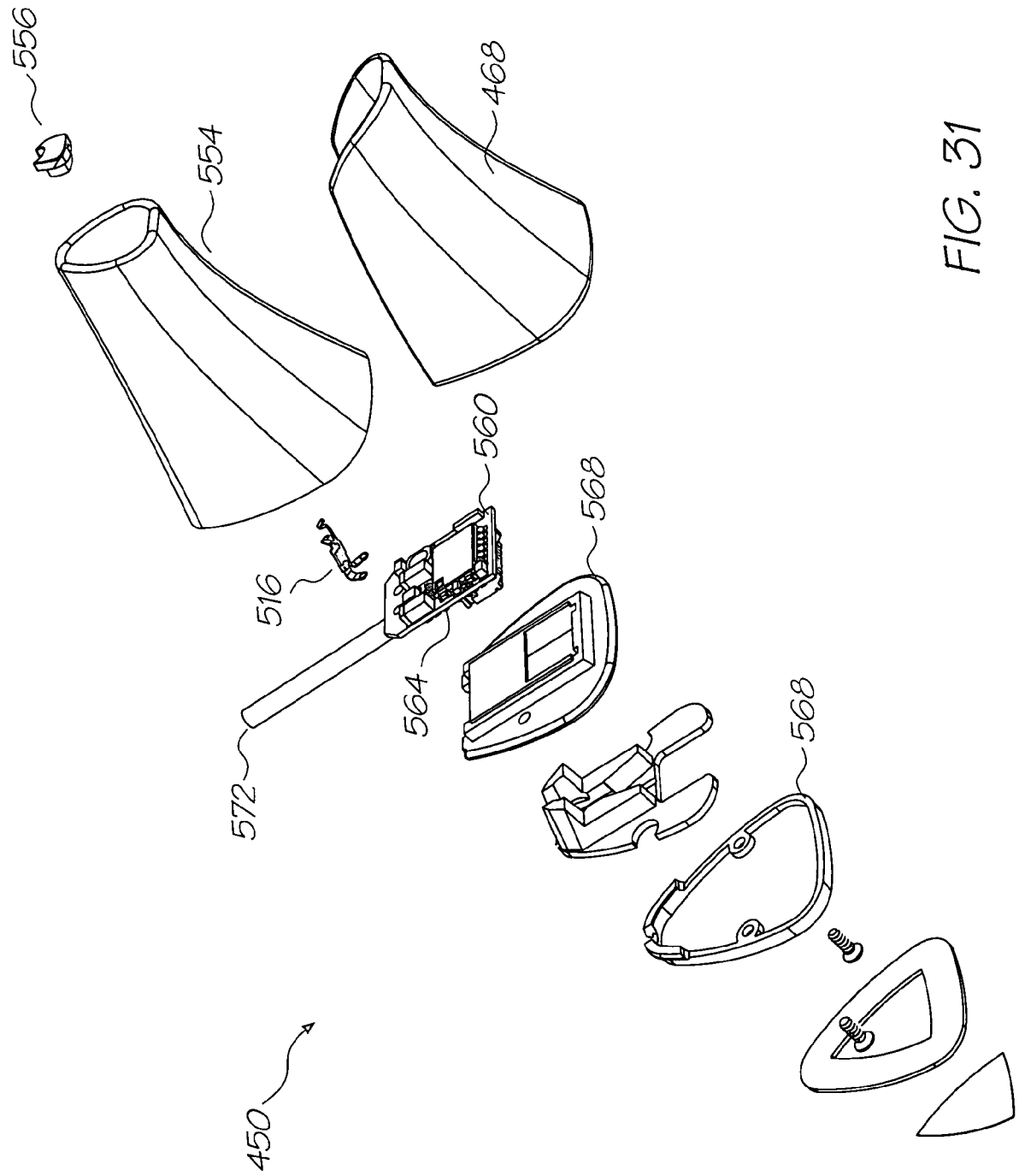
FIG. 31 is an exploded perspective of the pad.
Figure 32:
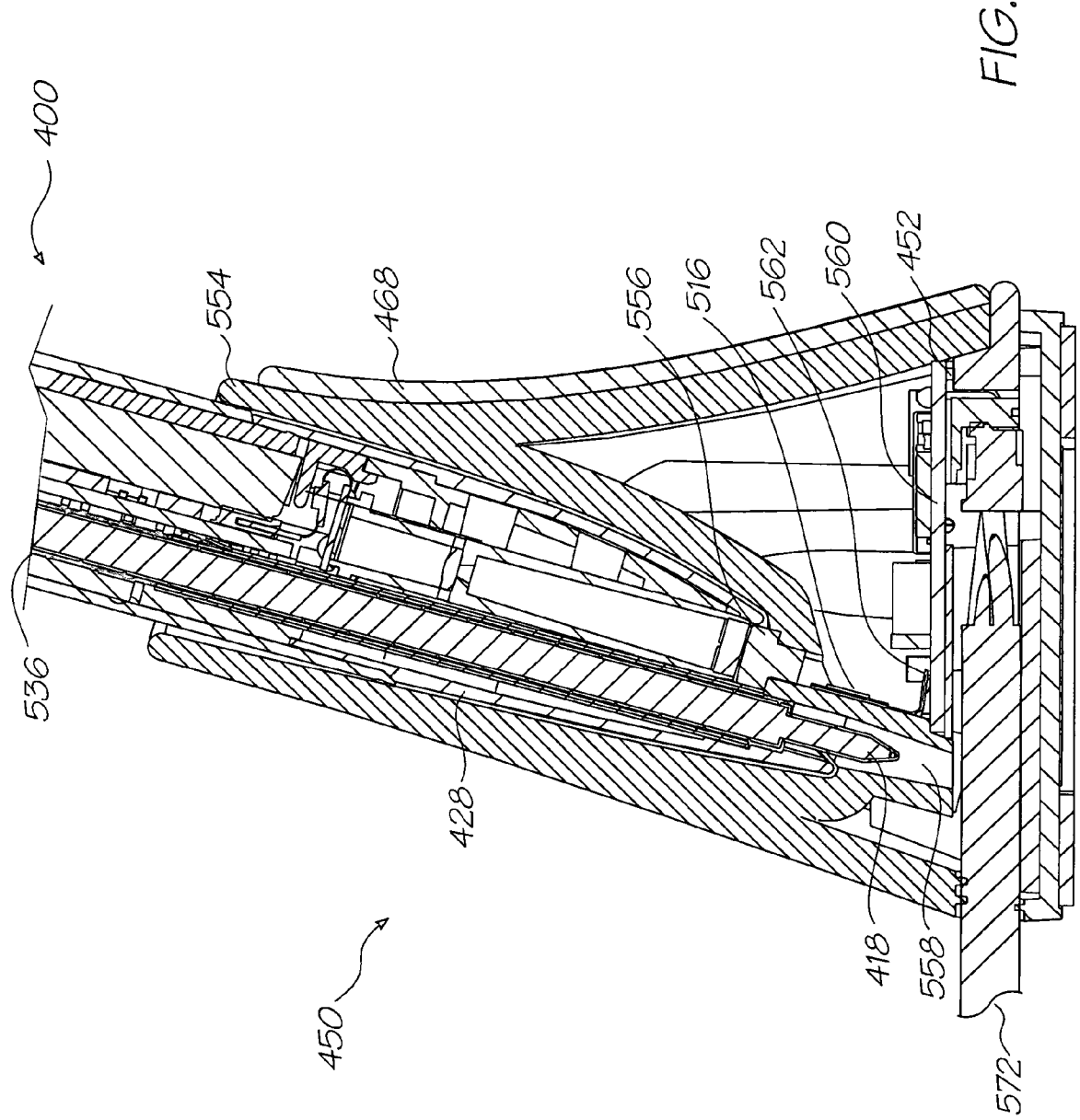
FIG. 32 is a longitudinal cross section of the pad with the pen inserted.

Turning briefly to the recharging pod 450 shown in FIGS. 31 and 32, red and green LEDs 452 to indicate various states using colours and intensity modulation. The light from the LEDs is transmitted to the exterior of the pod via the polymer light pipe molding 454. These signal status information to the user including charging state, and untransmitted digital ink by illuminating/pulsating one LEDs 452 at a time.

Features and Accessories

Figure 15:
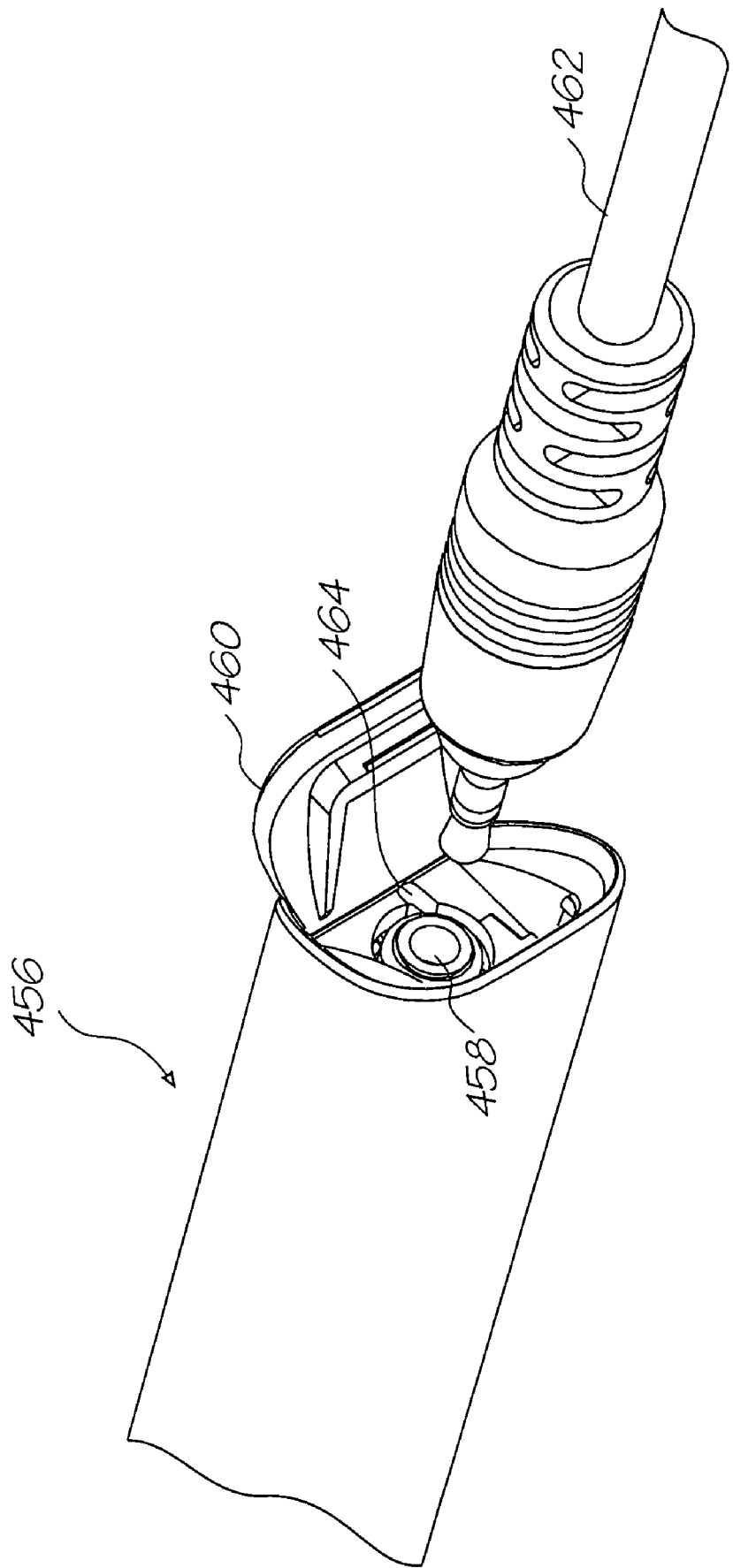
FIG. 15 is a partial perspective of the USB cable and USB socket in the top end of the pen.

As shown in FIG. 15, the pen has a power and data socket 458 is located in the top end 456 of the pen, hidden and moisture-sealed behind an elastomeric end-cap 460. The end-cap can be prised open to give access to the socket 458 and reset switch (at the bottom of recess 464) and remains open while the cable 462 is in use. The USB power and data cable 462 allows the pen to be used for periods that exceed the battery life.

The usual method of charging the pen 400 is via the charging pod 450 shown in FIGS. 31 and 32. As will be described in greater detail below, the pod 450 includes a Bluetooth transceiver connected by USB to a computer and several LEDs to indicate for charging status. The pod is compact to minimise its desktop footprint, and has a weighted base for stability. Data transfer occurs between the pen and the pod via a Bluetooth radio link.

Market Differentiation

Digital mobile products and quality pens are usually considered as personal items. This pen product is used by both genders from 5 years upwards for personal, educational and business use, so many markets have to be catered for. The pen design allows for substantial user customisation of the external appearance of the pen 400 and the pod 450 by having user changeable parts, namely the cap 410, an outer tube molding 466 (best shown in FIGS. 16 and 49) and the pod jacket 468 (best shown in FIGS. 31 and 32). These parts are aquagraphic printed (a water based transfer system) to produce a variety of high quality graphic images and textures over all surfaces of these parts. These parts are accessories to the pen, allowing the user to change the appearance whenever they wish. A number of licensed images provide enhancers for the sale of accessories as an additional business model, similar to the practice with mobile phone covers.

Pen Mechanical Design

Parts and Assemblies

Figure 16:
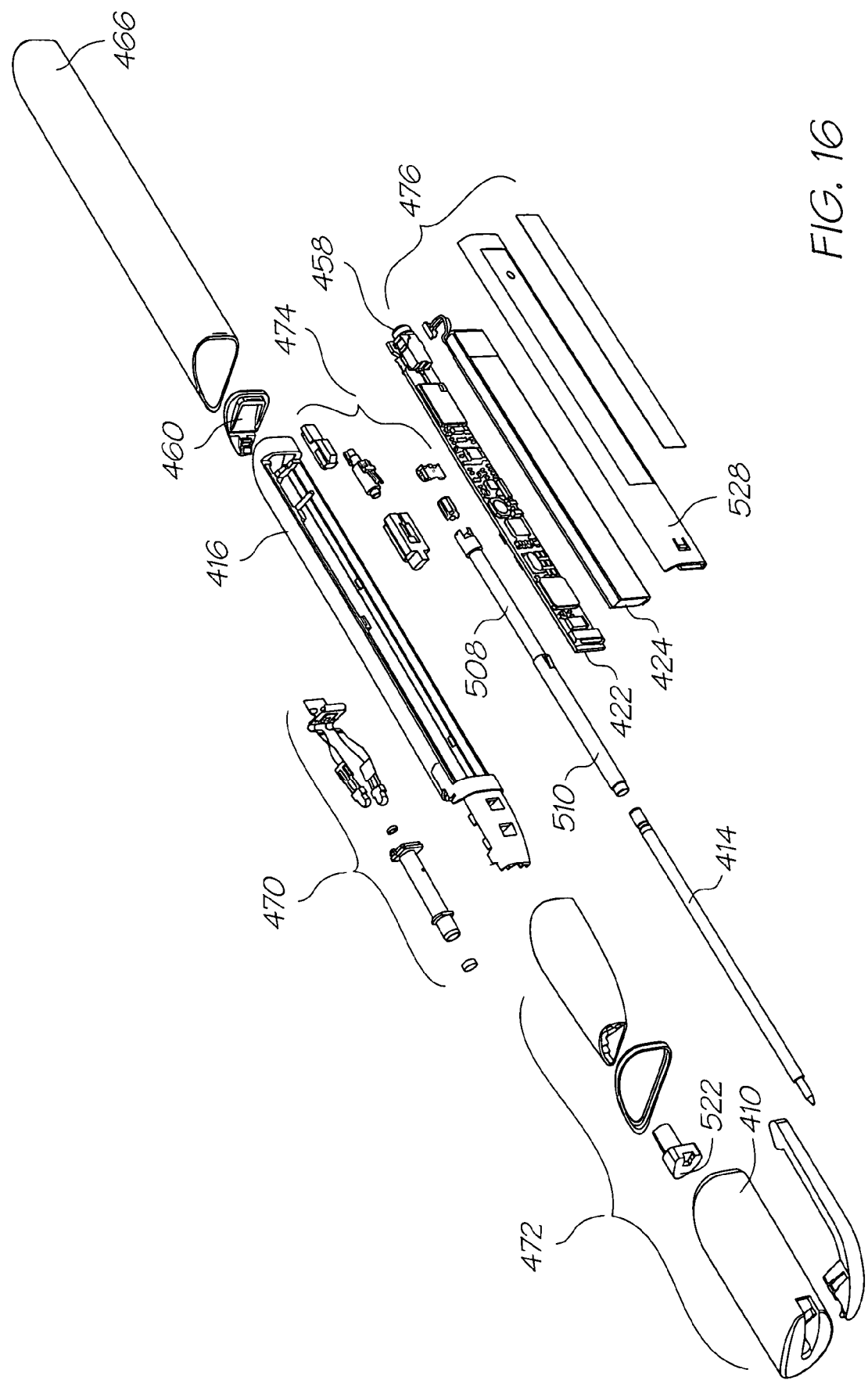
FIG. 16 is an exploded perspective of the pen components.

Referring to FIG. 16, the pen 400 has been designed as a high volume product and has four major sub-assemblies:

an optical assembly 470;
a force sensing assembly 474;
a cap assembly 472; and,
the main assembly 476, which holds the main PCB 422 and battery 424.

Wherever possible, moldings have been designed as line-of-draw to reduce cost and promote longevity in the tooling.

These assemblies and the other major parts can be identified in FIG. 17. As the form factor of the pen is to be as small as possible these parts are packed as closely as practical. The electrical components in the upper part of the pen, namely the force sensor assembly 474 and the vibration motor 446 all have sprung contacts (512 of FIG. 24 and 480 of FIG. 62A respectively) directly mating with contact pads 482 and 484 respectively (see FIG. 64) on the PCB 422. This eliminates the need for connectors and also decouples these parts from putting any stress onto the main PCB.

Although certain individual molded parts are thin walled (0.8 to 1.2 mm) the combination of these moldings creates a strong structure. The pen is designed not to be user serviceable and therefore has a cold stake under the exterior label to prevent user entry. Non-conducting plastics moldings are used wherever possible to allow an omnidirectional beam pattern to be formed by the Bluetooth radio antenna 486 (see FIG. 64).

Optics Assembly

Figure 18:
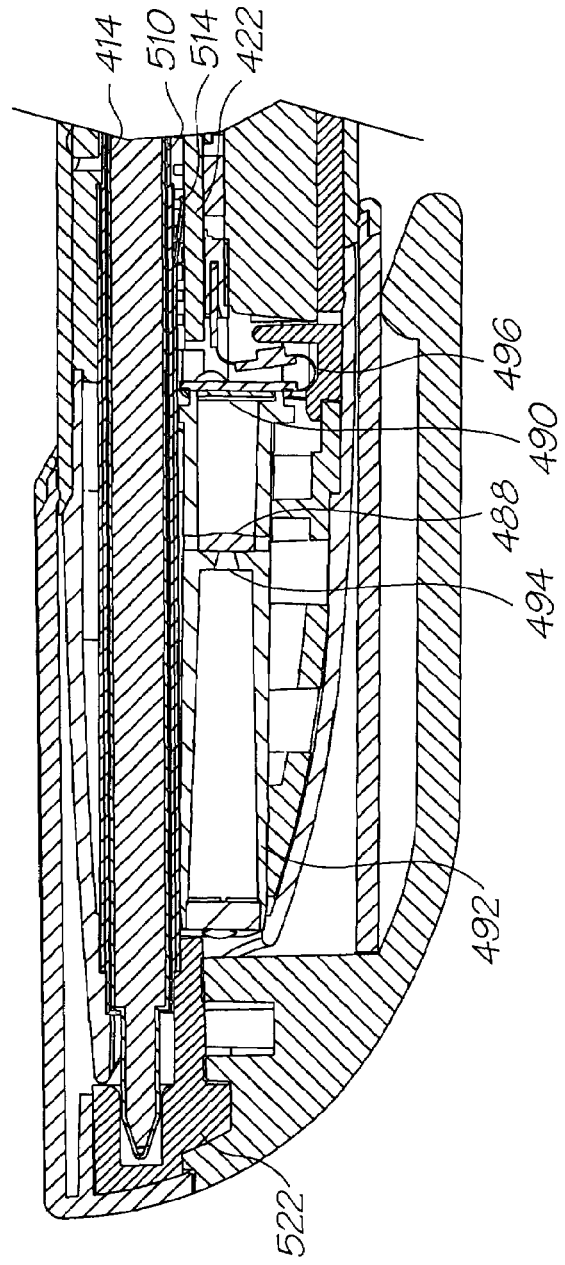
FIG. 18 is a partial longitudinal cross section of the cap placed over the nib end of the pen.
Figure 19:
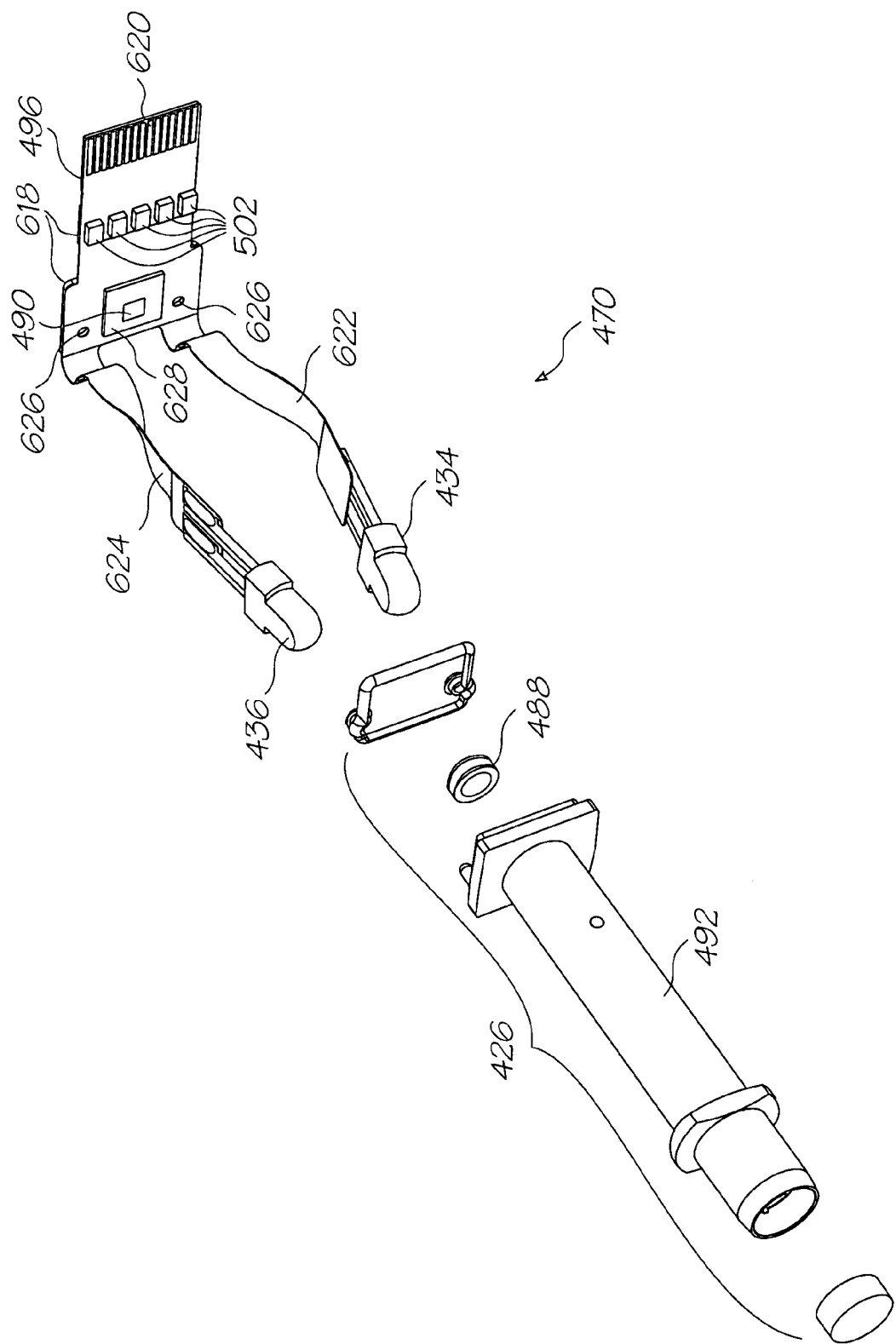
FIG. 19 is an exploded perspective of the optics assembly.

The major components of the optical assembly are as shown in FIGS. 18 and 19. The axial alignment of the lens 488 to the image sensor 490 is toleranced to be better than 50 µm to minimise blur at the image. The barrel molding 492 is therefore has high precision with tight tolerancing. It has a molded-in aperture 494 near the image sensor 490, which provides the location for the lens 488. As the effect of thermal expansion is very small on a molding this size, it is not necessary to use a more expensive material.

The flex PCB 496 mounts two infrared LEDs 434 and 436, a wire bonded Chip-on-Flex image sensor 490 and some chip capacitors 502. The flex PCB 496 is 75 micron thick polyimide, which allows the two infrared LEDs 434 and 436 to be manipulated. Stiffeners are required in certain areas on the flex as backing for the attached components. The flex PCB 496 is laser cut to provide accuracy for mounting onto the barrel molding 492 and fine pitch connector alignment.

Force Sensing Assembly and Ink Cartridge

FIGS. 20, 23, 24 and 64 show the components and installation of the force sensing assembly. The force sensing assembly 474 is designed to accurately measure force put on the ink cartridge 414 during use. It is specified to sense between 0 and 500 grams force with enough fidelity to support handwriting recognition in the Netpage services. This captive assembly has two coaxial conductive metal tubes 498, a retainer spring 504 and a packaged force sensor 500.

Conductive Metal Tube

The conductive metal tubes 498 has an insert molded insulation layer 506 between two metal tubes (inner tube 508 and outer tube 510), which each have a sprung gold plated contact finger (512 and 514 respectively). Power for charging the battery is provided by two contacts 516 (see FIG. 31) in the charging pod 450 and is conducted by these two tubes directly to recharging contacts 518 and 520 (see FIG. 64) on the main PCB 422, via a spring contact (512 and 514 respectively) on each tube.

When the pen cap assembly 472 is placed on the front of the pen 400, a conductive elastomeric molding in the pen cap mates with the ends of both concentric tubes in the conductive metal tube part, completing the circuit and signalling the cap presence to the pen electronics (see FIG. 18).

Force Sensor Operating Principles

Figure 33:
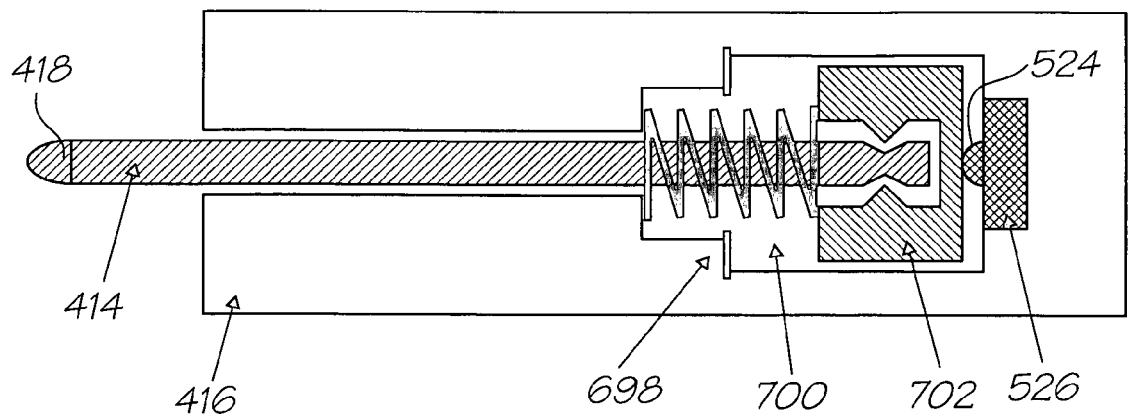
FIG. 33 is a schematic representation of the force sensor assembly.

FIG. 33 schematically illustrates the operation of the force sensing assembly 474. The spring 700 applies a pre-load to the force sensor IC 526 (via a ball bearing 524) before the cartridge 414 is subject to any force at the nib 418. The cartridge 414 itself is not pushed against the force sensor as it passes through the spring. Instead, the spring pushes a boot 702 against the force sensor, and the boot is coupled to the end of the cartridge. The boot 702 is a compromise between allowing easy manual insertion and removal of cartridge 414, and ensuring the cartridge is held securely without travel. The use of a boot 702 also allows the inclusion of a stop surface 698. The stop limits the travel of the boot 702 thereby protecting the spring 700 from overload.

Packaged Force Sensor

Figure 62B:
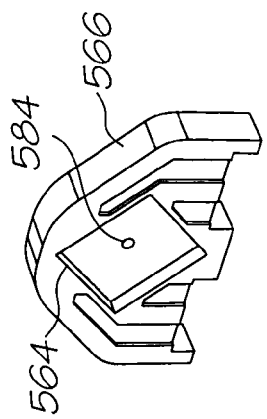
FIGS. 62A to 62E show the various components of the packaged force sensor.
Figure 62E:
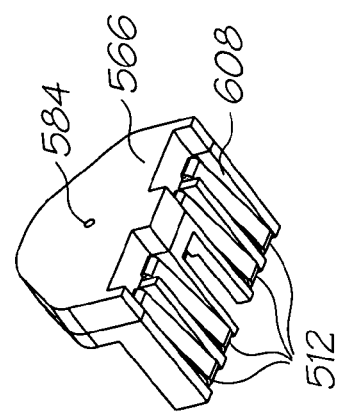
Figure 62A:
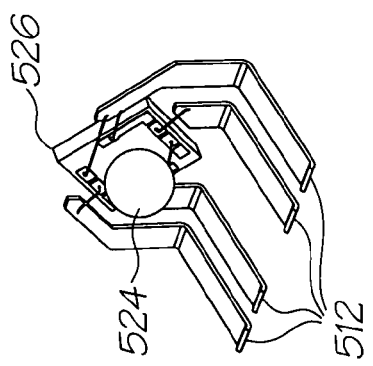
Figure 62D:
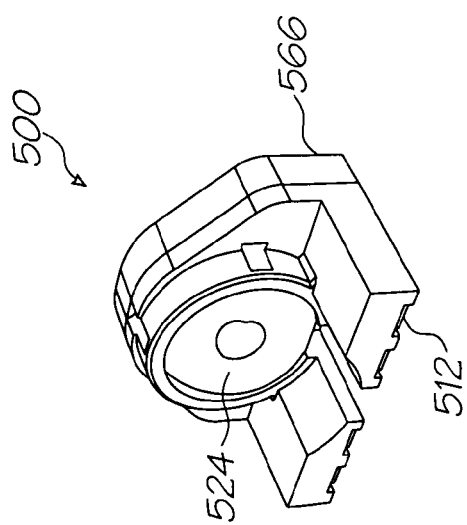
Figure 62C:
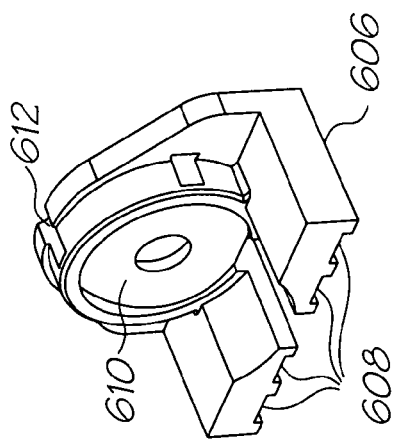

FIGS. 62A to 62E are perspectives of the various components of the packaged force sensor 500. FIG. 62A shows a steel ball 524 protruding from the front of a sensor IC (chip) 526. The ball 524 is the point contact used to transmit force directly to the chip. Wire bonds 604 connect the chip 526 to the spring contacts 478. The chip sits in the recess 564 formed in the rear molding 566 shown in FIG. 62B. A pressure relief vent 584 in the base of the recess 564 allows air trapped by the chip 526 to escape. The front molding 606 shown in FIG. 62C, has slots 608 in its underside for the sprung contacts 478 and a central aperture 610 to hold the ball 524. Location details 612 mate with corresponding details in the coaxial conductive tubes 498 as shown in FIG. 24.

As there is only 10 microns full span movement in this system, the mounting of this assembly in the pen and use of axial preload is tightly toleranced. The force sensing assembly is mounted in the top of the pen so that it can only stress the pen chassis molding 416 (see FIG. 16), and force will not be transmitted to the main PCB 422. The force sensor is a push fit onto the end of the inner conductive metal tube 508 also trapping the retainer spring 504, which makes a simple dedicated assembly 500.

Retainer Spring

Figure 20:
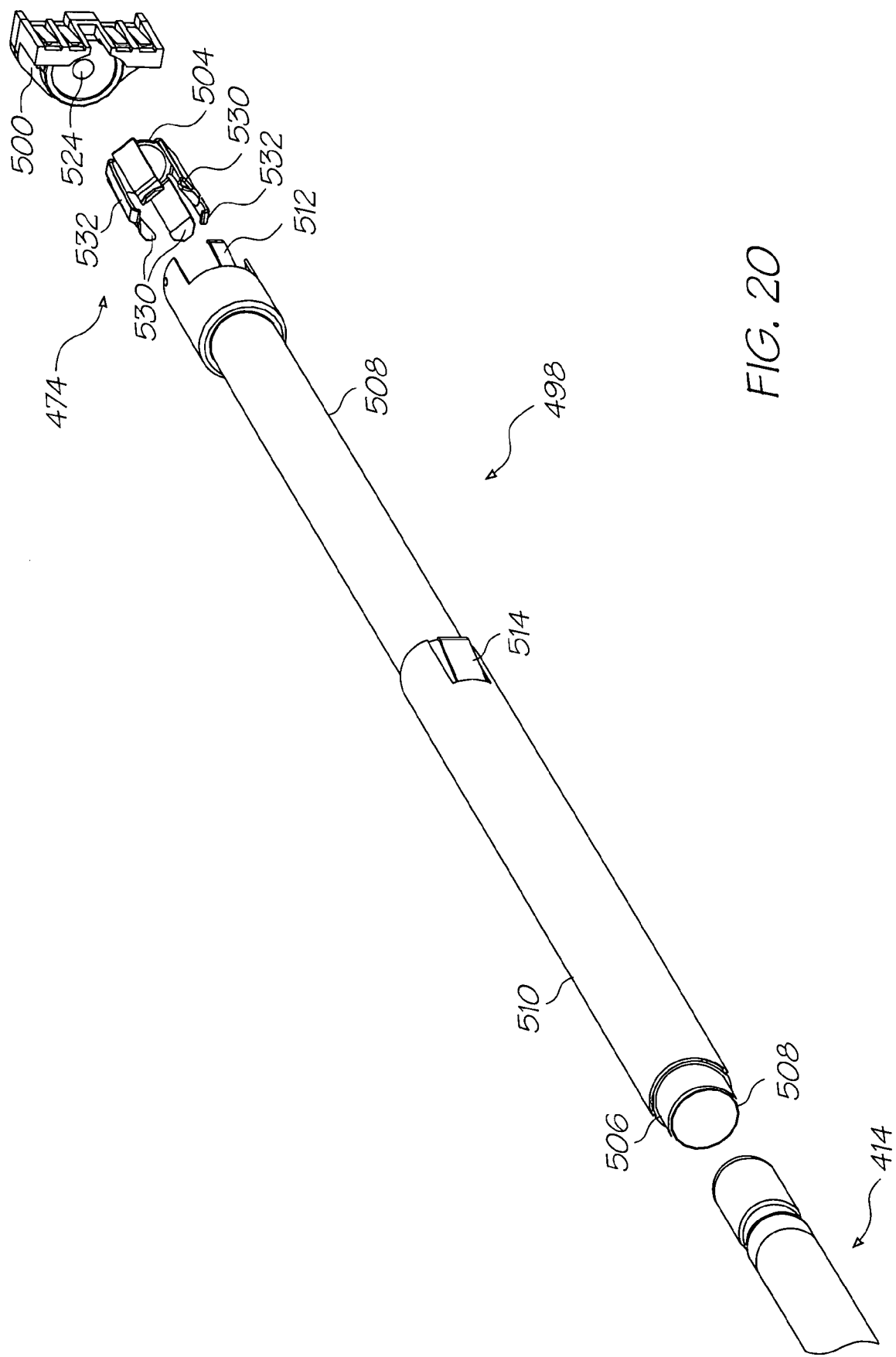
FIG. 20 is an exploded perspective of the force sensor assembly.
Figure 24:
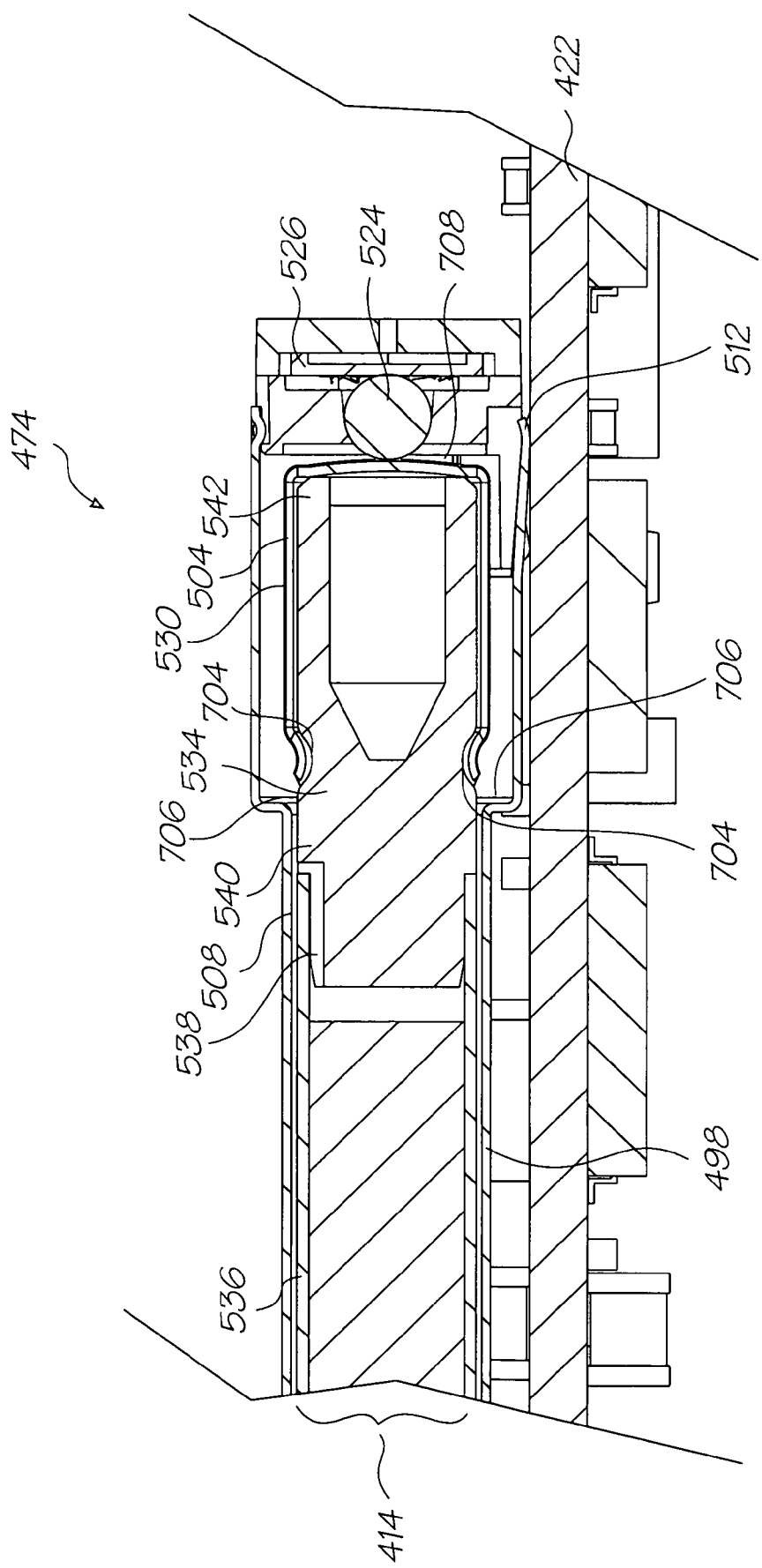
FIG. 24 is a longitudinal cross section of the force sensor and main PCB shown in FIG. 15.

Turning to FIGS. 20 and 24, the retainer spring 504 is the equivalent to the boot 702 described in FIG. 33. It is a high precision stamping out of thin sheet metal with an insulating layer 708 at the point where it contacts the ball 524. This inhibits electrical interference with the force sensor IC 526 caused by external electrostatic discharge via the ink cartridge 414. The metal retainer spring 504 is formed into four gripping arms 530 and two spring arms 532. A spent cartridge removal tool 534 is secured to the open end of the cartridge 414 with an interference fit. The gripping arms 530 grip a complementary external grip profile 704 on the removal tool 534. The spring arms 532 extend beyond the end of gripping arms 530 to press against the stepped section 706 in the coaxial tube assembly 498. This in turn pushes insulated base 708 against the ball 524 to put an accurate axial preload force of between 10 and 20 grams onto the force sensor.

Ink Cartridge

The pen ink cartridge 414 is best shown in FIGS. 21A and 21B. Research shows that industry practice is for the ballpoint nib 418 to be made by one source and the metal tube 536 to be made by another, along with assembly and filling. There are no front loading standard ink cartridges that meet the design capacity and form factor requirements so a custom cartridge has been developed. This ink cartridge 414 has a 3 mm diameter tube 536 with a standard ballpoint nib inserted. The spent cartridge removal tool 534 is a custom end molding that caps the open end of the metal tube 536.

The removal tool 536 contains an air vent 538 for ink flow, a location detail 540 and a co-molded elastomeric ring 542 around a recess 544 detail used for extracting the spent ink cartridge. The tool is levered down to engage the nib of the old cartridge and then drawn out through the nib end of the pen as shown in FIG. 21B. The elastomer ring 542 reduces the possibility that a hard shock could damage the force sensor if the pen is dropped onto a hard surface.

The location detail 540 allows the ink cartridge 414 to accurately seat into the retainer spring 504 in the force sensing assembly 474 and to be preloaded against the force sensor 500. The removal tool (apart from the co-molded elastomeric ring) is made out of a hard plastic such as acetal and can be molded in color to match the ink contents.

The ink capacity is 5 ml giving an expected write-out length comparable with standard ballpoint ink cartridges. This capacity means that refill cycles will be relatively infrequent during the lifetime of the pen.

Force Sensing Method

Pressing the nib 418 against a surface will transfer the force to the ball 524 via the gripping arms 530. The force from the nib adds to the preload force from the spring arms 532. The force sensor is a push fit into the end of the coaxial tube assembly 498 and both directly connect to the PCB with spring contacts (478 and 512 respectively).

FIG. 24 shows the limited space available for an axial force sensor, hence a packaged design is required as off-the-shelf items have no chance of fitting in this space envelope in the required configuration.

This force sensing arrangement detects the axial force applied to the cartridge 414, which is the simplest and most accurate solution. There is negligible friction in the system as the cartridge contacts only on two points, one at either end of the conductive metal barrel 498. The metal retainer spring 504 will produce an accurate preload force up to 20 grams onto the force sensor 500. This is seen to be a reliable system over time, as the main parts are metal and therefore will not suffer from creep, wear or stiction during the lifetime of the pen.

This design also isolates the applied force by directing it onto the packaged force sensor, which pushes against the solid seat in the chassis molding 416 of the pen. This allows the force sensing assembly 474 to float above the main PCB 422 (so as not to put strain on it) whilst transmitting data via the spring contacts 478 at the base of the packaged force sensor 500. The resulting assembly fits neatly into the pen chassis molding 416 and is easy to hand assemble.

Top/Side Loading Cartridge

As discussed above, the pen will require periodic replacement of the ink cartridge during its lifetime. While the front loading ink cartridge system is convenient for users, it can have some disadvantages. Front loading limits the capacity of the ink reservoir in the cartridge, since the diameter of the cartridge along its full length is limited to the minimum cartridge diameter, as dictated by the constraints of the pen nose.

The cartridge 414 must be pushed against the force sensor IC 526 (via the steel ball 524) by a pre-load spring 700 (see FIG. 33). However, the cartridge 414 itself does not provide the face against which the spring pushes, since the cartridge must pass through the spring. This necessitates the boot 702 or retaining spring 504 discussed above. The boot is necessarily a compromise between allowing easy manual insertion and removal of cartridge, and ensuring the cartridge is held securely without travel.

Figure 34:
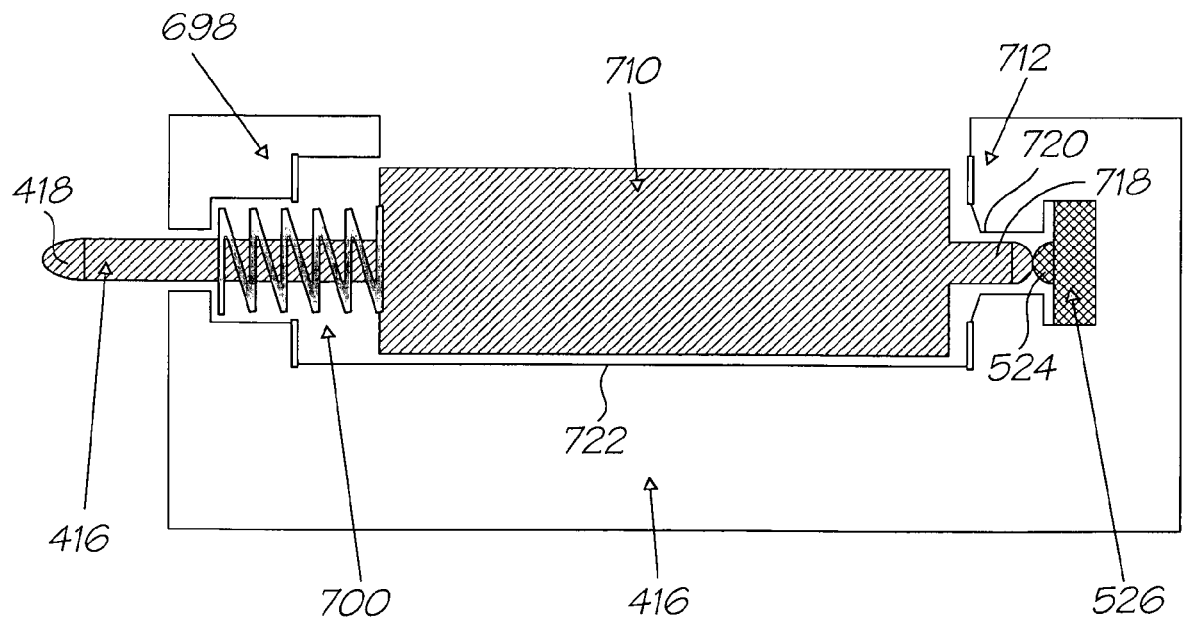
FIG. 34 is a schematic representation of a top-loading ink cartridge and force sensor.

A 'top-loading' cartridge, as illustrated in FIG. 34, can overcome these disadvantages. It will be appreciated that 'top loading' is a reference to insertion of the cartridge from a direction transverse to the longitudinal axis of the pen. Because of the other components within the pen, it is most convenient to insert the cartridge from the 'top' or apex 420 of the pen's substantially triangular cross section (see FIG. 13).

The pre-load spring 700 can be placed toward the nib 418 of the cartridge 414, thus providing a convenient mechanism for seating the cartridge against the force sensor ball 524 after insertion. A cartridge travel stop 712 is formed on the chassis molding 416 to prevent overloading the force sensor 526. Since the cartridge itself provides the face against which the pre-load spring pushes, the boot is eliminated and the cartridge couples directly with the force sensor.

As the cartridge is no longer constrained to a single diameter along its full length, its central section can be wider and accommodate a much larger ink reservoir 710.

The currently proposed pen design has an internal chassis 416 and an external tube molding 466. The external molding 466 is user replaceable, allowing the user to customise the pen 400. Removing the external molding 466 also provides the user with access to the pen's product label 652 (see FIG. 71). Skilled workers in this field will appreciate that the chassis molding 416 and the base molding 528 could be modified to provide the user with access to a replaceable battery.

Referring again to FIG. 34, removing the external molding 466 (not shown) can also provide the user with access to the top-loading pen cartridge 414. Once the external molding is removed, most of the length of the pen cartridge 414 is exposed. The user removes the cartridge by sliding it forwards against the pre-load spring 700 to extract its tail 718 from the force sensor aperture 720, then tilting it upwards to free the tail 718 from the cartridge cavity 722, and finally withdrawing the cartridge 710 from the pre-load spring 700 and cavity 722. The user inserts a new cartridge by following the same procedure in reverse.

Since a top-loading cartridge can have a much greater capacity than a front-loading cartridge, it is not unreasonable to require the user to remove the external molding 466 to replace the cartridge 414, since the user will have to replace a top-loading cartridge much less often than a front-loading cartridge.

Figure 35:
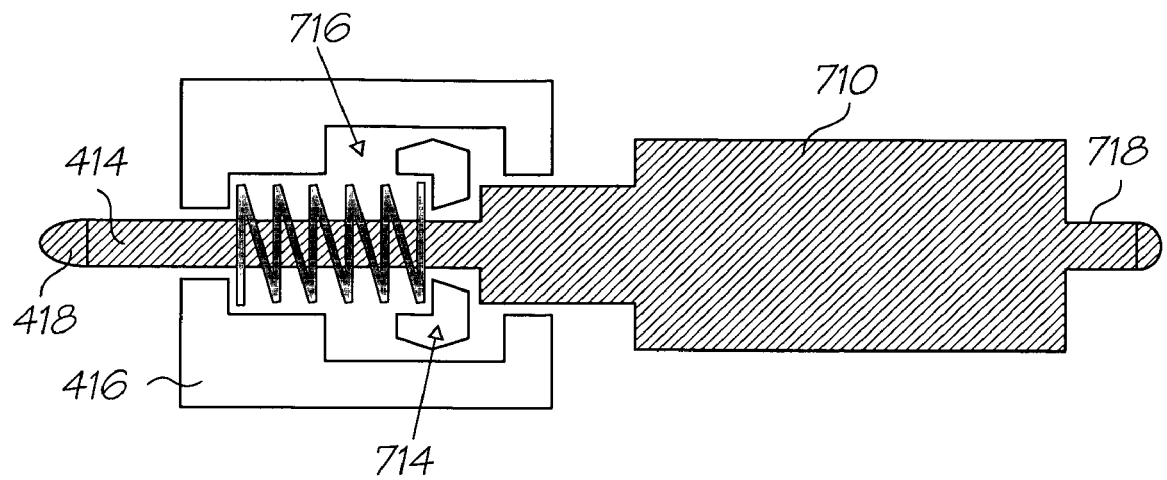
FIG. 35 is a schematic representation of a top loading ink cartridge into a pen with a retaining cavity for the pre-load spring.

Referring to FIG. 35, the pre-load spring 700 can be provided with its own cavity 716 and retaining ring 714 to make it easier to insert the cartridge 414.

Force Re-Directing Couplings

The force sensor 526 is ideally mounted perpendicularly to the pen cartridge 414, as illustrated in FIG. 33. This allows direct coupling between the pen cartridge and the force sensor. This coupling is somewhat independent of whether there is an intermediate boot 702 or not, as discussed above in relation to the side loading cartridge. To fit within the constrained space of the pen's tubular moulding 466, it can be advantageous to mount the force sensor 526 in any desired position relative to the cartridge 414. This involves re-directing at least part of the contact force being transferred along the cartridge 414.

A suitable force sensor 526 for the pen is a silicon piezoresistive bridge force sensor, such as manufactured by Hokuriku (see Hokuriku, *Force Sensor HFD*-500, http://www.hdk.co.jp/pdf/eng/e1381AA.pdf for details). The invention will be illustrated with reference to this force sensor. However it will be appreciated that many other force sensors are also suitable.

Figure 36:
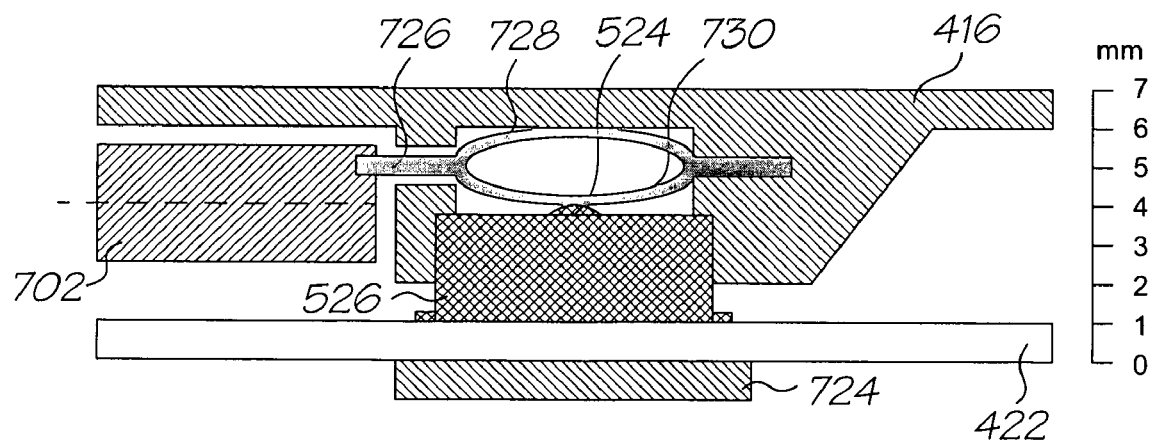
FIG. 36 is a schematic representation of a double-bow right-angle force sensor coupling.
Figure 42:
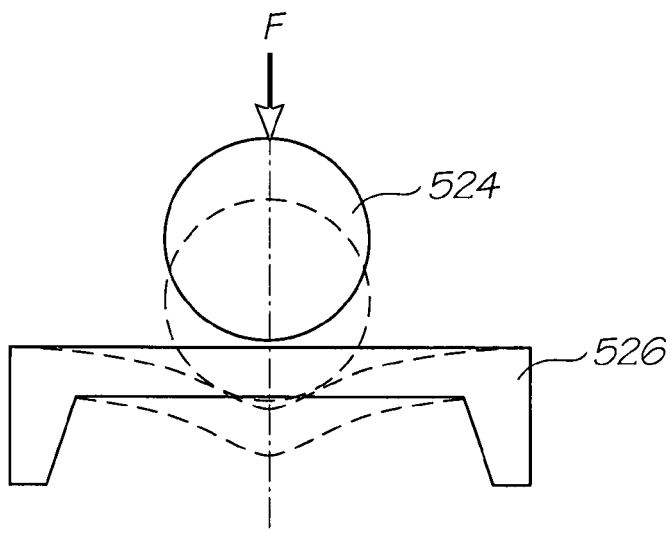
FIG. 42 is a schematic section view of the force sensor chip deflection profile.
Figure 43:
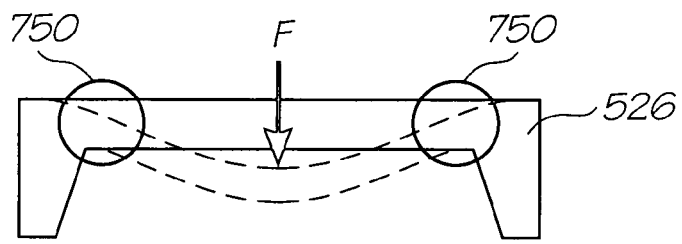
FIG. 43 is a schematic section view of the pressure sensor chip deflection profile.

As shown in FIG. 36, the standard Hokuriku force sensor package measures 5.2 mm wide by 7.0 mm long (or 8.0 mm with leads) by about 3 mm thick. This thickness includes the ball 524, which protrudes 150-200 microns. The headroom above the PCB 422 in the embodiment shown is just over 5 mm. The pen cartridge axis extends centrally through the boot 702 and is just under 3 mm above the PCB 422. It is therefore possible to mount the standard Hokuriku force sensor package 526 on the PCB 422, either longitudinally (see FIGS. 37A and 37B) or possibly laterally (see FIG. 38), and provide an off-axis coupling mechanism between the pen cartridge 418 and the force sensor 526.

FIG. 36 shows a force transfer element in the form of a double-bow coupling piece 726 between the cartridge 414 and the force sensor 526. The lower, or force transfer bow 730 expands downwards when subject to force from the cartridge via the boot 702. The force is transmitted through a right angle, providing the required coupling between the cartridge 414 and the force sensor 526 mounted on the PCB 422. Each bow 728 and 730 is formed from a flexible sheet. The edges of each sheet are curved to minimize friction with the walls of the cavity.

The double-bow design acts as a centralizer, preventing the cartridge 414 from moving upwards when force is applied, and eliminating an area of friction. The top of the upper bow 728 can be pinned, if necessary, to eliminate another point of friction (or the cavity itself can provide a curved ridge contact). Friction between the force transfer bow 730 and the ball 524 of the force sensor 526 is small because the curvature of the ball minimizes the contact area.

The force sensor 526 mates with a recess in the chassis moulding 416 to form the cavity in which the double-bow coupling piece 726 operates.

The pen cartridge 414 or the boot 702 necessarily engages with the coupling piece 726 above the axis of the cartridge 414, since it is impractical to align the two while efficiently utilizing the available space. However, because the ratio of the length of the cartridge to its diameter is large, negligible torsion is induced by this off-axis coupling. As discussed above, the centralizing function of the double-bow design minimizes friction.

The double bow coupling piece 726 can be thought of as having two spring constants. When unconstrained by the cavity, the double bow can act as a reasonably soft spring. It should be soft enough to guarantee that it expands to fill the cavity when subjected to the force of the preload spring. The softness will also be a function of the manufacturing tolerances of both the cavity and the double-bow coupling piece 726. When the top bow 728 is constrained by the cavity, the double bow coupling piece 726 can act as a very stiff spring. It should be stiff enough to avoid resonant frequencies which overlap frequencies of interest in the real force signal.

The force sensor 526 shown in FIGS. 20, 24 and 63A to 63E is mounted in the chassis moulding 416, and makes electrical contact with the PCB 422 via a set of sprung leads. This prevents force being transmitted to solder joints between the force sensor 526 and the PCB 422, and to the PCB itself By contrast, in this aspect of the invention, the force sensor 526 is mounted flush with the PCB 422 and is therefore ideally soldered to it. Furthermore, the force sensor 526 must be securely attached to the chassis moulding 416 because it will be subject to a force pushing it away from the moulding.

To make this practical, the PCB 422 can be securely attached to the chassis moulding 416 via a set of clips formed in the chassis moulding 416 and extending below the PCB 422. Pins can also be provided as part of the chassis moulding 416, to penetrate and anchor the PCB 422. The PCB 422 can then float within the tubular body 466, with its main anchor point being in the centre of the pen, at the location of the force sensor 526.

The embodiments shown in FIGS. 37A to 50, re-direct the force (at least partially) from the cartridge or boot 702, to the sensor 526, via a hydraulic coupling. As with the double bow coupling, this allows the force sensor to be positioned conveniently within the constraints of the pen body, and addresses other problems such as damage from the deceleration shock when the pen is tapped or dropped, and a relatively undamped transient response which limits the available sensor bandwidth.

The general layout of the design is shown in FIGS. 37A, 37B and 38 using the Hokuriku HFD-500 force sensor discussed above in relation to the double bow coupling. As previously mentioned, other high range pressure sensors are also suitable. The sensor 526 can be used with or without the ball bearing 524. The PCB 422 needs to float on its mounts so that the end stop behind the over-mould 734 brings all the axial pen force onto the pen chassis (not shown) rather than the surface-mount connection to the PCB 422.

FIGS. 39A and 39B show the hydraulic coupling in more detail. The ink cartridge 418 has a nib at its distal end and a boot 702 at the opposite end. The boot pushes a plunger 732 onto a membrane or gel surface 742 through an aperture in the over moulded package 734. The increased pressure in the hydraulic fluid or gel 736 acts on the ball bearing 524 of the force sensor 526. The output signal from the sensor 526 is transmitted directly to contacts on the PCB 422 via pins 740.

The action of the input force F on the force sensor is schematically shown in FIGS. 40 and 41. It will be appreciated that these sketches are simplified and without the right-angle bend. The right angle in the fluid path has no effect on the fluid at low flow rates.

FIG. 40 represents the situation with an unmodified Hokuriku sensor 526. The ball 524 acts as a piston, approximately, as its cross-sectional area normal to the direction of travel hardly changes.

Pressure throughout the fluid or gel 736, (in the case of the Hokuriku sensor, silicone gel) is constant so:

$$P=F/Ai=Fo/Ao,$$

Where
P is the pressure in the gel;
F is the input force;
Fo is sensed force;
Ai is the area of the plunger;
Ao is the projected surface area of the ball in plan view, or effective diaphragm size.
Thus $$Fo/F=Ao/Ai$$

This ratio of the output force to the applied force is here termed the Gearing Ratio (gr). Experimental results show that the Gearing Ratio for the Hokuriku sensor is 0.22.

FIG. 41 shows the Hokuriku sensor having been modified to remove the ball. The cavity of the sensor 526 is also filled with the fluid or gel 736 and the pressure acts directly on the sensor chip 526, so the effective diaphragm size (Ao) is the top surface of the sensor chip 526.

Figure 44:
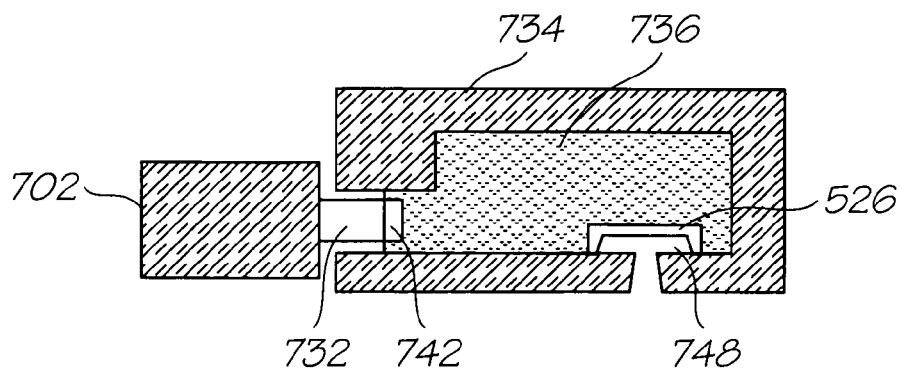
FIG. 44 is a schematic section view of the force sensor using pressure sensor chip and hydraulic coupling.

The difference between using a sensor with the ball bearing 524 and without the ball bearing, is that the top surface of the chip 526 does not act as a piston, but rather it deforms like a balloon. The force sensor chip is actually sensing a pressure instead of a force. Compare the typical force sensor deflection profile in FIG. 42 to a typical pressure sensor deflection profile in FIG. 43. The deflection in the pressure sensor case will be less at the centre of the chip and it will be less sensitive, but simpler. This diaphragm diameter is also different from the first case and so will provide a different gearing ratio. A practical realisation of the sensor configured to respond to the pressure in the hydraulic coupling is shown in FIG. 44. It is important to vent the cavity 748 beneath the force sensor chip 526 with an aperture through the moulding 734.

Any sensor chip 526 responsive to differential pressure can be used. However, high sensitivity are less preferred. The back of the chip must be open to the ambient air pressure. The range of pressures is in the order of atmospheres, so high-sensitivity sensor chips are less suitable, eg. 500 g force over a 4 $mm^2$ diaphragm (top surface of sensor chip) is 1.3 MPa=181 PSI=12 atm.

The fluid or gel 736 in the casing 734 should be incompressible. All bubbles should be removed, with a vacuum if necessary. The difference between various fluids is the sheer force and the resulting pressure head (loss) and loss of transmitted force.

$$Fin(effective)=Fin-Fsheer$$

$$Peffective=Fin(eff)/Ai-Phead$$

The pressure head loss is insignificant for silicone gel and it has proven to be a suitable for the requirements of the force sensor 526. However other fluids or gels may be used and the issues to be considered when selecting a suitable fill for the casing are:
i Lower viscosity decreases the strength of the chip 526 (or more correctly, the chip needs to be less rigid) and the easier it is to break.
ii Higher viscosity causes more hysteresis loss. The sensor signal should return-to-zero setting after release of the input force.
iii Secondary effects (resonant frequencies and standing waves) related to the effective elasticity of the coupling fill should be minimised.
iv Losses in the high frequencies can help to dampen the step/impulse response.

Figure 45:
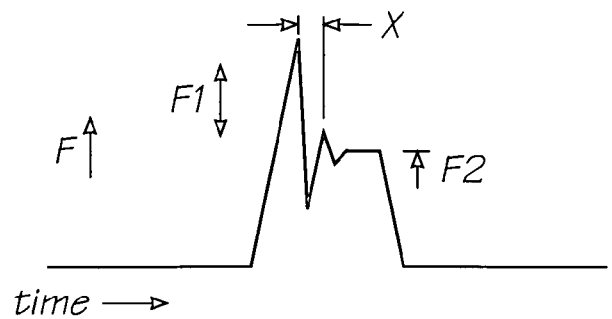
FIG. 45 is a plot of sensed force versus time for an input impulse (tap) to the cartridge.

The elasticity of the boot, mounting, and writing surface all affect the self-resonant oscillations. A softer coupling (low stiffness) lowers the oscillation frequency, which is undesirable. Conversely, a stiffer coupling increases the deceleration force component of the pen-down action (for convenience, the pen down response is referred to as the "F1" response). This F1 response provides an unwanted artefact in the force signal and increases the risk of chip breakage. FIG. 45 shows a typical tap response output signal that illustrates the F1 response.

There are several possibilities for applying the input force to the hydraulic fluid or gel 736. Three of the primary options are shown in FIGS. 46A to 46C.

Figure 46A:
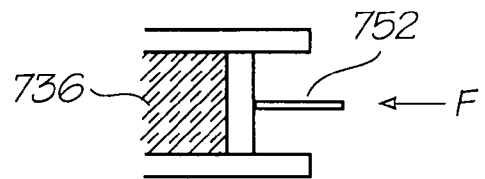
FIGS. 46A to 46C are schematic section views of input mechanisms for the hydraulic coupling.

In FIG. 46A, the input piston 752 forms a sliding fit with the aperture in the casing 734. The piston is overly complicated for a microstructure and sealing the sides will cause friction—which is highly undesirable.

Figure 46B:
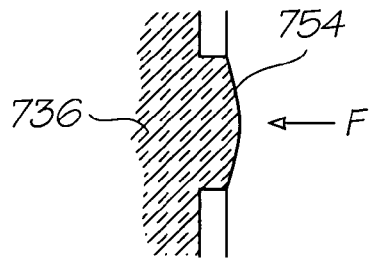

In FIG. 46B, the input force F acts directly on an outwardly bulging membrane 754. The diaphragm 754 is really only relevant to pressure sensors where the input is a liquid or gas.

Figure 46C:
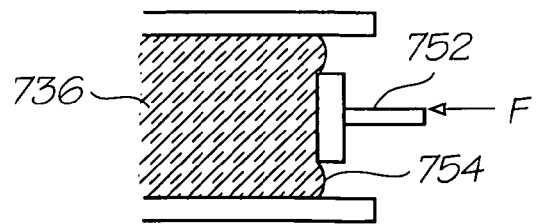

FIG. 46C shows a diaphragm 754 and plunger 752 combination. This mechanism can be made robust so that it is difficult to burst, the surface strength of the diaphragm 754 does not need to be so high that it interferes with force transmission and the exhaust of material around the sides of the plunger 752 can be restrained as it lowers the spring constant of the coupling and reduce the frequency response of the step/impulse function. Also, the exhausted material and wall expansion of the casing 734 (see FIG. 41) increases the volume ratio (see N calculated below). Some increase is tolerable and in fact might be desirable for protecting the chip.

When designing the force input mechanism of FIG. 46C, the relevant considerations are:
  i Shear force/piston effect
  ii Strength: plunger collapses into the fluid
  iii Gap provides a vent for the fluid to oscillate in and softens the coupling—undesirably lowering the oscillation frequency (see above).
  iv Gap magnifies the volume ratio of the input piston relative to the output piston (perfect piston behaviour).
  Volume ratio:

$N=(Xin \times Ain)/(Xout \times Aout)$, where $X$ is the axial displacement,

N is approximately 20, if Xin at an input force of 500 g is approximately 400 microns.

Up to a point this axial magnification (Xin/Xout) is good as it means, in this case, that the 10 microns movement of the sensor diaphragm 754 might give a 0.2 mm cartridge movement. This allows a better end-stop protection mechanism (see FIG. 37B) to be used that does not have such critical tolerance requirements.

The surface of the diaphragm 754 can be:
  i Just the soft bulk material of the semi-cured silicone.
  ii Silicone with a thin membrane
  iii Silicone with say an epoxy (etc) painted over it.
  iv The outer part of the fluid would be extra-hardened with a surface treatment.
  v A welded film.

Figure 47A:
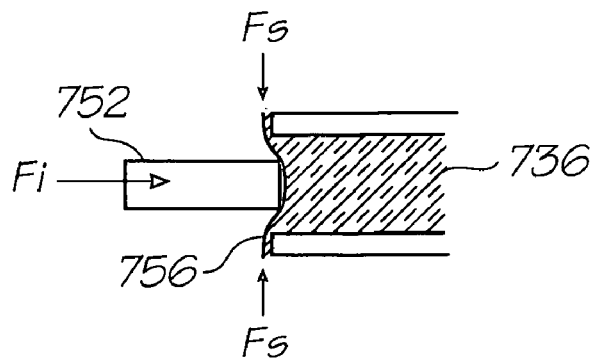
FIGS. 47A to 47C are schematic section views of input mechanisms using a welded membrane.
Figure 47B:
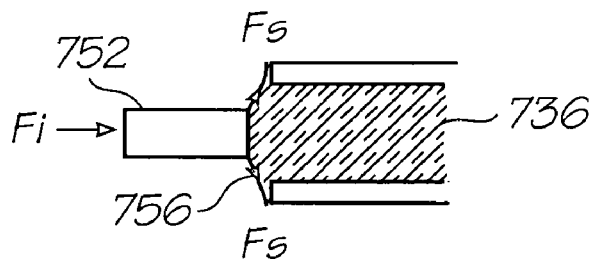
Figure 47C:
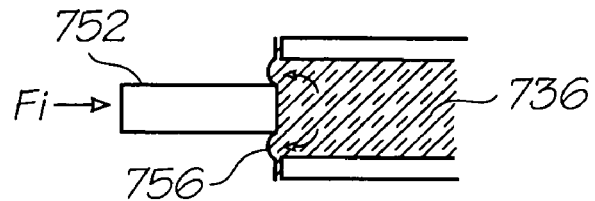

A thin membrane over silicone option is very fragile. The welded film can be too strong and already pre-strained, so most of the applied force is lost in stretching the film and not translated into fluid pressure. The welded film configuration is shown in FIGS. 47A to 47C. In FIG. 47A, the input force $F_i$ is lost to $F_s$ used for stretching the film 756. In FIG. 47B, the film 756 initially bulges outwardly so that the plunger 752 acts to reduce the film stretching and more of $F_i$ is used to raise the fluid pressure. However, as shown in FIG. 47C, the film 756 bulges, or exhausts around the sides of the plunger 752 when $F_i$ and therefore plunger displacement, are relatively high. In this case, considerations i to iv discussed above become relevant.

End Stop for Direction Coupled Sensor

If a force re-directing coupling is not used, and the sensor is directly coupled to the cartridge or the boot (see FIG. 33), the issue of overload damage to the sensor becomes a problem. The Hokuriku chip (referred to above) breaks at a static deflection of ~50 microns at an applied force of 4.5 kg. Most of this deflection is in the moulded casing 734, not the chip 526. For example, at 500 g the 10 micron deflection is composed of no more than 2 microns in the chip 526, the remaining 8 microns being in the moulded casing.

Static Overload Protection

To protect the chip 526 from static overload an end-stop that is set nominally at say 1 kg (equating to 16 microns deflection) would have to engage the casing somewhere between 10 microns and 21 microns. Fabricating an end-stop to this accuracy is difficult. Firstly the end-stop has to be referenced with respect to the back of the moulded casing 734, as the internal deflection of the chip 526 relative to the package is small. Tests confirm that an end-stop referenced to the front face does not protect the chip 526 as effectively.

Figure 48:
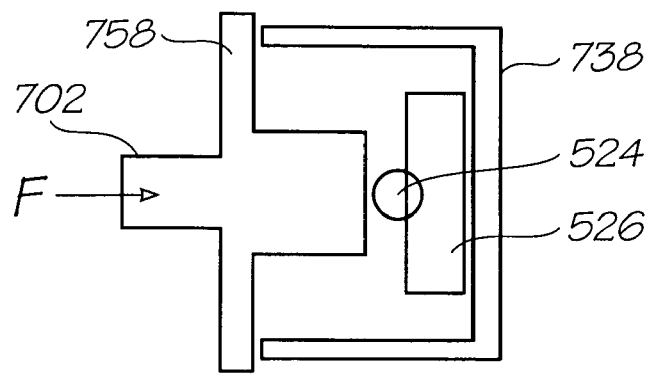
FIG. 48 is schematic section view of the force sensor with a stop surface directly referenced to the back surface of the sensor chip.
Figure 49:
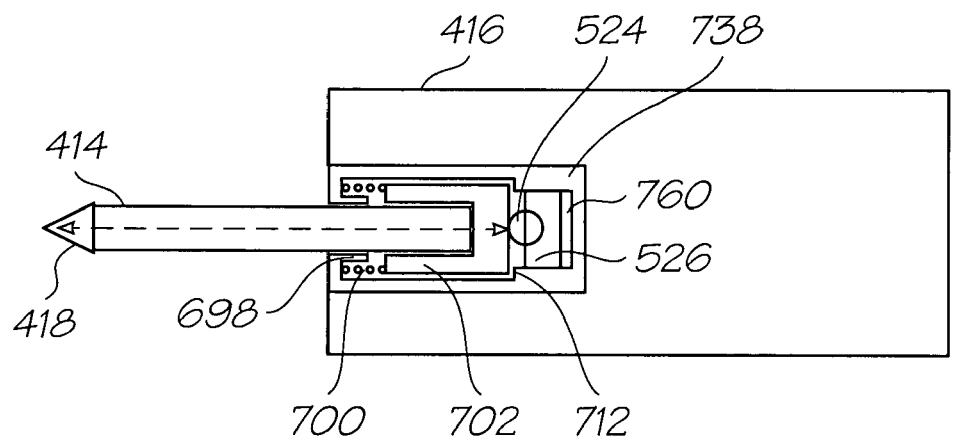
FIG. 49 is a more detailed section view of the force sensor with its stop surface directly referenced to the back surface of the sensor chip.
Figure 50:
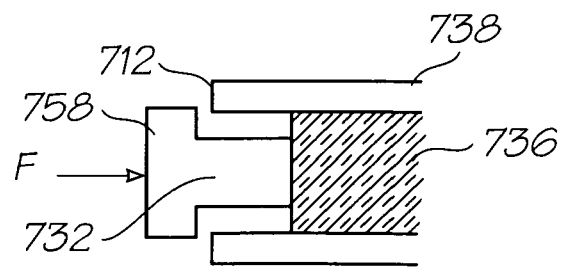
FIG. 50 is schematic section view of a stop surface arrangement for the force input mechanism of the hydraulic coupling.

FIGS. 48 and 49 show end stop arrangements 738 referenced to the back of the moulded casing. Testing has shown these arrangements to be successful at protecting the chip at large static loads without excessive interference in normal operation. The flange 758 should engage the end-stop 738 at all points within a very short range of travel of the boot 702. This complicates the manufactures but an excessive engagement range can exceed the full scale operating range of the sensor 526.

FIG. 49 is a more detailed sketch of the sensor and end stop in the pen context. Contact pressure on the nib 418 is directly transmitted up the cartridge 414 to the ball 524 of the sensor 526. The end of the cartridge 414 is in the boot 702 which is pre-loaded against the ball 524 by the pre-load spring 700. The end stop 738 takes the form of a cup-shaped element with a stop surface 712 at its top for engagement with the boot 702. An optional layer 760 of material with a known spring constant can be positioned behind the sensor 526 for additional breakage protection.

Dynamic Load Protection

Shock loading is a problem for directly coupled force sensor as well as fluid coupled sensors. The fluid or gel transmits the deceleration shock just as well as the direct mechanical coupling. However, the membranes in the fluid couplings tend to break rather than the chips. Either failure would be irreparable in the Netpage pen shown in the figures, as there are no serviceable parts other than the removable cartridge and battery pack.

Fortunately, the "volume magnification" effect of the fluid coupling helps because it magnifies the failure threshold displacement.

As above:

$Xin/Xout=N \times Aout/Ain=N \times gr$=displacement magnification where:
N=volume ratio
gr=gearing ratio
assuming no secondary effects.
So for the displacement magnification=10 (say)
Xin @500 g=10×10=100 microns An end-stop fitted to prevent displacements of this dimension is more easily manufactured than one configured to stop 10 micron displacements. From FIG. 50, the ordinary worker will appreciate that a 100 micron gap between the flange 758 of the plunger 732 and the stop surface 712 of the end stop 738 is far easier than a 10 micron gap.

Deformable Force Sensor Coupling

For direct coupling between the pen cartridge (or boot) and the force sensor, the sensor is mounted so that the plane of the chip 526 is perpendicular to the axis of the cartridge 414 (see FIG. 33). This coupling is somewhat independent of whether the assembly includes the boot 702 over the end of the cartridge 414.

The force sensor 526 deflects in response to an applied force F. As discussed above, the sensor may break when the applied force exceeds the elastic limits of the sensor.

As shown in FIG. 33, the force sensor 526 may be recessed to prevent excessive deflection. However, even if the force sensor is protected from an excessive static force, an impulse may still be sufficient to break the sensor, such as when the pen is dropped on its nib 418.

To prevent an impulse from breaking the force sensor, an element may be inserted between the nib and the force sensor that can collapse or grossly deform when the input force is above a safe threshold. The collapsible element is designed to absorb the energy of an impulse originating at the nib by collapsing, thus preventing the impulse from propagating to the force sensor.

The collapsible element may be designed to collapse permanently or temporarily.

If the collapsible element is designed to collapse permanently, then it is most usefully incorporated into the cartridge, since the cartridge is already designed to be replaceable by the user when the ink supply is exhausted or the nib is damaged.

Figure 51:
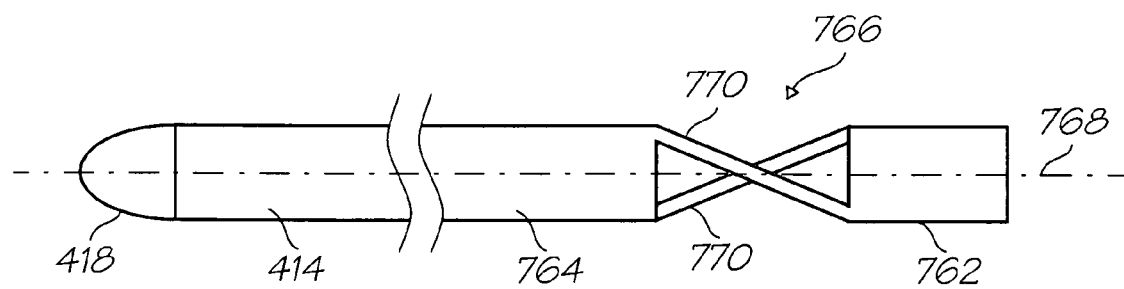
FIG. 51 is pen cartridge with collapsible element in an un-collapsed state.
Figure 52:
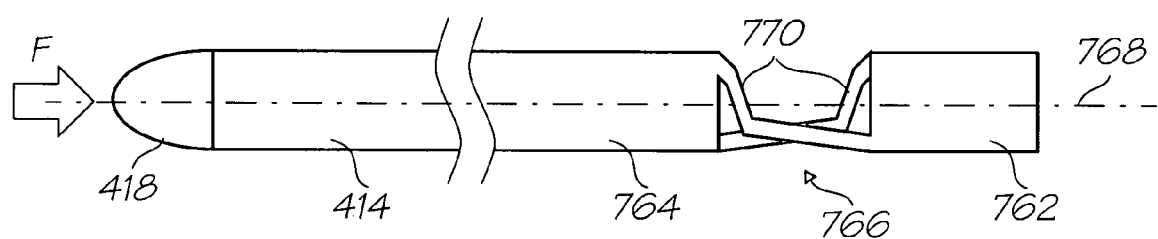
FIG. 52 is pen cartridge with collapsible element in a collapsed state.

FIG. 51 shows a pen cartridge 414 with an integral collapsible element 766. The collapsible element 766 consists of a set of struts 770 joining two parts 762 and 764 of the cartridge 414. The struts 770 transmit axial forces throughout the full dynamic range of the force sensor without substantial deformation, but are designed to have a buckling threshold, as shown in FIG. 52, when exposed to an excessive force or damaging impulse F. The outer section 764 of the cartridge 414 is permanently displaced along the longitudinal axis 768 toward the inner section 762 proximate the force sensor. To assist crumpling the struts 770 are set at an angle to the axis of the cartridge.

The example shows two struts, but additional struts can be used.

In a felt-tip pen cartridge or similar, the nib 418 itself can be used as the collapsible element. In a ballpoint pen cartridge 414 the housing surrounding the nib 418 can also be used as the collapsible element 766.

Figure 53:
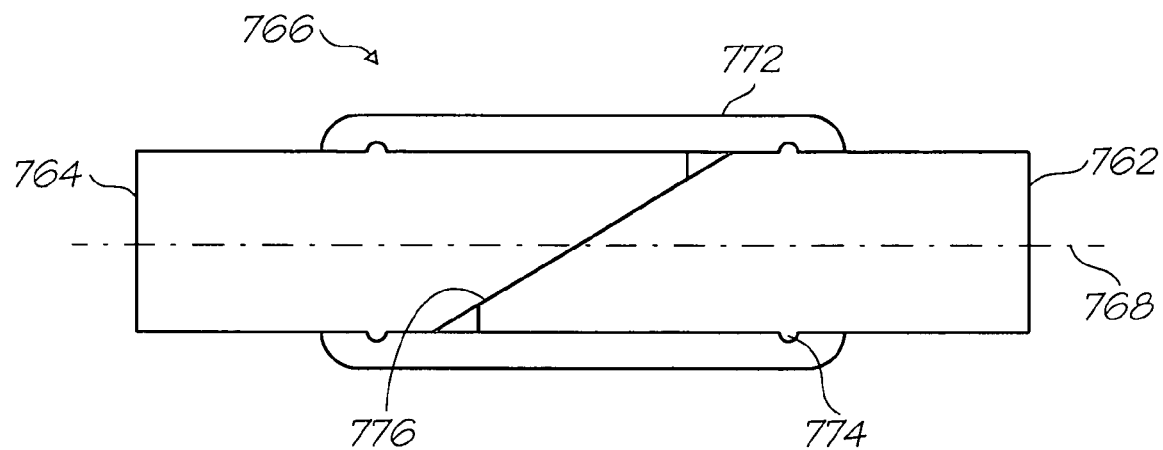
FIG. 53 is a stick friction collapsible element in un-collapsed state.

FIG. 53 shows a temporarily collapsible element 766 suitable for insertion between the pen cartridge 414 and the force sensor. The collapsible element 766 consists of a pair of rods 762 and 764 held in an elastomeric sleeve 772, with both rods meeting at a slip surface 776 inclined to the longitudinal axis 768.

Figure 54:
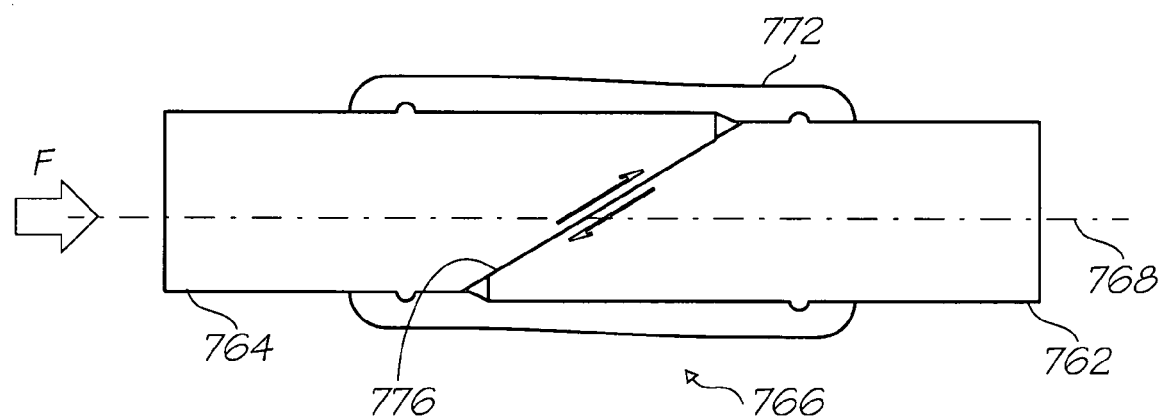
FIG. 54 is a stick friction collapsible element in collapsed state.

The element 766 transmits axial forces throughout the full dynamic range of the force sensor without slipping, but is designed to slip, as shown in FIG. 54, when exposed to an excessive force or damaging impulse F. The stick friction at the slip surface 776 and the force of the elastomeric sleeve 772 keeps the rods 762 and 764 from slipping except when exposed to an excessive force.

When the excessive force is removed the elastomeric sleeve 772 aligns the rods to restore the un-collapsed state of the collapsible element. Locating features 774 on both rods 762 and 764 prevent the sleeve 772 from moving away from the slip surface 776.

Figure 55:
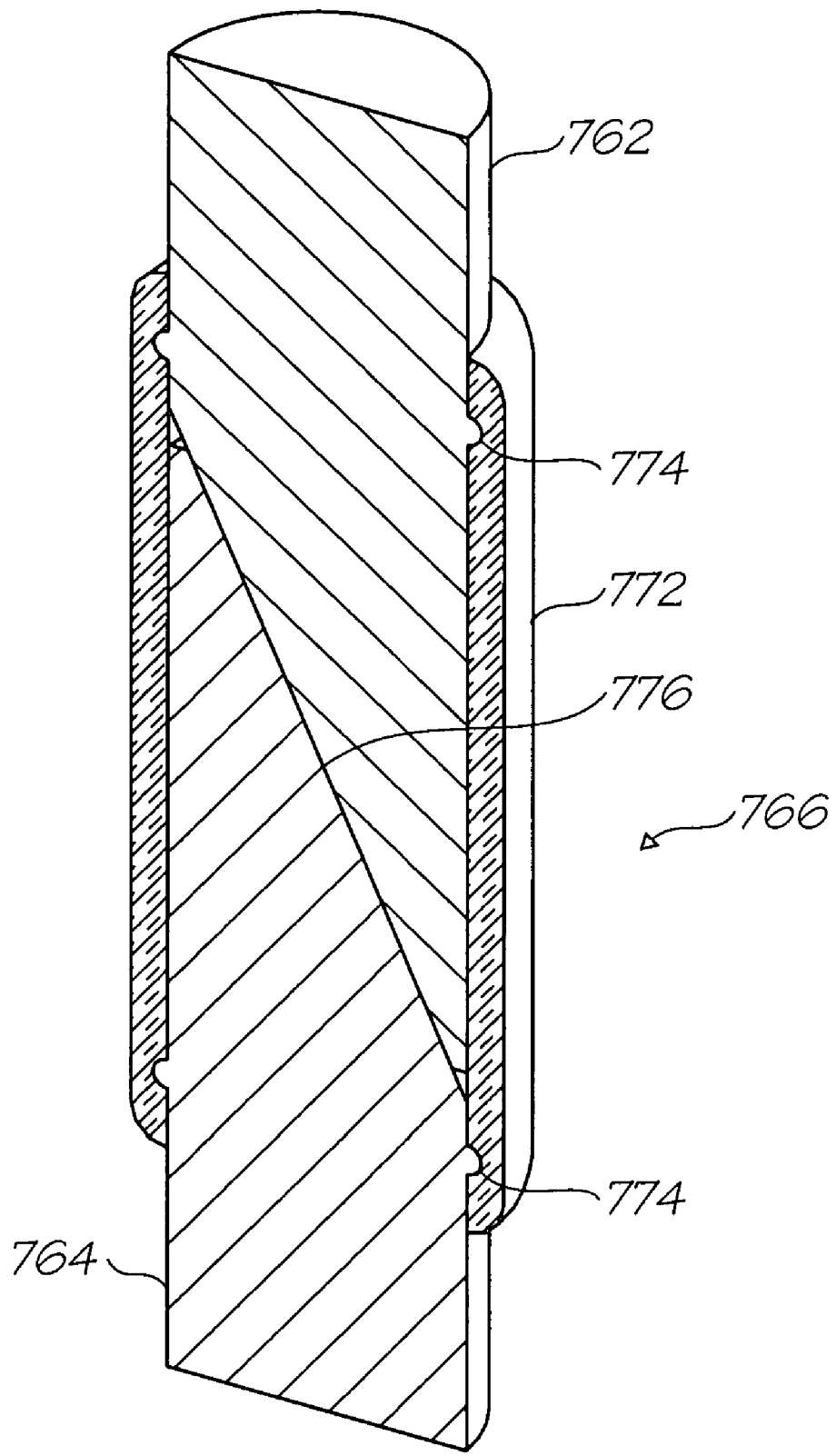
FIG. 55 is a sectioned perspective view of a stick friction collapsible element in an un-collapsed state.

FIG. 55 is a sectioned perspective of the stick friction collapsible element 766, and shows the elastomeric sleeve 772 surrounding the mated rods 762 and 764.

Optical Force Sensor

The Hokuriku force sensor discussed above is piezoresistive. Sensors of this type present several challenges. They necessitate a precision-assembly and the required form factor is not currently available in a standard part. Hence to prototype the part and tool up for volume production is costly. Furthermore, its full-force deflection is small, requiring careful tolerancing to prevent breakage.

To avoid these problems, this aspect of the invention provides an optical force sensor that uses the attenuation of an optical coupling between a light-emitting diode (LED) and a photodetector.

FIG. 33 shows a typical configuration of a force sensor 526 coupled with a pen cartridge 414 within a pen body 416. The cartridge 414 is pre-loaded (spring 700) against the force sensor to eliminate travel before force sensing commences and to eliminate the need for fine tolerancing of the coupling between the force sensor and the cartridge (or the boot 702 which grips the cartridge 414).

Figure 56A:
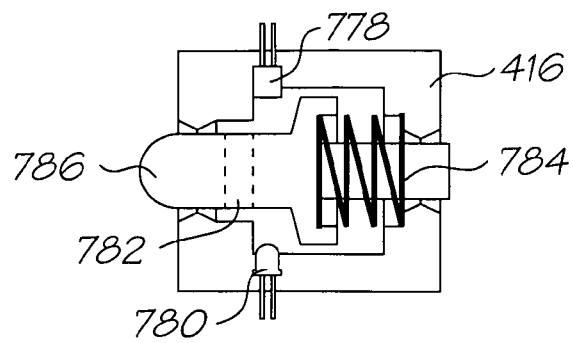
FIG. 56A is a plan view of an optical force sensor.
Figure 56B:
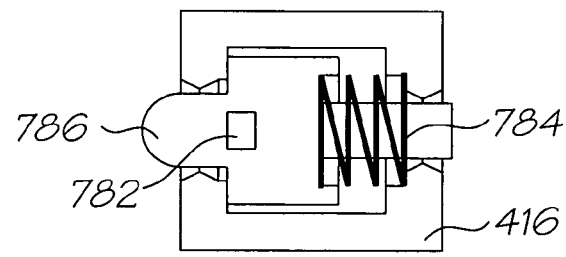
FIG. 56B is an elevation of an optical force sensor.

FIGS. 56A and 56B shows the optical force sensor. It consists of a rigid but movable core held within a rigid housing 416. The end of the housing 416 has an opening (on the left) through which the end of the core 786 protrudes and engages with the pen cartridge (or boot) as shown in FIG. 33. The other end of the core engages with a spring 784.

The other end of the housing 416 also has an opening (on the right) through which the other end of the core 786 protrudes to ensure the core remains centred in the housing.

The centre of the core has an aperture 782 which faces a LED 780 on one side and a photodetector 778 on the other.

As the cartridge 414 pushes against the core 786, the core 786 pushes against the spring 784 and compresses it in proportion to the force applied to the cartridge 414. As the core 786 moves in proportion to the applied force, the aperture 782 moves relative to the LED 780 and photodetector 778. The amount of light detected by the photodetector 778 is therefore a function of the position of the core 786 and hence of the applied force.

The shape of the aperture 782 and the shape of the housing surrounding the LED 780 and the photodetector 778 determine how much light strikes the photodetector 778 as a function of the position of the core 782. The amount of light is also affected by the beam profile of the LED, and this can be modified by using a collimating lens or a diffuser in front of the LED.

The force sensor has a desired dynamic range. The aperture 782 is positioned relative to the LED 780 and photodetector 778 so that when zero external force is applied close to zero light strikes the photodetector 778. The spring 784 is chosen so that when maximum external force is applied the core 786 is displaced so that the aperture 782 aligns with the LED 780 and photodetector 778 and maximum light strikes the photodetector 778. The aperture 782 is made wide enough so that transverse movement of the core 786 in the housing 416 does not affect light transmission.

If the maximum external force is $F_{max}$ and the length of the aperture is a, then the required stiffness k of the spring is:

$$k = F_{max}/a \quad \text{(EQ 1)}$$

During use of the pen, axial cartridge movement up to 100 microns is acceptable, and this imposes an upper limit on the length of the aperture. Although this would seem to impose severe mechanical tolerancing requirements on the length of the movable core, the length of the chamber which houses the core, and the length of the spring, this is not necessarily so. When the force sensor is assembled, the core does not need to be in contact with the spring. Instead, the external spring which pre-loads the pen cartridge against the force sensor can also be relied upon to pre-load the core against the force sensor spring. However, the aperture in the core has to be long enough to accommodate the full range of movement of the core.

The force is sampled at a rate that is determined by the expected frequency content of the force signal, the maximum allowed latency in detecting pen-down and pen-up events, and any requirement to low-pass filter the force signal to remove noise.

Figure 57:
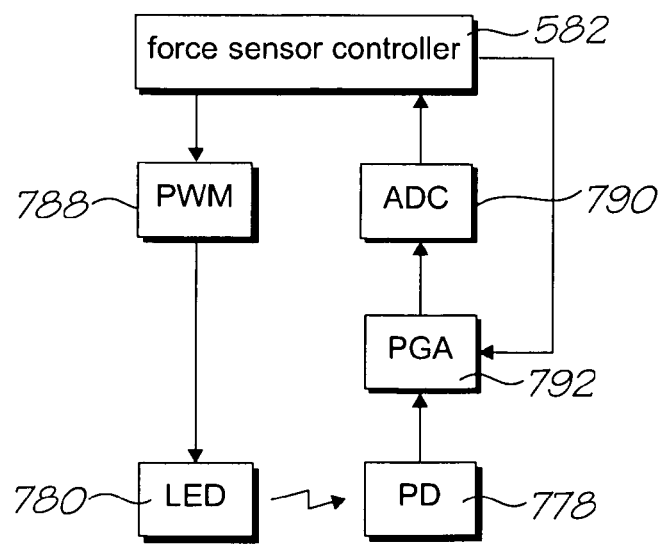
FIG. 57 is a high-level block diagram of the operation of the optical force sensor.

FIG. 57 shows a high-level block diagram of the force sensor. A force sensor controller 582 uses a pulse-width modulator (PWM) 788 to drive the LED 780 with a desired intensity. It uses an analog-to-digital converter (ADC) 790 to sample the photodetector (PD) 778 signal which represents the force signal. The PD 778 output current is converted to a voltage before being sampled by the ADC 790. It is amplified by a programmable-gain amplifier (PGA) 792 and is typically also low-pass filtered.

The force sensor controller 582 can use the PWM 788 to cycle the LED 780 through a set of different intensities, and combine successive ADC 790 samples to obtain a higher-precision signal. In the limit case the ADC 790 can be a simple comparator.

The force sensor controller 582 can also operate in multiple modes. For example, when in pen-up mode it can simply be looking for a pen-down transition, while in pen-down mode it can be sampling the force signal with higher precision. A simple pen-down detection mode can help minimise power consumption.

The force sensor can be calibrated in the factory to determine the transfer function from applied force to photodetector output, and this can be used to determine gain and offset settings for the PGA 792. The force sensor can also measure its zero-force signal when capped, and utilise an otherwise fixed transfer function.

Force Sensor Dilatant Fluid Stop

As previously discussed, direct coupling between the pen cartridge (or boot) and the force sensor, requires the sensor to be mounted so that the plane of the chip 526 is perpendicular to the axis of the cartridge 414 (see FIG. 33). This coupling is somewhat independent of whether the assembly includes the boot 702 over the end of the cartridge 414.

The force sensor 526 deflects in response to an applied force F. As discussed above, the sensor may break when the applied force exceeds the elastic limits of the sensor.

As shown in FIG. 33, the force sensor 526 may be recessed to prevent excessive deflection. However, even if the force sensor is protected from an excessive static force, an impulse may still be sufficient to break the sensor, such as when the pen is dropped on its nib 418.

A dilatant (or "shear thickening") fluid is a non-Newtonian fluid whose viscosity increases with rate of shear. Dilatant fluids are typically dispersions of solid particles in a liquid at a critical particle concentration which allows the particles to touch. At a low shear rate the particles are able to slide past each other and the fluid behaves as a liquid. Above a critical shear rate friction between the particles predominates and the fluid behaves as a solid.

Although the best-known dilatant fluid consists of a cornstarch dispersion in water, industrial dilatant fluids typically consist of polymer dispersions in alcohol or water (see for example U.S. Pat. No. 5,037,880 to Schmidt et al).

Figure 58:
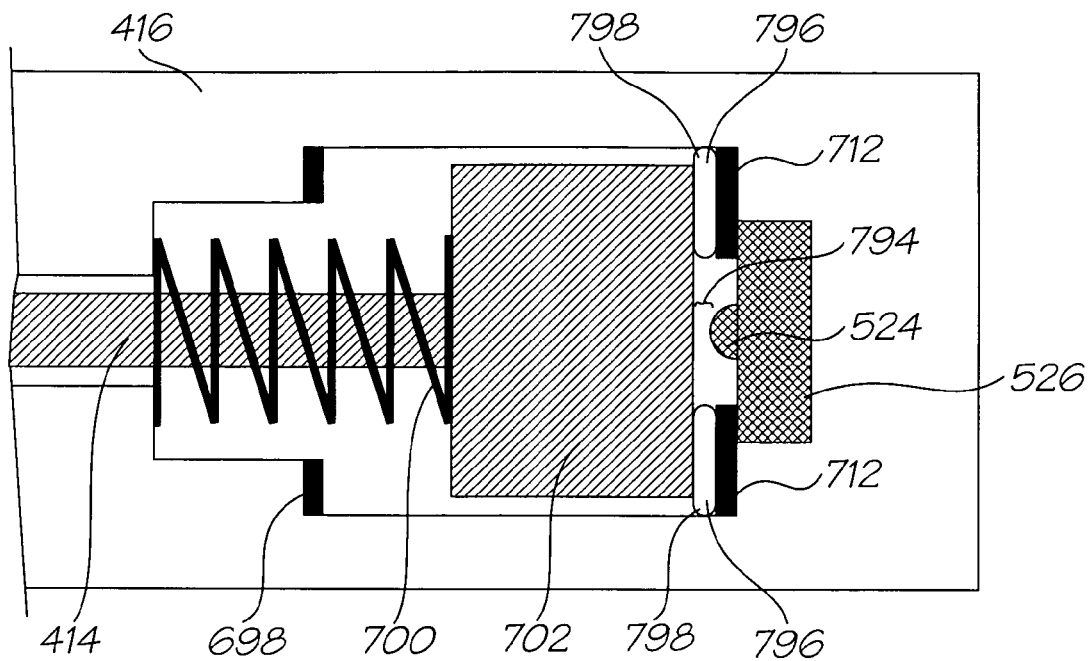
FIG. 58 is a schematic section of a dilatant fluid o-ring to prevent impulse damage to force sensor.

To prevent damage to the force sensor 526 from an impulse, an additional stop 798 containing a dilatant fluid 796 can be inserted between the boot 702 (or cartridge 414) and the force sensor 526, as shown in FIG. 58. The dilatant fluid 796 can be contained in a sack 798 with a flexible membrane, formed into an o-ring to allow direct contact between the boot 702 (or cartridge) and the force sensor 526 through the hole in the middle.

During normal operation of the pen, the dilatant fluid o-ring acts as a liquid and deforms in response to movement of the cartridge 414, allowing normal forces to be transmitted from the cartridge to the force sensor 526. When a damaging impulse occurs, the dilatant fluid o-ring effectively hardens in response to the high shear rate, preventing movement of the cartridge and thereby protecting the force sensor.

The thickness of the o-ring does not need to be finely toleranced because the preload spring 700 preloads the cartridge 414 against the force sensor 526 largely independently of the o-ring. However, the ball 524 of the force sensor 526 needs to be sufficiently proud of the force sensor recess, formed by the surrounding stop 712, to accommodate at least some dilatant fluid 796 between the boot 702 and the stop 712 when the force sensor is preloaded.

Figure 59:
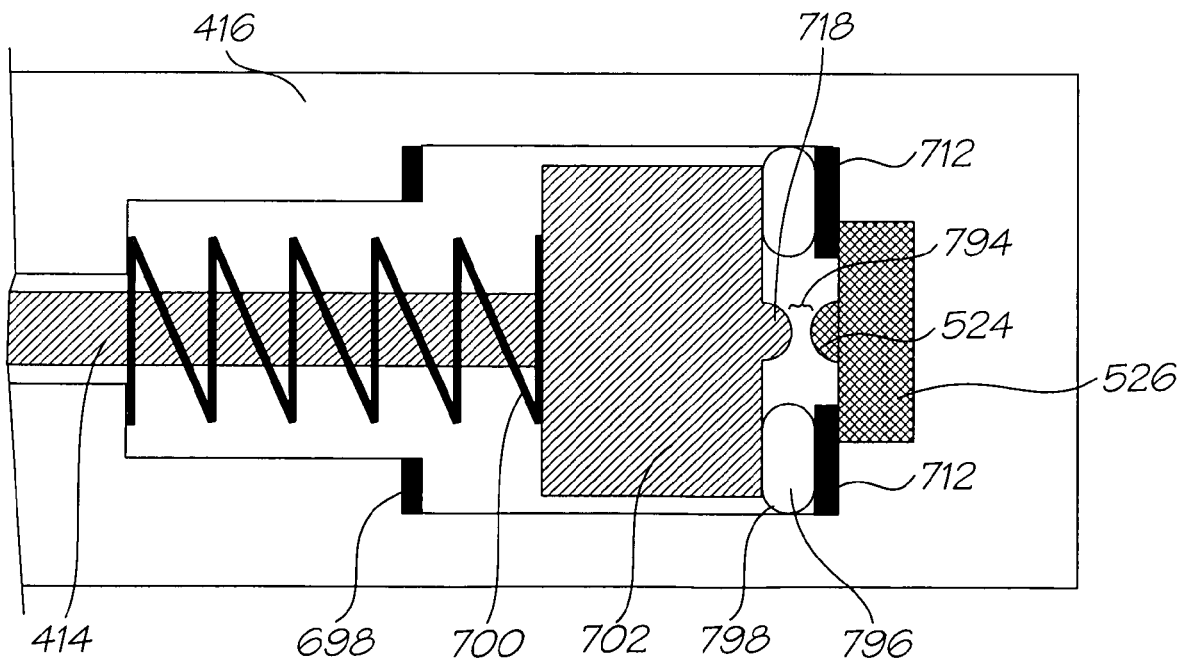
FIG. 59 is a schematic section showing boot or cartridge with protrusion to accommodate thicker O-ring.

If the boot is provided with a pin 718, as shown in FIG. 59, then a thicker o-ring can be accommodated. There is more displacement of the cartridge during a normal pen down event, but a thicker o-ring affords greater protection for the sensor 526.

Cap Assembly

Figure 25:
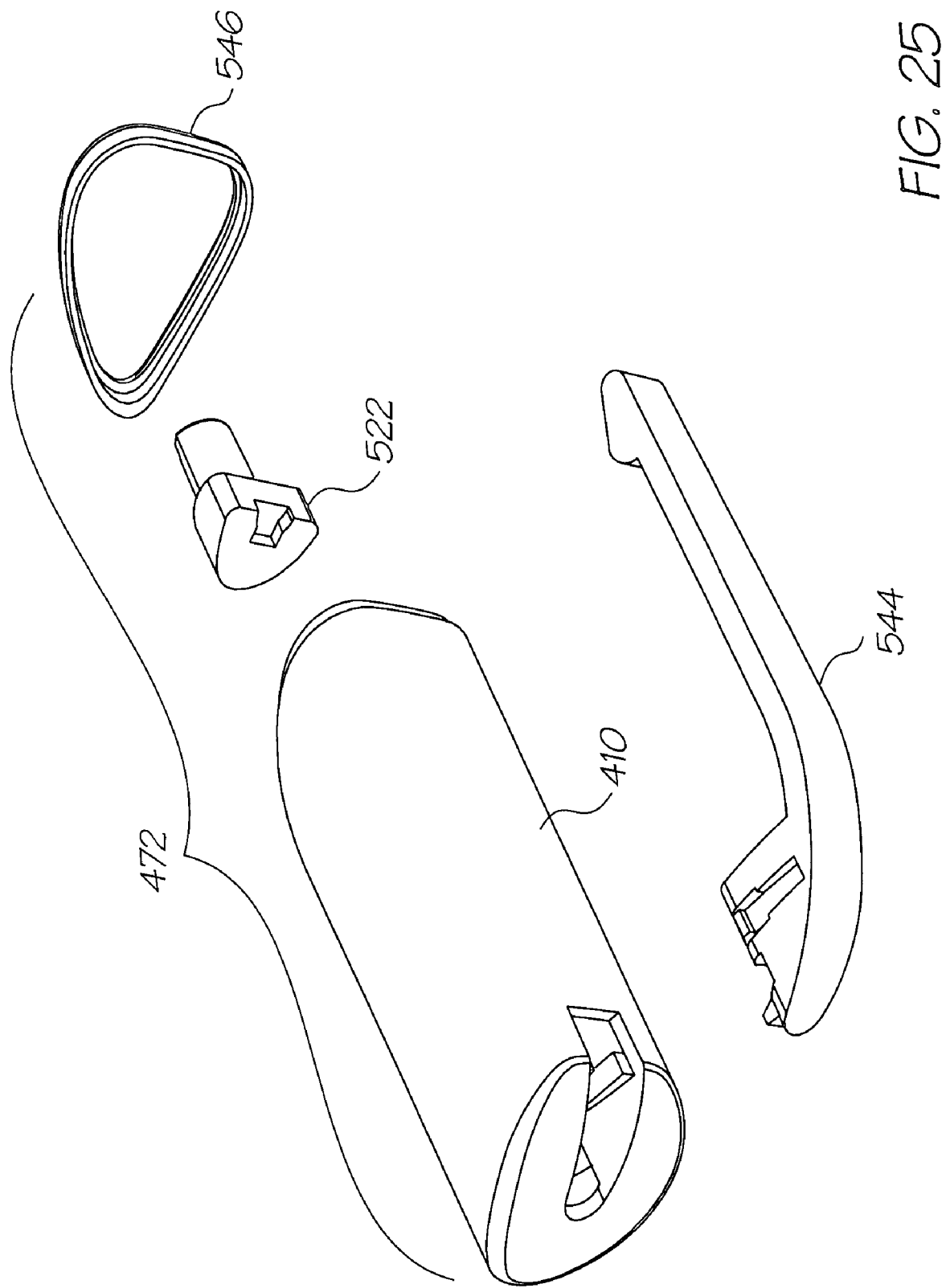
FIG. 25 is an exploded perspective of the cap assembly.

The pen cap assembly 472 consists of four moldings as shown in FIG. 25. These moldings combine to produce a pen cap which can be stowed on the top end of the pen 456 during operation. When capped, it provides a switch to the electronics to signal the capped state (described in 'Cap Detection Circuit' section below). A conductive elastomeric molding 522 inside the cap 410 functions as the cap switch when it connects the inner 512 and outer 514 metal tubes to short circuit them (see FIG. 26). The conductive elastomeric molding 522 is pushed into a base recess in the cap molding 410. It is held captive by the clip molding 544 which is offered into the cap and snaps in place. A metallised trim molding 546 snaps onto the cap molding 410 to complete the assembly 472. The cap molding 410 is line-of-draw and has an aquagraphic print applied to it. The trim 546 can be metallised in reflective silver or gold type finishes as well as coloured plastics if required.

Pen Feedback Systems—Vibratory

The pen 400 has two sensory feedback systems. The first system is haptic, in the form of a vibration motor 446. In most instances this is the primary user feedback system as it is in direct contact with the users hand 408 and the 'shaking' can be instantly felt and not ignored or missed.

Pen Feedback Systems—Visual

The second system is a visual indication in the form of an indicator window 412 in the tube molding 466 on the top apex 420 of the pen 400. This window aligns with a light pipe 448 in the chassis molding 416, which transmits light from red and green indicator LEDs 452 on the main PCB 422. The indicator window 412 is positioned so that it is not covered by the user's hand 408 and it is also unobstructed when the cap 410 is stowed on the top end 456 of the pen.

Optical Design

The pen incorporates a fixed-focus narrowband infrared imaging system. It utilises a camera with a short exposure time, small aperture, and bright synchronised illumination to capture sharp images unaffected by defocus blur or motion blur.

TABLE 5

Optical Specifications

| | |
|---|---|
| Magnification | ~0.225 |
| Focal length of lens | 6.0 mm |
| Viewing distance | 30.5 mm |
| Total track length | 41.0 mm |
| Aperture diameter | 0.8 mm |
| Depth of field | ~/6.5 mm[7] |
| Exposure time | 200 us |
| Wavelength | 810 nm[8] |
| Image sensor size | 140 × 140 pixels |
| Pixel size | 10 um |
| Pitch range[9] | ~15 to 45 deg |
| Roll range | ~30 to 30 deg |
| Yaw range | 0 to 360 deg |

TABLE 5-continued

Optical Specifications

| | |
|---|---|
| Minimum sampling rate | 2.25 pixels per macrodot |
| Maximum pen velocity | 0.5 m/s |

[7]Allowing 70 um blur radius
[8]Illumination and filter
[9]Pitch, roll and yaw are relative to the axis of the pen.

Pen Optics and Design Overview

Cross sections showing the pen optics are provided in FIGS. 27A and 27B. An image of the Netpage tags printed on a surface 548 adjacent to the nib 418 is focused by a lens 488 onto the active region of an image sensor 490. A small aperture 494 ensures the available depth of field accommodates the required pitch and roll ranges of the pen 400.

First and second LEDs 434 and 436 brightly illuminate the surface 549 within the field of view 430. The spectral emission peak of the LEDs is matched to the spectral absorption peak of the infrared ink used to print Netpage tags to maximise contrast in captured images of tags. The brightness of the LEDs is matched to the small aperture size and short exposure time required to minimise defocus and motion blur.

A longpass IR filter 432 suppresses the response of the image sensor 490 to any coloured graphics or text spatially coincident with imaged tags and any ambient illumination below the cut-off wavelength of the filter 432. The transmission of the filter 432 is matched to the spectral absorption peak of the infrared ink to maximise contrast in captured images of tags. The filter also acts as a robust physical window, preventing contaminants from entering the optical assembly 470.

The Imaging System

Figure 28:
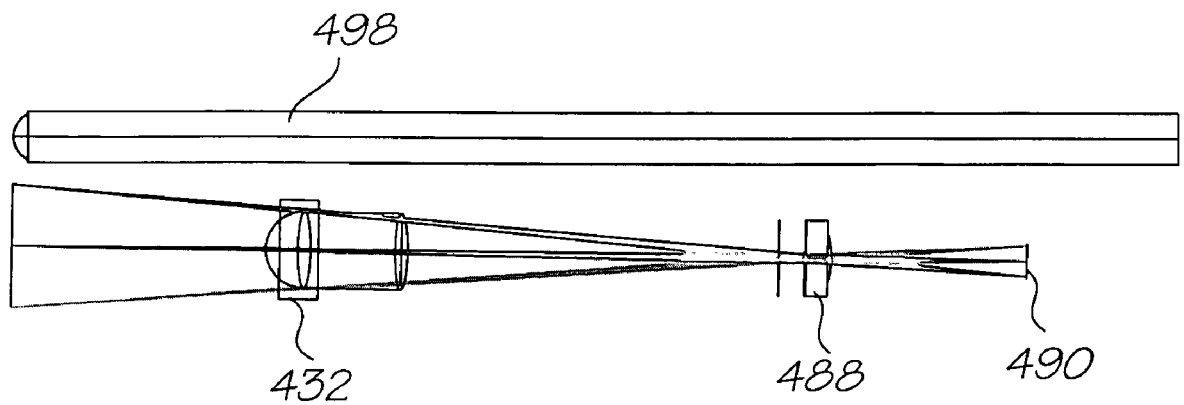
FIG. 28 is a ray trace of the pen optics adjacent a sketch of the ink cartridge.

A ray trace of the optic path is shown in FIG. 28. The image sensor 490 is a CMOS image sensor with an active region of 140 pixels squared. Each pixel is 10 µm squared, with a fill factor of 93%. Turning to FIG. 29, the lens 488 is shown in detail. The dimensions are:

D=3 mm
R1=3.593 mm
R2=15.0 mm
X=0.8246 mm
Y=1.0 mm
Z=0.25 mm

This gives a focal length of 6.15 mm and transfers the image from the object plane (tagged surface 548) to the image plane (image sensor 490) with the correct sampling frequency to successfully decode all images over the specified pitch, roll and yaw ranges. The lens 488 is biconvex, with the most curved surface facing the image sensor. The minimum imaging field of view 430 required to guarantee acquisition of an entire tag has a diameter of 39.6 s (s=spacing between macrodots in the tag pattern) allowing for arbitrary alignment between the surface coding and the field of view. Given a macrodot spacing, s, of 143 µm, this gives a required field of view of 5.7 mm.

The required paraxial magnification of the optical system is defined by the minimum spatial sampling frequency of 2.25 pixels per macrodot for the fully specified tilt range of the pen 400, for the image sensor 490 of 10 µm pixels. Thus, the imaging system employs a paraxial magnification of 0.225, the ratio of the diameter of the inverted image (1.28 mm) at the image sensor to the diameter of the field of view (5.7 mm) at the object plane, on an image sensor 490 of minimum 128×128 pixels. The image sensor 490 however is 140×140 pixels, in order to accommodate manufacturing tolerances. This allows up to +/−120 µm (12 pixels in each direction in the plane of the image sensor) of misalignment between the optical axis and the image sensor axis without losing any of the information in the field of view.

The lens 488 is made from Poly-methyl-methacrylate (PMMA), typically used for injection moulded optical components. PMMA is scratch resistant, and has a refractive index of 1.49, with 90% transmission at 810 nm. The lens is biconvex to assist moulding precision and features a mounting surface to precisely mate the lens with the optical barrel molding 492.

A 0.8 mm diameter aperture 494 is used to provide the depth of field requirements of the design.

The specified tilt range of the pen is 15.0 to 45.0 degree pitch, with a roll range of 30.0 to 30.0 degrees. Tilting the pen through its specified range moves the tilted object plane up to 6.3 mm away from the focal plane. The specified aperture thus provides a corresponding depth of field /6.5 mm, with an acceptable blur radius at the image sensor of 16 µm.

Due to the geometry of the pen design, the pen operates correctly over a pitch range of 33.0 to 45.0 degrees.

Figure 30:
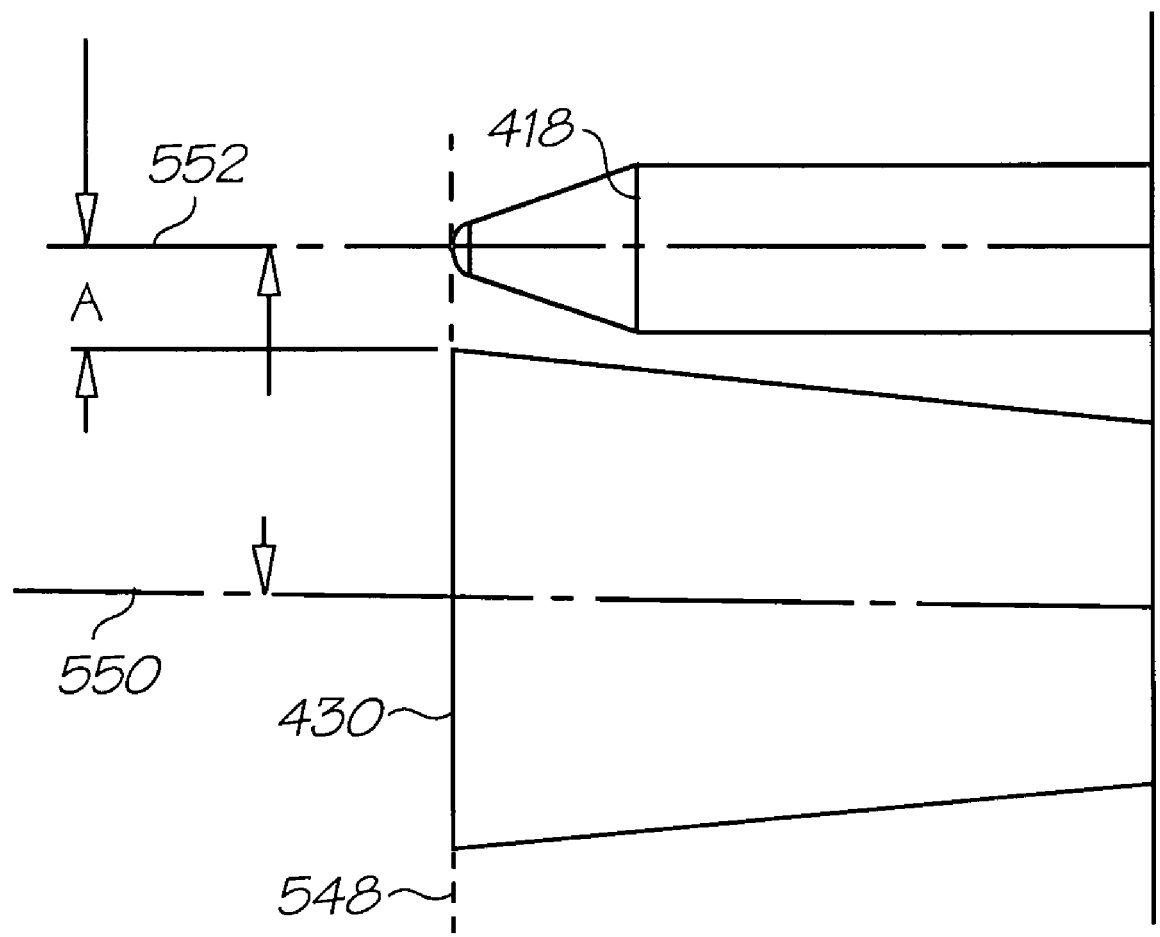
FIG. 30 is a side elevation of the nib and the field of view of the optical sensor.

Referring to FIG. 30, the optical axis 550 is pitched 0.8 degrees away from the nib axis 552. The optical axis and the nib axis converge toward the paper surface 548. With the nib axis 552 perpendicular to the paper, the distance A between the edge of the field of view 430 closest to the nib axis and the nib axis itself is 1.2 mm.

The longpass IR filter 432 is made of CR-39, a lightweight thermoset plastic heavily resistant to abrasion and chemicals such as acetone. Because of these properties, the filter also serves as a window. The filter is 1.5 mm thick, with a refractive index of 1.50. Each filter may be easily cut from a large sheet using a $CO_2$ laser cutter.

The Illumination System

The tagged surface 548 is illuminated by a pair of 3 mm diameter LEDs 434 and 436. The LEDs emit 810 nm radiation with a divergence half intensity, half angle of /15 degrees in a 35 nm spectral band (FWHM), each with a power of approximately 45 mW per steradian.

Pod Design and Assembly

TABLE 2

| Pod Mechanical Specifications | |
|---|---|
| Size | h63 × w43 × d46 mm |
| Mass | 50 g |
| Operating Temperature | −10~+55 C. |
| Operating Relative Humidity | 10-90% |
| Storage Temperature | ~20 to +60 C. worst case |
| Storage Relative Humidity | 5-95% |
| Shock and Vibration | Drop from 1 m onto a hard surface without damage. Mechanical shock 600G, 2.5 ms, 6 axis. |
| Serviceability | Replaceable jacket (part of customisation kit). No internal user serviceable parts - the case is not user openable. |
| Power | USB: 500 mA. External power adapter: 600 mA at 5.5VDC. |

Pod Design

The pen 400 is supplied with a USB tethered pod, which provides power to the pen and a Bluetooth transceiver for data transfer between the pen and the pod. Referring to FIG. 31, the pod 450 is a modular design and is comprised of several line of draw moldings. The pod tower molding 554 holds the pen at a 15 degree from vertical angle, which is both ergonomic from a pen stowing and extraction perspective, but also is inherently stable.

Pod Assembly

The assembly sequence for the pod 450 is as follows:

An elastomeric stop molding 556 is push fitted into the pod tower molding 554 to provide a positive stop for the pen when inserted into the pod.

The pod tower molding 554 has two metal contacts 516 pushed onto location ribs under the stop. These contacts 516 protrude into a void 558 where the nib molding 428 is seated as shown in FIG. 32. When a pen is present, they contact the coaxial metal barrels 498 around the ink cartridge 414. These act as conductors to provide charge to the battery 424.

The pod PCB 560 is offered up into the pod tower molding 554 and snapped into place. Sprung charging contacts 562 on the metal contact piece 516 align with power pads on the pod PCB 560 during assembly. The underside of the pod PCB 450 includes several arrays of red, green and blue LEDs 564 which indicate several charging states from empty to full. Blue is the default 'charging' and 'pod empty' status color and they are transmitted via a translucent elastomeric light pipe 566 as an illuminated arc around the pod base molding 568.

Despite a reasonable centre of gravity with a pen inserted, a cast weight 570 sits in the base molding 568 to increase stability and lessen the chance of the pod 450 falling over when knocked. The base molding 568 screws into the tower molding 554 to hold the weight 570, light pipe 566 and PCB 560 after the tethered USB/power cable 572 is connected to the pod PCB 560.

Personalisation

In line with the market differentiation ability of the pen, the pod includes a pod jacket molding 468. This user removable molding is printed with the same aquagrahic transfer pattern as the tube and cap moldings of the pen it is supplied with as a kit.

Therefore the pattern of the pen, cap and pod are three items that strongly identify an individual users pen and pod to avoid confusion where there are multiple products in the same environment. They also allow this product to become a personal statement for the user.

The pod jacket molding 468 can be supplied as an aftermarket accessory in any number of patterns and images with the cap assembly 472 and the tube molding 466 as discussed earlier.

Electronics Design

TABLE 3

| Electrical Specifications | |
|---|---|
| Processor | ARM7 (Atmel AT91FR40162) running at 80 MHz with 256 kB SRAM and 2 MB flash memory |
| Digital ink storage capacity | 5 hours of writing |
| Bluetooth Compliance | 1.2 |
| USB Compliance | 1.1 |
| Battery standby time | 12 hours (cap off), >4 weeks (cap on) |
| Battery writing time | 4 hours of cursive writing (81% pen down, assuming easy offload of digital ink) |
| Battery charging time | 2 hours |
| Battery Life | Typically 300 charging cycles or 2 years (whichever occurs first) to 80% of initial capacity. |
| Battery Capacity/Type | ~340 mAh at 3.7 V, Lithium-ion Polymer (LiPo) |

Pen Electronics Block Diagram

Figure 60:
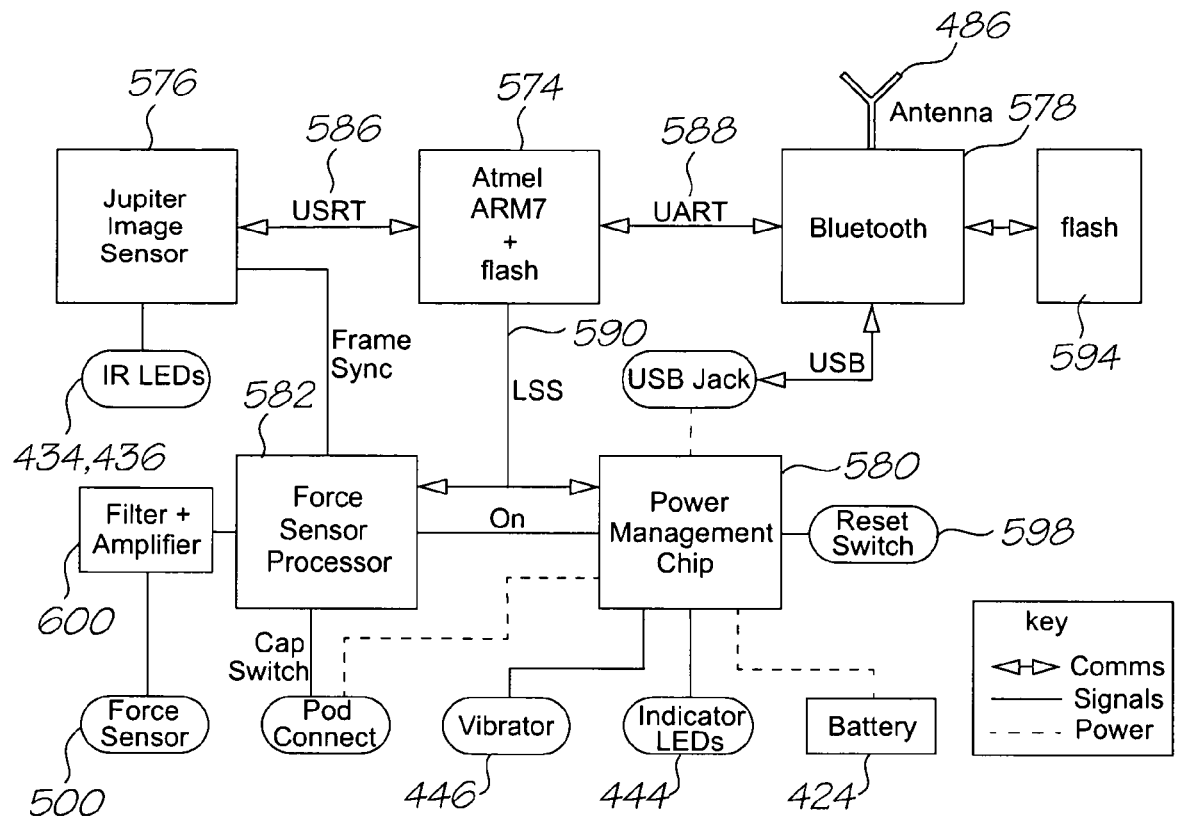
FIG. 60 is a block diagram of the pen electronics.

FIG. 60 is a block diagram of the pen electronics. The electronics design for the pen is based around five main sections. These are:
- the main ARM7 microprocessor 574,
- the image sensor and image processor 576,
- the Bluetooth communications module 578,
- the power management unit IC (PMU) 580 and
- the force sensor microprocessor 582.

ARM7 Microprocessor

The pen uses an Atmel AT91FR40162 microprocessor (see Atmel, *AT91 ARM Thumb Microcontrollers—AT91FR40162 Preliminary*, http://www.keil.com/dd/docs/datashts/atmel/at91fr40162.pdf) running at 80 MHz. The AT91FR40162 incorporates an ARM7 microprocessor, 256 kBytes of on-chip single wait state SRAM and 2 MBytes of external flash memory in a stack chip package.

This microprocessor 574 forms the core of the pen 400. Its duties include:
- setting up the Jupiter image sensor 584,
- decoding images of Netpage coded impressions, with assistance from the image processing features of the image sensor 584, for inclusion in the digital ink stream along with force sensor data received from the force sensor microprocessor 582,
- setting up the power management IC (PMU) 580,
- compressing and sending digital ink via the Bluetooth communications module 578, and
- programming the force sensor microprocessor 582.

The ARM7 microprocessor 574 runs from an 80 MHz oscillator. It communicates with the Jupiter image sensor 576 using a Universal Synchronous Receiver Transmitter (USRT) 586 with a 40 MHz clock. The ARM7 574 communicates with the Bluetooth module 578 using a Universal Asynchronous Receiver Transmitter (UART) 588 running at 115.2 kbaud. Communications to the PMU 580 and the Force Sensor microProcessor (FSP) 582 are performed using a Low Speed Serial bus (LSS) 590. The LSS is implemented in software and uses two of the microprocessor's general purpose IOs.

The ARM7 microprocessor 574 is programmed via its JTAG port. This is done when the microprocessor is on the main PCB 422 by probing bare pads 592 (see FIG. 63) on the PCB.

Jupiter Image Sensor

The Jupiter Image Sensor 584 (see U.S. Ser. No. 10/778, 056 listed in the cross referenced documents above) contains a monochrome sensor array, an analogue to digital converter (ADC), a frame store buffer, a simple image processor and a phase lock loop (PLL). In the pen, Jupiter uses the USRT's clock line and its internal PLL to generate all its clocking requirements. Images captured by the sensor array are stored in the frame store buffer. These images are decoded by the ARM7 microprocessor 574 with help from the Callisto image processor contained in Jupiter.

Jupiter controls the strobing of two infrared LEDs 434 and 436 at the same time as its image array is exposed. One or other of these two infrared LEDs may be turned off while the image array is exposed to prevent specular reflection off the paper that can occur at certain angles.

Bluetooth Communications Module

The pen uses a CSR BlueCore4-External device (see CSR, *BlueCore4-External Data Sheet rev c*, 6 Sep. 2004) as the Bluetooth controller 578. It requires an external 8 Mbit flash memory device 594 to hold its program code. The BlueCore4 meets the Bluetooth v1.2 specification and is compliant to v0.9 of the Enhanced Data Rate (EDR) specification which allows communication at up to 3 Mbps.

A 2.45 GHz chip antenna 486 is used on the pen for the Bluetooth communications.

The BlueCore4 is capable of forming a UART to USB bridge. This is used to allow USB communications via data/power socket 458 at the top of the pen 456.

Alternatives to Bluetooth include wireless LAN and PAN standards such as IEEE 802.11 (Wi-Fi) (see IEEE, 802.11 *Wireless Local Area Networks*, http://grouper.ieee.org/groups/802/11/index.html), IEEE 802.15 (see IEEE, 802.15 *Working Group for WPAN*, http://grouper.ieee.org/groups/802/15/index.html), ZigBee (see ZigBee Alliance, http://www. zigbee.org), and WirelessUSB Cypress (see *WirelessUSB LR 2.4-GHz DSSS Radio SoC*, http://www.cypress.com/cfuploads/img/products/cywusb6935.pdf), as well as mobile standards such as GSM (see GSM Association, http://www.gsmworld.com/index.shtml), GPRS/EDGE, *GPRS Platform*, http://www.gsmworld.com/technology/gprs/index.shtml), CDMA (see CDMA Development Group, http://www.cdg.org/, and Qualcomm, http://www.qualcomm.com), and UMTS (see 3rd Generation Partnership Project (3GPP), http://www.3gpp.org).

Power Management Chip

The pen uses an Austria Microsystems AS3603 PMU 580 (see Austria Microsystems, *AS3603 Multi-Standard Power Management Unit Data Sheet* v2.0). The PMU is used for battery management, voltage generation, power up reset generation and driving indicator LEDs and the vibrator motor.

The PMU 580 communicates with the ARM7 microprocessor 574 via the LSS bus 590.

The PMU uses one of two sources for charging the battery 424. These are the power from the power and USB jack 458 at the top of the pen 456 (see FIG. 15) and the power from the pod 450 via the two conductive tubes 498 (see FIG. 24). The PMU charges the pen's lithium polymer battery 424 using trickle current, constant current and constant voltage modes with little intervention required by the ARM7 microprocessor 574. The PMU also includes a fuel gauge which is used by the ARM7 microprocessor to determine how much battery capacity is left.

The PMU 580 generates the following separate voltages:
3.0V from an LDO for the ARM7 IO voltage and the Jupiter IO and pixel voltages.
3.0V from an LDO for the force sensor and force sensor filter and amplifier (3.0V for the force sensor microprocessor is generated from an off chip LDO since the PMU contains no LDOs that can be left powered on).
3.0V from an LDO for the BlueCore4 Bluetooth device.
1.8V from a buck converter for the ARM7 core voltage.
1.85V from an LDO for the Jupiter core voltage.
5.2V from a charge pump for the infrared LED drive voltage.

At power up or reset of the PMU, the ARM7 IO voltage and 1.8V core voltage are available. The other voltage sources need to be powered on via commands from the ARM7 574 via the LSS bus 590.

Indicator LEDs 444 and the vibrator motor 446 are driven from current sink outputs of the PMU 580.

The PMU 580 can be put into ultra low power mode via a command over the LSS bus 590. This powers down all of its external voltage sources. The pen enters this ultra low power mode when its cap assembly 472 is on.

When the cap 472 is removed or there is an RTC wake-up alarm, the PMU 580 receives a power on signal 596 from the force sensor microprocessor 582 and initiates a reset cycle. This holds the ARM7 microprocessor 574 in a reset state until all voltages are stable. A reset cycle can also be initiated by the ARM7 574 via a LSS bus message or by a reset switch 598 which is located at the top of the pen next to the USB and power jack 458 (see FIG. 15).

Force Sensor Subsystem

The force sensor subsystem comprises a custom Hokuriku force sensor 500 (based on Hokuriku, *HFD-500 Force Sensor*, http://www.hdk.co.jp/pdf/eng/e1381AA.pdf), an amplifier and low pass filter 600 implemented using op-amps and a force sensor microprocessor 582.

The pen uses a Silicon Laboratories C8051F330 as the force sensor microprocessor 582 (see Silicon Laboratories, *C8051F330/1 MCU Data Sheet*, rev 1.1). The C8051F330 is an 8051 microprocessor with on chip flash memory, 10 bit ADC and 10 bit DAC. It contains an internal 24.5 MHz oscillator and also uses an external 32.768 kHz tuning fork.

The Hokuriku force sensor 500 is a silicon piezoresistive bridge sensor. An op-amp stage 600 amplifies and low pass (anti-alias) filters the force sensor output. This signal is then sampled by the force sensor microprocessor 582 at 5 kHz.

Alternatives to piezoresistive force sensing include capacitive and inductive force sensing (see Wacom, "Variable capacity condenser and pointer", U.S. Patent Application 20010038384, filed 8 Nov. 2001, and Wacom, *Technology*, http://www.wacom-components.com/english/tech.asp).

The force sensor microprocessor 582 performs further (digital) filtering of the force signal and produces the force sensor values for the digital ink stream. A frame sync signal from the Jupiter image sensor 576 is used to trigger the generation of each force sample for the digital ink stream. The temperature is measured via the force sensor microprocessor's 582 on chip temperature sensor and this is used to compensate for the temperature dependence of the force sensor and amplifier. The offset of the force signal is dynamically controlled by input of the microprocessor's DAC output into the amplifier stage 600.

The force sensor microprocessor 582 communicates with the ARM7 microprocessor 574 via the LSS bus 590.

There are two separate interrupt lines from the force sensor microprocessor 582 to the ARM7 microprocessor 574. One is used to indicate that a force sensor sample is ready for reading and the other to indicate that a pen down/up event has occurred.

The force sensor microprocessor flash memory is programmed in-circuit by the ARM7 microprocessor 574.

The force sensor microprocessor 582 also provides the real time clock functionality for the pen 400. The RTC function is performed in one of the microprocessor's counter timers and runs from the external 32.768 kHz tuning fork. As a result, the force sensor microprocessor needs to remain on when the cap 472 is on and the ARM7 574 is powered down. Hence the force sensor microprocessor 582 uses a low power LDO separate from the PMU 580 as its power source. The real time clock functionality includes an interrupt which can be programmed to power up the ARM7 574.

The cap switch 602 is monitored by the force sensor microprocessor 582. When the cap assembly 472 is taken off (or there is a real time clock interrupt), the force sensor microprocessor 582 starts up the ARM7 572 by initiating a power on and reset cycle in the PMU 580.

Pen Design

Electronics PCBs and Cables

There are two PCBs in the pen, the main PCB 422 (FIG. 63) and the flex PCB 496 (FIG. 19). The other separate components in the design are the battery 424, the force sensor 500, the vibrator motor 446 and the conductive tubes 498 (FIG. 16) which function as the power connector to the pod 450 (FIG. 31).

Main PCB

Figure 63:
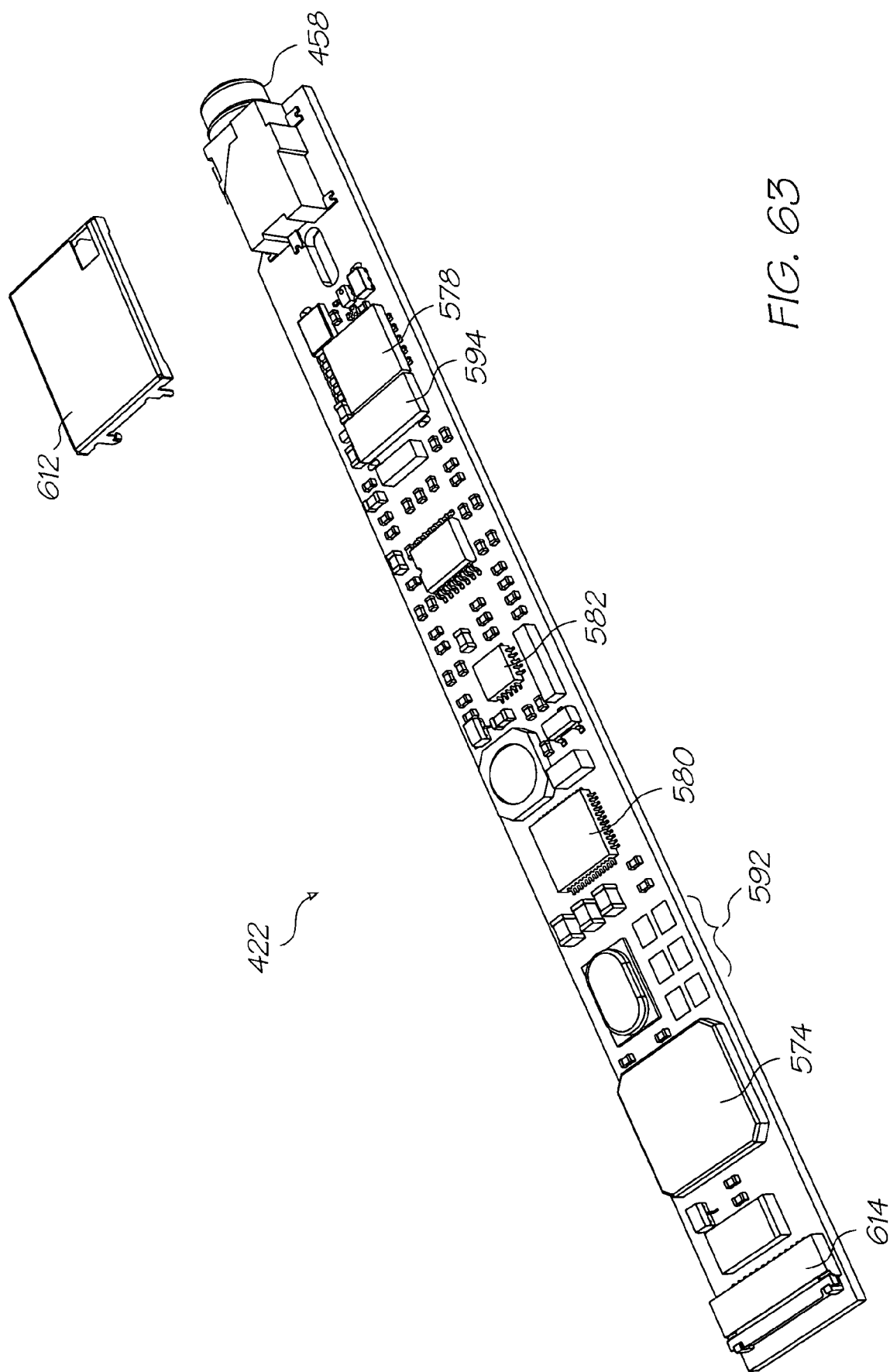
FIG. 63 is a bottom perspective of the main PCB with the Bluetooth antenna shield removed.
Figure 64:
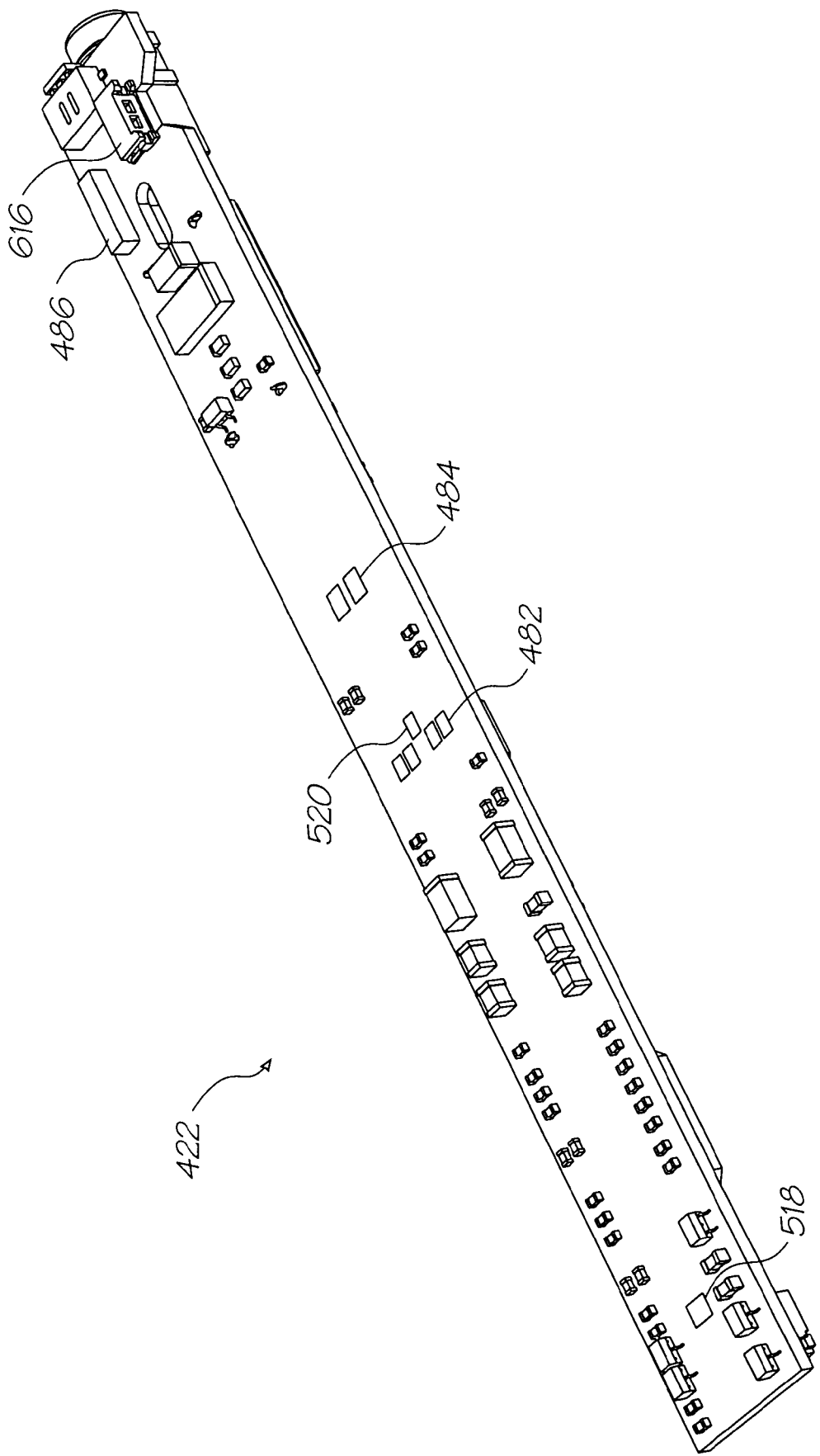
FIG. 64 is a top perspective of the main PCB.

FIGS. 63 and 64 show top and bottom perspectives respectively of the main PCB 422. The main PCB 422 is a 4-layer FR4 1.0 mm thick PCB with minimum trace width and separation of 100 microns. Via specification is 0.2 mm hole size in a 0.4 mm pad. The main PCB 422 is a rectangular board with dimensions 105 mm×11 mm.

The major components which are soldered to the main PCB are the Atmel ARM7 microprocessor 574, the AMS PMU 580, the Silicon Labs force sensor microprocessor 582, the op-amps for force sensor conditioning amplifier 600 and the CSR Bluetooth chip 578 and its flash memory 594, antenna 486 and shielding can 612.

The force sensor 500, the vibrator motor 446 and the coaxial conductive tubes 498 use sprung contacts to connect to pads on the main PCB 422. All of these items are pushed down onto the main PCB 422 by the chassis molding 416 of the pen.

There are three connectors soldered onto the main PCB 422; the flex PCB connector 612, the power and USB jack 458 at the top of the pen 456, and the battery cable harness connector 616. The cable harness to the battery is the only wired cable inside the pen.

Also soldered onto the main PCB 422 is the reset switch 598. This is in the recess 464 shown in FIG. 5.

Flex PCB

The Jupiter image sensor 576 is mounted on the flex PCB 496 as shown in FIG. 19. As the critical positioning tolerance in the pen is between the optics 426 and the image sensor 490, the flex PCB 496 allows the optical barrel molding 492 to be easily aligned to the image sensor 490. By having a flexible connection between the image sensor and the main PCB 422, the positioning tolerance of the main PCB is not critical for the correct alignment of the optics 426.

The image sensor 490, the two infrared LEDs 434 and 436, and five discrete bypass capacitors 502 are mounted onto the flex PCB 496. The flex is a 2-layer polyimide PCB, nominally 75 microns thick. The PCB is specified as flex on install only, as it is not required to move after assembly of the pen. Stiffener 612 is placed behind the discrete components 502 and behind the image sensor 490 in order to keep these sections of the PCB flat. Stiffener is also placed at the connection pads 620 to make it the correct thickness for the connector 614 the main PCB 422 (see FIG. 28). The PCB design has been optimised for panel layout during manufacture by keeping it roughly rectangular in overall shape.

The flex PCB 496 extends from the main PCB, widening around the image sensor 490 and then has two arms 622 and 624 that travel alongside the optical barrel 492 to the two infrared LEDs 434 and 436. These are soldered directly onto the arms 622 and 624 of flex PCB. The total length of the flex PCB is 41.5 mm and at its widest point it is 9.5 mm.

The image sensor 490 is mounted onto the flex PCB 496 using a chip on flex PCB (COF) approach. In this technology, the bare Jupiter die 628 is glued onto the flex PCB 496 and the pads on the die are wire-bonded onto target pads on the flex PCB. These target pads are located beside the die. The wirebonds are then encapsulated to prevent corrosion. Two non-plated holes 626 in the flex PCB next to the die 628 are used to align the PCB to the optical barrel 492. The optical barrel is then glued in place to provide a seal around the image sensor 470. The horizontal positional tolerance between the centre of the optical path and the centre of the imaging area on the Jupiter die 628 is +/−50 microns. The vertical tolerance due to the thickness of the die, the thickness of the glue layer and the alignment of the optical barrel 492 to the front of the flex PCB 496 is +/−5 microns. In order to fit in the confined space at the front of the pen, the Jupiter die 628 is designed so that the pads required for connection in the Netpage pen are placed down opposite sides of the die.

Pod and External Cables

There are three main functions that are required by the pod and external cabling. They are:
provide a charging voltage so that the pen can recharge its battery,
provide a relay mechanism for transferring stored digital ink to the Netpage server via its Bluetooth/USB adapter and
provide a relay mechanism for downloading new program code to the pen via its Bluetooth/USB adapter.

Pod

Again referring to FIGS. 31 and 32, when the pen 400 is inserted into the pod 450, power is provided by way of two sprung contacts 516 in the pod which connect to the two coaxial conductive tubes 498 that hold the ink cartridge tube 536 in the pen. The power for the pod 450 and the pen 400 charging is provided by USB bus power.

The pod has a tethered cable 572 which ends in two connectors. One is a USB "A" plug. The other is a 4-way jack socket. This 4-way jack socket is the same one present at the top of the pen (see socket 458 in FIG. 15). When the 4-way jack is inserted into the pod's cable, it provides power for the pod and to the pen for charging. Otherwise, the power for the pod and the pen charging is provided by the USB bus power.

Three indicator LEDs 452 are present in the pod. They indicate the status of pen charging and communications.

Pod PCB

The pod PCB 560 contains a CSR BlueCore4-External device. This is the same type of Bluetooth device as used in the pen 400. The BlueCore4 device functions as a USB to Bluetooth bridge.

Cabling

Three cables are provided with the pen. The first cable 572 is tethered to the pod. At the other end of the cable is a USB A connector and a 4-way jack socket. There are six wires going into the pod, the four USB wires and two from the 4-way jack socket.

The second cable is a USB cable 462 (FIG. 15) with a USB A connector on one end and a 4-way jack on the other end. The 4-way jack can be connected to either the pod or the top of the pen.

The third cable is a plug pack power cable (not shown) which plugs into a power outlet at one end and has a 4-way jack on the other end. This 4-way jack can be connected to either the pod 450 or the top of the pen 456.

Connection Options

Figure 61:
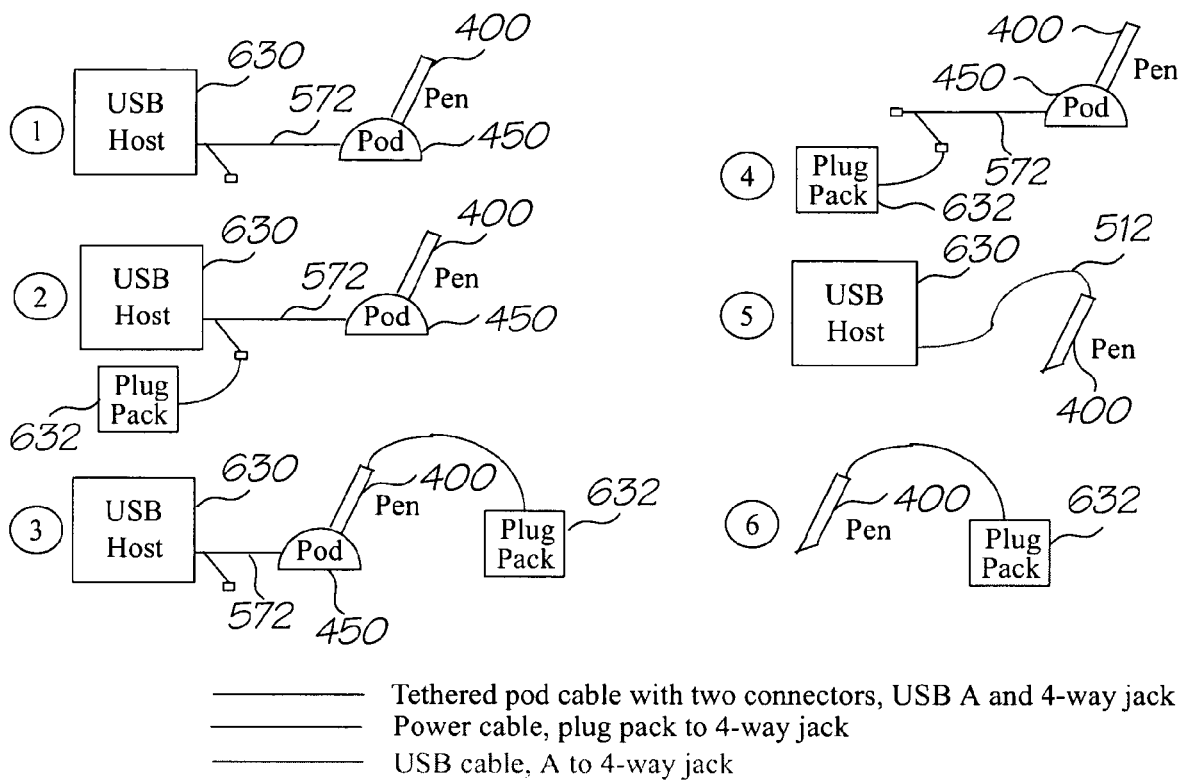
FIG. 61 show the charging and connection options for the pen and the pod.

FIG. 61 shows the main charging and connection options for the pen and pod:
Option 1 shows a USB connection from a host 630 to the pod 450. The pen 400 is in the pod 450. The pod 450 and the pen 400 communicate via Bluetooth. The pod is powered by the USB bus power. The pen is charged from the USB bus power. As a result the maximum USB power of 500 mA must be available in order to charge the pen.
Option 2 shows a USB connection from the host 630 to the pod 450 and a plug pack 632 attached to the pod cable

572. The pen 400 is in the pod 450. The pod and the pen communicate via Bluetooth. The pod is powered by the plug pack. The pen is charged from the plug pack power.

Option 3 shows a USB connection from the host 630 to the pod 450 and a plug pack 632 attached to the pen 400. The pen 400 is in the pod 450. The pod and the pen communicate via Bluetooth. The pod is powered by the USB bus power. The pen is charged from the plug pack power.

Option 4 shows a plug pack 632 attached to the pod cable 572. The pen 400 is in the pod 450. There is no communication possible between the pod and the pen. The pod is powered by the plug pack. The pen is charged from the plug pack power.

Option 5 shows a USB connection from the host 630 to the pen 400. The pen 400 is not in the pod 450. The host 630 and the pen 400 communicate via USB, allowing a wired, non-RF communication link. The pen is charged from the USB bus power. As a result the maximum USB power of 500 mA must be available in order to charge the pen.

Option 6 shows the plug pack 632 attached to the pen 400. The pen 400 is not in the pod 450. The pen is charged from the plug pack power.

Other connection options are not shown. However, it should be kept in mind that the pod is powered via its 4-way jack connector (and not from the USB bus power) if there is a connector in this jack. Also, the pen is powered from its 4-way jack (and not from its pod connection) when there is a connector in this jack.

Battery and Power Consumption

Figure 68:
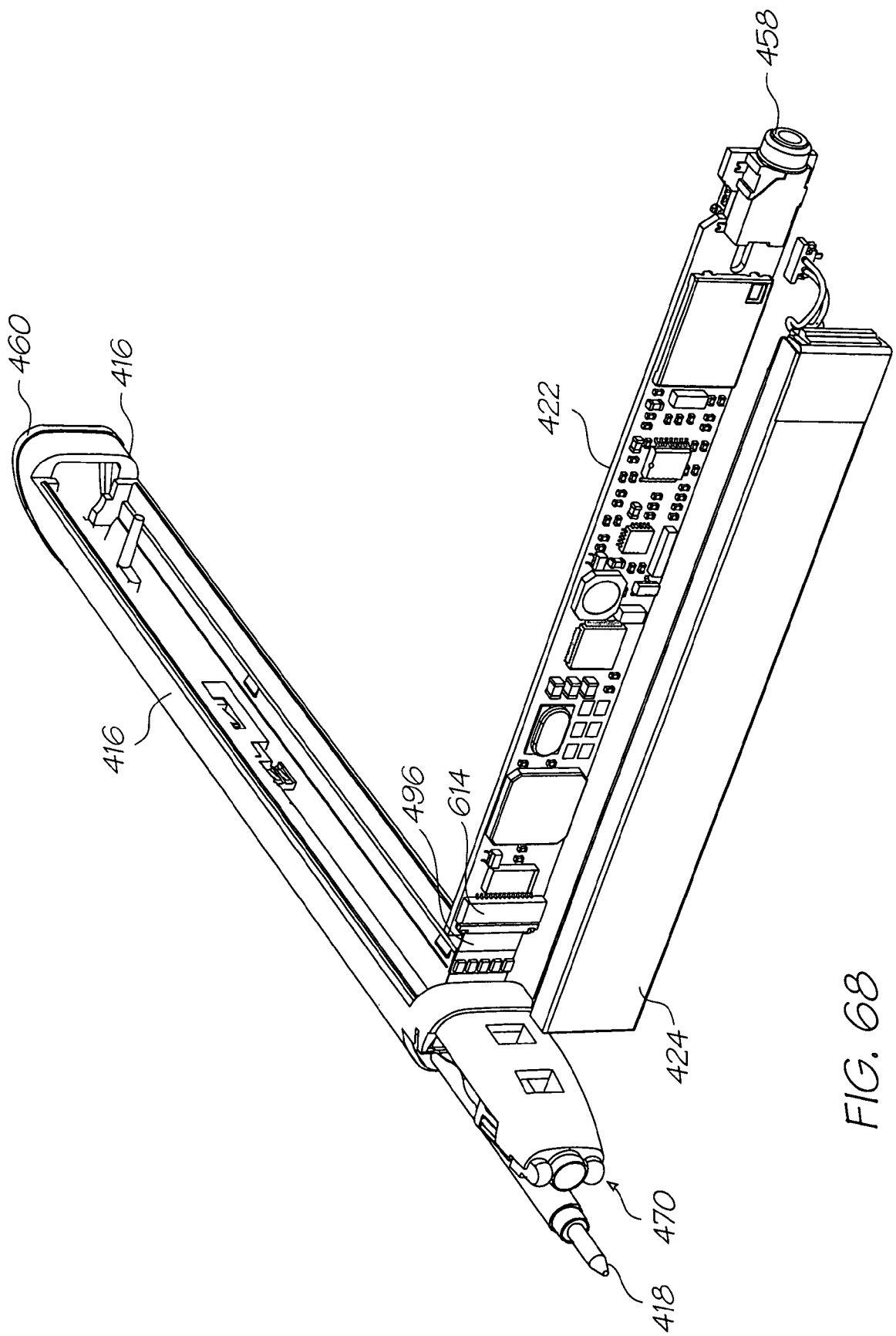
FIG. 68 is a bottom perspective of the battery and main PCB partially installed in the chassis molding.

Referring to FIG. 68, the pen 400 contains a Lithium polymer battery 424 with a nominal capacity of 340 mAh. It's dimensions are 90.5 mm long×12 mm wide×4.5 mm thick.

Based on the pen design, Table 4 shows the current requirements for various pen and Bluetooth states.

TABLE 4

Battery drain currents for all Pen states.

| State | Notes | Total mA @ VBatt[1] |
|---|---|---|
| Pen Capped | Pen is off | 0.110 |
| Pen Active | Pen Down | 92.7 |
| Pen Hover-1 | Pen up, trying to decoded tags | 31.7 |
| Pen Hover-2 | Pen up, decoding tags | 62.9 |
| Pen Idle | Pen up, not trying to decode tags | 28.8 |
| Bluetooth Not Connected | Bluetooth IC off | 0.0 |
| Bluetooth Connection Timeout | Bluetooth connected in low power, no digital ink to download | 0.6 |
| Bluetooth Connected (Sniff) | Bluetooth connected in low power Sniff state | 4.1 |
| Bluetooth Connected (Active) | Bluetooth connected in high power Active state | 50.1 |
| Bluetooth Connecting | Bluetooth trying to connect Network Access Point | 15.1 |

[1]Sum of all current drains at battery. The Bluetooth currents can be concurrent with and additive to the Pen-state currents.

Pen Usage Scenarios

Some general usage scenarios are summarised here, showing the energy requirements needed to fulfil these scenarios.

Worst Case Scenario

Summary: The pen is used intensively for 4 hours (cursive writing) and will sit capped for one month (31 days), trying to offload stored digital ink.

The energy requirement for this scenario is 968 mAh. The nominal 340 mAh hour battery would achieve 35% of energy requirement for this scenario.

Single Working Week Case Scenario

Summary: The pen is used for cursive writing for a total of one hour a day for five days. and is capped for the remaining time. Total time for scenario is seven days.

The energy requirement for this scenario is 456 mAh. The nominal 340 mAh hour battery would achieve 75% of energy requirement for this scenario.

Single Working Week Not Capped During Working Hours Case Scenario

Summary: The pen is used for cursive writing for a total of one hour a day for five days. and is capped for the remaining time. Total time for scenario is seven days.

The energy requirement for this scenario is 1561 mAh. The nominal 340 mAh hour battery would achieve 22% of energy requirement for this scenario.

Software Design

Netpage Pen Software Overview

The Netpage pen software comprises that software running on microprocessors in the Netpage pen 400 and Netpage pod 450.

The pen contains a number of microprocessors, as detailed in the Electronics Design section described above. The Netpage pen software includes software running on the Atmel ARM7 CPU 574 (hereafter CPU), the Force Sensor microprocessor 582, and also software running in the VM on the CSR BlueCore Bluetooth module 578 (hereafter pen BlueCore). Each of these processors has an associated flash memory which stores the processor specific software, together with settings and other persistent data. The pen BlueCore 578 also runs firmware supplied by the module manufacturer, and this firmware is not considered a part of the Netpage pen software.

The pod 450 contains a CSR BlueCore Bluetooth module (hereafter pod BlueCore). The Netpage pen software also includes software running in the VM on the pod BlueCore.

As the Netpage pen 400 traverses a Netpage tagged surface 548, a stream of correlated position and force samples are produced (see Netpage Overview above). This stream is referred to as DInk. Note that DInk may include samples with zero force (so called "Hover DInk") produced when the Netpage pen is in proximity to, but not marking, a Netpage tagged surface.

The CPU component of the Netpage pen software is responsible for DInk capture, tag image processing and decoding (in conjunction with the Jupiter image sensor 576), storage and offload management, host communications, user feedback and software upgrade. It includes an operating system (RTOS) and relevant hardware drivers. In addition, it provides a manufacturing and maintenance mode for calibration, configuration or detailed (non-field) fault diagnosis. The Force Sensor microprocessor 582 component of the Netpage pen software is responsible for filtering and preparing force samples for the main CPU. The pen BlueCore VM software is responsible for bridging the CPU UART 588 interface to USB when the pen is operating in tethered mode. The pen BlueCore VM software is not used when the pen is operating in Bluetooth mode.

The pod BlueCore VM software is responsible for sensing when the pod 450 is charging a pen 400, controlling the pod LEDs 452 appropriately, and communicating with the host PC via USB.

A more detailed description of the software modules is set out below.

The Netpage pen software is field upgradable, with the exception of the initial boot loader. The field upgradable portion does include the software running on the Force Sensor microprocessor 582. Software upgrades are delivered to the pen via its normal communication mechanisms (Bluetooth or USB). After being received and validated, a new software image will be installed on the next shutdown/startup cycle when the pen contains no DInk pending offload.

Netpage System Overview

The Netpage pen software is designed to operate in conjunction with a larger software system, comprising Netpage relays and Netpage servers. The following is a brief overview of these systems in relation to the Netpage pen—a detailed discussion of the software for these systems and the specification of its interface to Netpage pen software is set out in the cross referenced documents.

Netpage relays are responsible for receiving DInk from pens, and transmitting that DInk to Netpage servers or local applications. The relay is a trusted service running on a device trusted by the pen (paired in Bluetooth terminology). The relay provides wide area networking services, bridging the gap between the pen and DInk consumers (such as Netpage servers or other applications). The primary relay device will be a desktop/laptop computer equipped with a Netpage pod. Bluetooth equipped mobile phones and PDAs can also be used as relays. Relays provide the pen with access to WAN services by bridging the Bluetooth connection to GPRS, WiFi or traditional wired LANs.

Netpage servers persist DInk permanently, and provide both application services for DInk based applications (such as handwriting recognition and form completion), and database functionality for persisted DInk (such as search, retrieval and reprinting).

Local applications may receive the DInk stream from the Netpage relay and use it for application specific purposes (such as for pointer replacement in image creation/manipulation applications).

Internal Design

The Netpage pen software is divided into a number of major modules:
  Image Processing
  DInk storage and offload management
  Host Communications
  User Feedback
  Power Management
  Software Upgrade
  Real Time Operating System
  Hardware Drivers
  Manufacturing and Maintenance mode
  Force Sensor Microprocessor software
  Pen BlueCore VM software
  Pod BlueCore VM software The remainder of this section gives a brief overview of these major software modules.

Image Processing

The position information in the DInk stream produced by traversing a Netpage tagged surface is produced by performing an analysis of tagged images captured by the Jupiter Image Sensor 576.

The Image Processing module is responsible for analysing images captured by Jupiter, identifying and decoding tags, estimating the pose of the pen, and combining this information to obtain position samples.

DInk Storage and Offload Management

Any DInk which corresponds to physical marking of a Netpage tagged surface (e.g. excluding Hover DInk) must be reliably and transactionally recorded by the Netpage system to allow for accurate reproduction of the Netpage tagged surface. Ensuring such DInk is recorded is the responsibility of the DInk storage and offload management software. It persists DInk in flash memory on the Netpage pen, and arranges for offload of DInk to a Netpage server via a Netpage relay. This offload process is transactional—the pen software maintains its record of DInk until it can guarantee that DInk has been received and persisted by a Netpage server.

DInk may be streamed in real time to applications requiring real time response to DInk (for example applications which use the pen as a replacement for a mouse or table pointer, such as graphics editing applications). This may be normal DInk or Hover DInk (for applications supporting hover), and the ability of the Netpage pen software to stream DInk to such applications is orthogonal to the storage and offload requirements for persistent DInk.

Host Communications

The Netpage pen software communicates with the Netpage relay either through wireless Bluetooth communication, or through a wired USB connection. Bluetooth connectivity is provided by the pen BlueCore. USB connectivity is provided by using the Bluetooth module in "pass through" mode.

The Communications module of the software is responsible for reliably transmitting DInk from the DInk storage and offload management module to the relay. It also provides management functionality such as maintaining a persistent list of known, trusted relays, and allows pairing with devices according to user specification. The communications module includes third party software (namely the ABCSP stack, see CSR, *ABCSP Overview*, *AN*11) provided by CSR for communication with the pen BlueCore. Bluetooth communication is only performed with Bluetooth paired devices, and uses the Bluetooth encryption facilities to secure these communications.

User Feedback

The Netpage pen provides two LEDs (red and green) and a vibration motor for user feedback. The user feedback software module is responsible for converting signals from other software modules into user feedback using the provided mechanisms.

Power Management

The Netpage pen has a limited power budget, and its design allows for dynamic power saving in a number of ways. For example, the CPU can disable peripherals when they are not in use to save power, and the pen BlueCore can be placed into a deep sleep mode or powered down when it is not required. The CPU itself can be powered down when the pen is not performing higher functions. Indeed, the only always-on components are the Force Sensor microprocessor 582 and Power Management Chip 580 which can power on the CPU in response to external stimuli. The Power Management module 580 is responsible for analysing the current pen state and optimizing the power usage by switching off un-needed peripherals and other components as required. That is, this module intelligently manages the facilities offered by the Power Management module to provide optimal power usage given the required pen functionality.

Software Upgrade

The Netpage pen software is field upgradable, obtaining new software images via its Bluetooth or USB connections. The Software Upgrade module is responsible for managing the download of complete images via the Communications module, validating these images against included checksums, and arranging for the pen to boot from a revised image when it has been validated.

The Software Upgrade process happens largely concurrently with normal pen behaviour. The download of new images can happen concurrently with normal pen operation and DInk offload. However, the actual switch to boot from a new software image is only performed when no outstanding DInk remains to be offloaded. This simplifies management of the internal DInk formats, allowing them to be upgraded as necessary in new software loads. Existing pairing arrangements with relays are expected to survive software upgrade, although under some circumstances it may be necessary to repeat pairing operations.

It should also be noted that small parts of the Netpage pen software, such as basic boot logic, are not field upgradable. These parts of the software are minimal and tightly controlled.

Note that the Software Upgrade module also manages software images for the Force Sensor microprocessor. Images for the latter form a part of the Netpage pen software load, and the Software Upgrade module reprograms the Force Sensor microprocessor in the field when a new image contains revisions to the Force Sensor microprocessor software.

Real Time Operating System

The Netpage pen software includes a Real Time Operating System (RTOS) for efficient management of CPU resources. This allows optimal handling of concurrent DInk capture, persistence, and offload despite the latencies involved in image capture, flash manipulation, and communication resources.

The RTOS for the Netpage pen software is the uC/OS II RTOS from Micrium Systems (see Labrosse, J. L., *MicroC OS II: The Real Time Kernel, 2nd Edition*, CMP Books, ISBN 1578201039). This part of the Netpage pen software is comprised largely of third party code supplied by Micrium, tailored and customized for the needs of the pen.

Hardware Drivers

The Netpage pen software includes hardware drivers for all peripherals (both internal to the CPU and external to it) required for operation of the Netpage pen 400. This includes USRT 586, UART 588 and LSS 590 drivers for external bus communication, as well as higher level drivers for managing the Jupiter Image Sensor 576, the pen BlueCore 578, the Force Sensor microprocessor 582, the Power Management IC 580, and other internal systems.

Manufacturing and Maintenance Mode

The Netpage pen 400 may be put into a special manufacturing and maintenance mode for factory calibration or detailed non-field failure analysis. A deployed pen will never enter manufacturing and maintenance mode. It is a configuration, diagnostic and rectification mode that is only expected to be used by Silverbrook engineers under controlled conditions. The mechanism for placing the Netpage pen software into maintenance mode is not described here.

Force Sensor Microprocessor Software

The Force Sensor microprocessor 582 is an independent CPU tasked with filtering and resampling the force data obtained from the Force Sensor 500 proper to produce a stream of force samples to be included into the DInk stream as recorded by the pen. It is also responsible for initiating a wakeup of the CPU 574 in response to a pen down, uncap, or timer event, in the case that the CPU has been switched off for power saving purposes.

Pen BlueCore VM Software

The pen BlueCore is capable of running a small amount of software in a virtual machine (VM). Such VM software is highly resource limited, but can access the Bluetooth functionality, the I/O ports, and a small number of GPIO pins on the pen BlueCore. A small part of the Netpage pen software will run on the pen BlueCore in order to manage bridging the CPU UART to the USB connection provided by the pen BlueCore.

Pod BlueCore VM Software

The Netpage pod 450 contains a CSR BlueCore Bluetooth module, but no general purpose microprocessor. The pod BlueCore runs Netpage pen software in its VM. This software is responsible for sensing when the pod 450 is charging a pen 400, controlling the pod LEDs 452 to indicate charging and communications status, and managing the USB communication link between the pod BlueCore and the host PC. Note that BlueCore provides a split stack model for the Bluetooth network stack, and the majority of the Bluetooth network stack will in fact be running on the host PC (where it has considerably greater access to resources).

Pen Assembly Sequence

Figure 65:
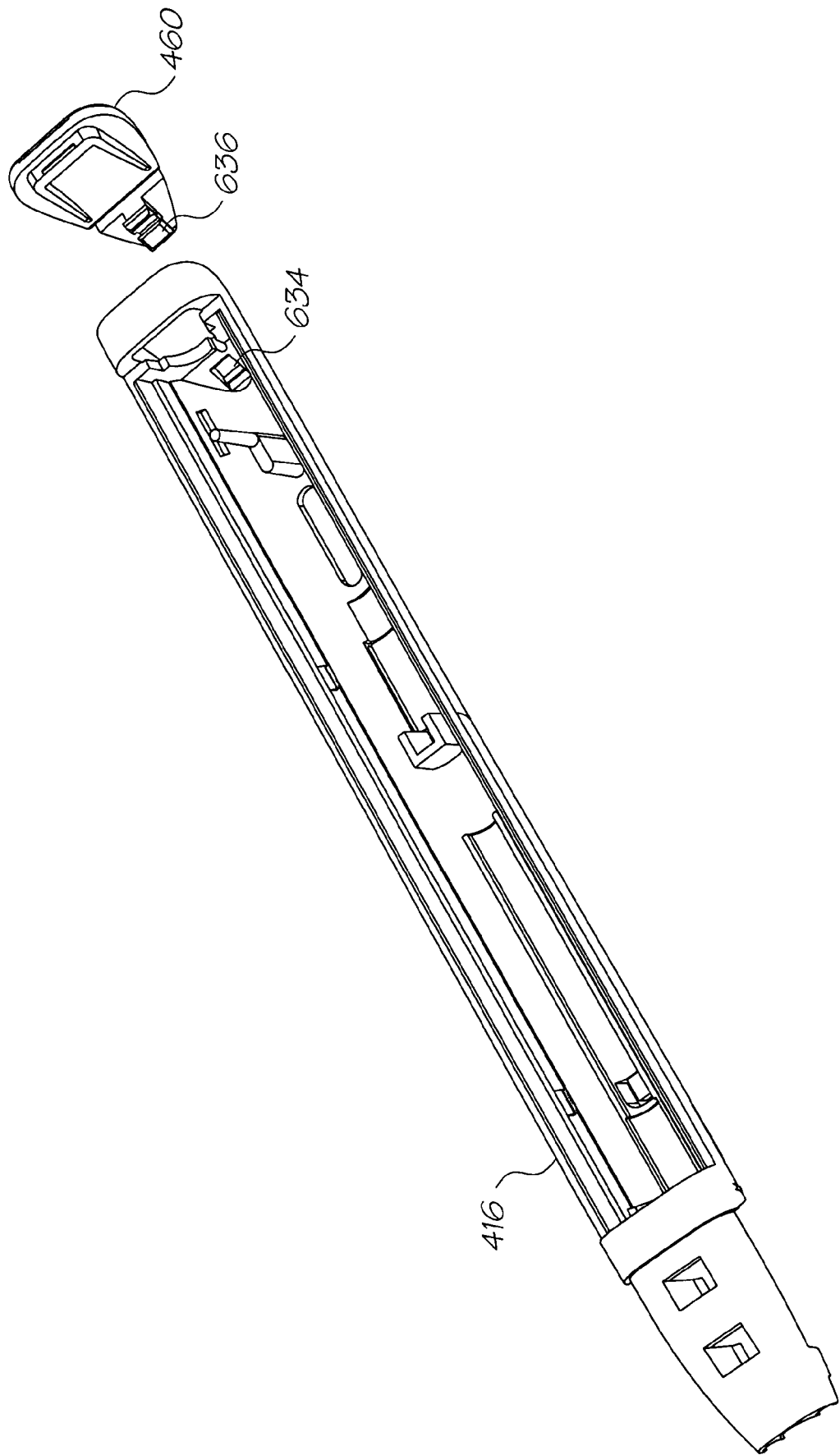
FIG. 65 is a bottom perspective of the chassis molding and elastomeric and cap.

The various sub-assemblies and components are manually inserted into the pen chassis molding 416 (see FIG. 65). There are no special tools required to insert any of the assemblies as there is extensive use of snap fits and bumps on moldings for location. The only assembly tool needed is a cold staking procedure required after a testing to seal the pen assembly.

The assembly sequence for the pen is as follows:

Pen Chassis Assembly

The elastomeric end cap 460 is fed through an aperture 634 at the end of the chassis molding 416 and a tab 636 pulled through to secure it in place.

Optics Assembly

The optics assembly sequence is as follows:

The lens is offered up to the aperture stop in the barrel and adhered in place.

The infrared filter is pushed into place in the front of the barrel molding.

The flex with image sensor is offered up to the top of the barrel molding and accurately located onto two pins.

Epoxy is applied around the base of the barrel molding to bond the flex into place and seal the image sensor from light and particulate contaminants.

Optics Assembly Insertion

As shown in FIG. 66A, the optics assembly 470 with the unfolded flex PCB 496 protruding is inserted into the chassis moulding 416 and snapped into place. The IR LEDs 434 and 436 are then manipulated into cradles 638 either side of the barrel moulding 492 as shown in FIG. 66B.

Force Sensing Assembly Insertion

Figures 67A, 67B:
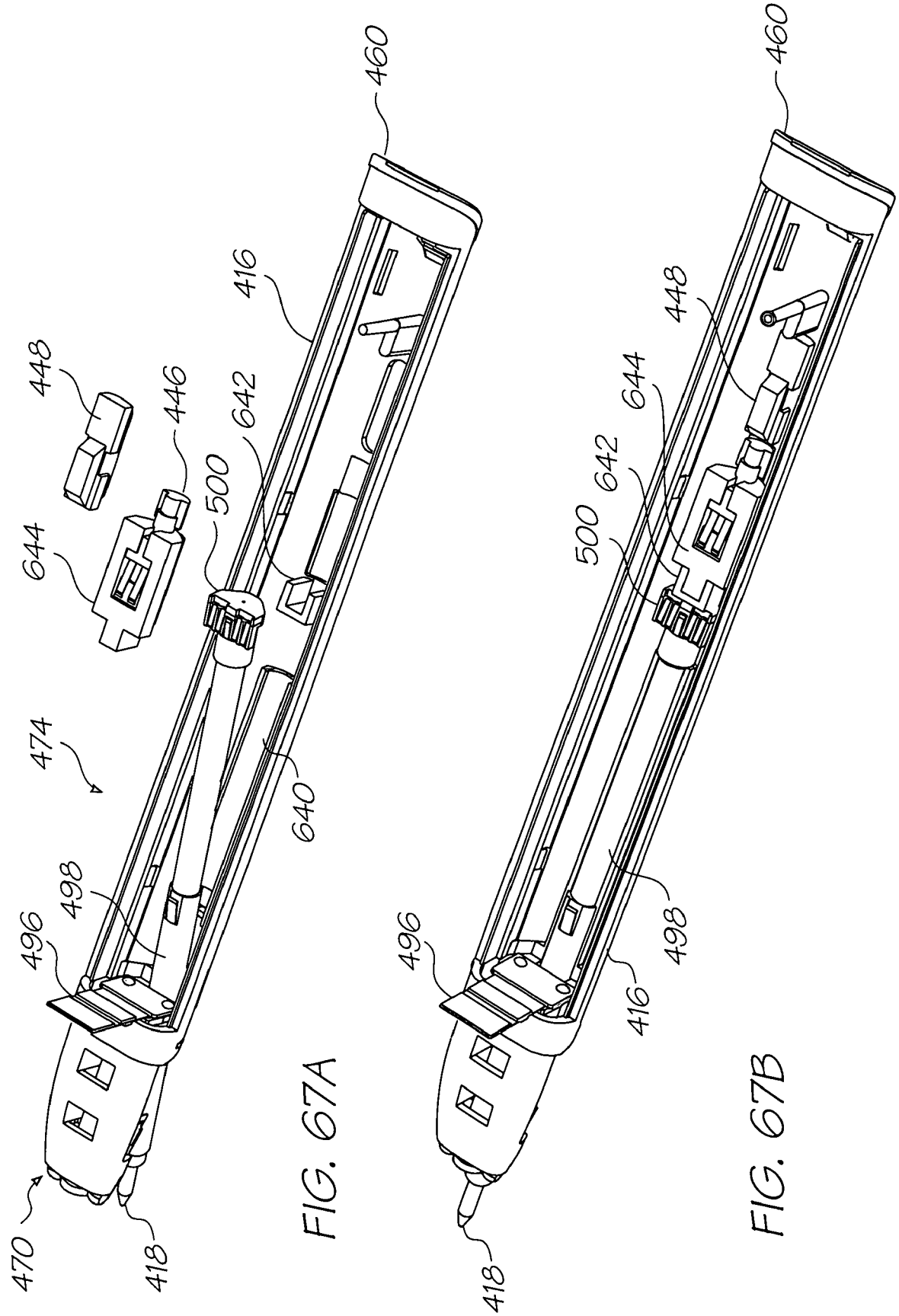
FIG. 67A is a bottom perspective of the force sensor assembly partially installed in the chassis molding.
FIG. 67B is a bottom perspective of the force sensing assembly installed in the chassis molding.

As shown in FIGS. 67A and 67B, the force sensing assembly 474 is fed through between the chassis moulding 416 and the optical barrel moulding 492. The assembly 474 is pivoted down and the force sensor is secured in the correct orientation into the chassis moulding between ribs 640 and a support detail 642.

The vibration motor 446 with elastomeric boot 644 is assembled into an aperture in the chassis 416. The boot 644 has negative draft on the support detail 642, which secures the motor 446 into the chassis 416 and orients it correctly.

A light pipe moulding 448 is placed into the chassis moulding 416 and is a force fit.

PCB and Battery Insertion

The end of the optics flex PCB 496 is offered into the flex connector 614 on the main PCB 422 and secured.

The main PCB 422 and LiPo battery 424 are then connected together as the socket is on the upper side of the PCB 422 and is not accessible when the board is in the chassis moulding 416. The battery 424 has foam pads to protect the components on the lower side of the PCB and to inhibit movement of the battery when it is fully assembled.

Figure 69:
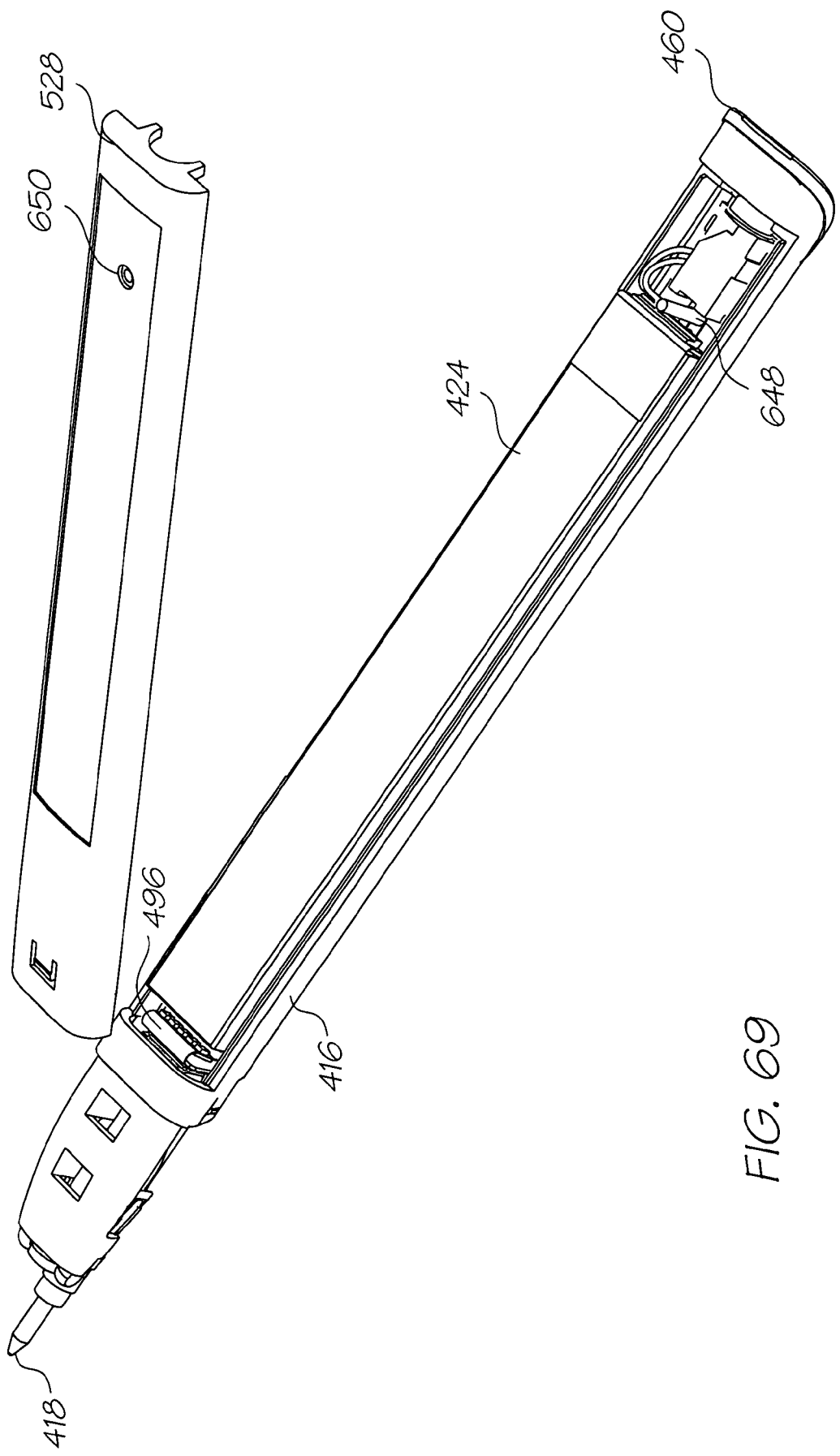
FIG. 69 is a bottom perspective of the chassis molding with the base molding lifted clear.

Referring to FIG. 69, the main PCB 422 and battery 424 can now be swung into place in the chassis moulding 416, with care being taken not to unduly stress the flex PCB 496.

Figure 70:
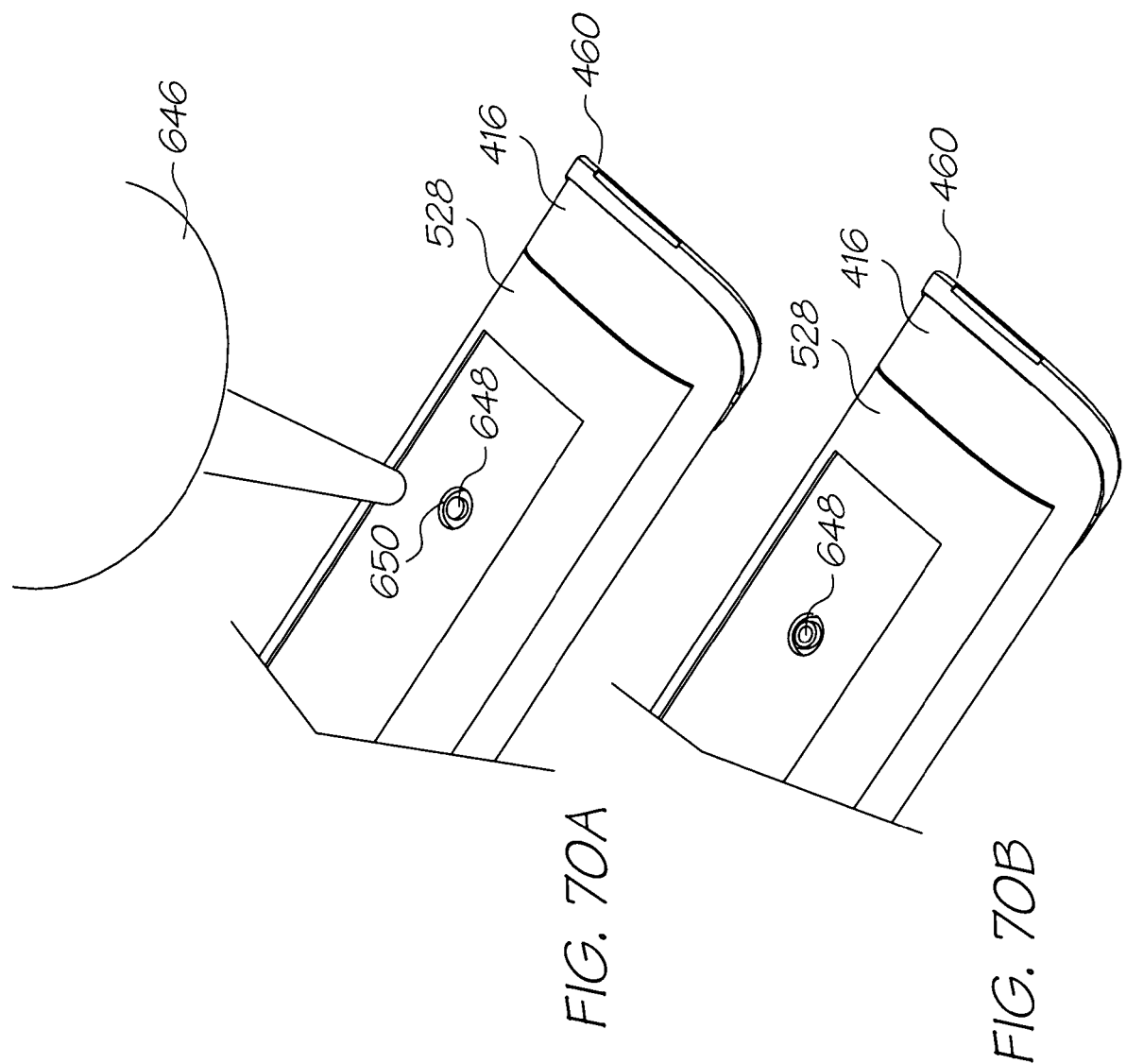
FIGS. 70A and 70B are enlarged partial perspectives showing the cold stake on the chassis molding being swaged and sealed to the base molding.

FIGS. 70A and 70B shows a cold stake tool 646 sealing a cold stake pin 648 to an aperture 650 the base moulding 528. The cold stake 648 is used to help locate the PCB 422 into the chassis moulding 416 and with gentle pressure the walls of the chassis 416 expand enough to allow snap fits to engage with the PCB and hold it securely. The PCB can still be extracted by flexing the chassis walls in the same manner if necessary. The battery can be tacked in place with adhesive tape if required.

The base moulding 528 is hinged onto the chassis moulding 416 and is fully located when the cold stake 648 appears in the aperture 650.

Testing and Staking

At this point the assembly is complete enough to perform an optical and electronic diagnostic test. If any problems occur, the assembly can easily be stripped down again.

Once approved, a cold stake tool 646 is applied to the pin 648 from the chassis molding 416 swaging it over to hold the base molding 528 captive (FIG. 70B). This prevents any user access to internal parts.

Product Label

Figure 71:
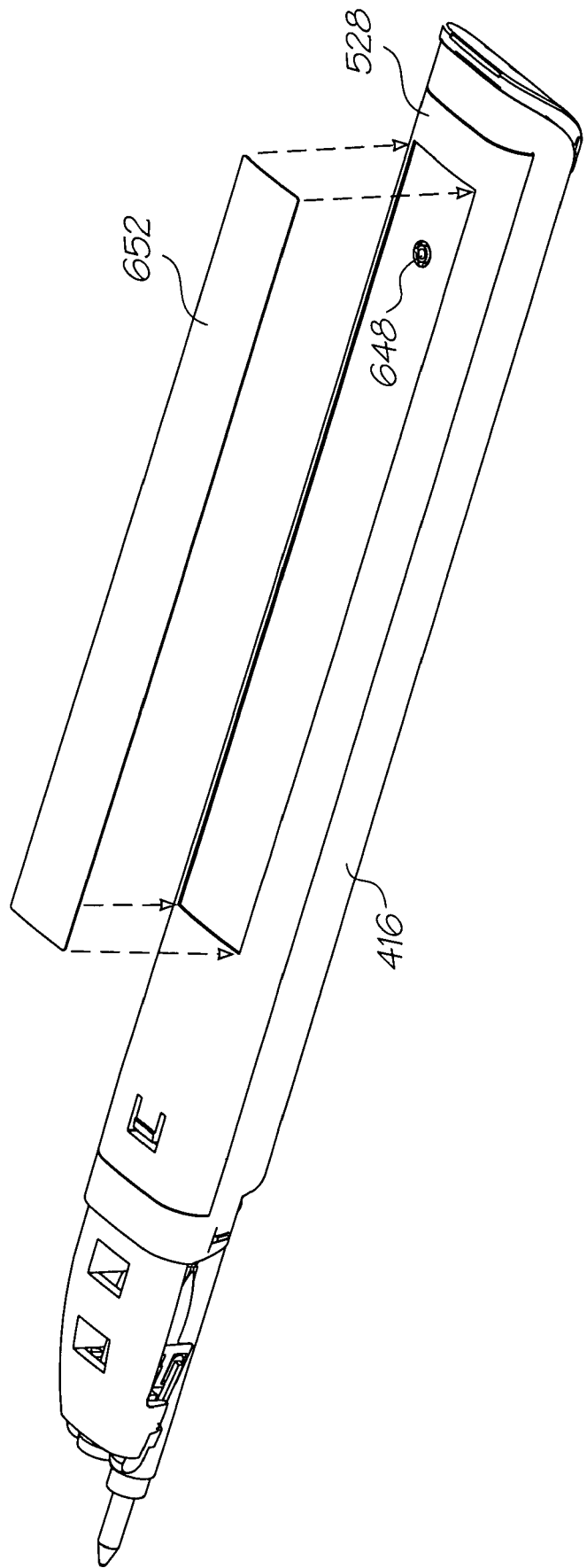
FIG. 71 is a bottom perspective of the product label being fixed to the base molding.

FIG. 71 shows a product label 652 being applied to the base molding 416, which covers the cold stake 648. This label carries all necessary product information for this class of digital mobile product. It is exposed when the customisable tube molding 466 (see FIG. 73) is removed by the user.

NIB Molding Insertion

Figure 72:
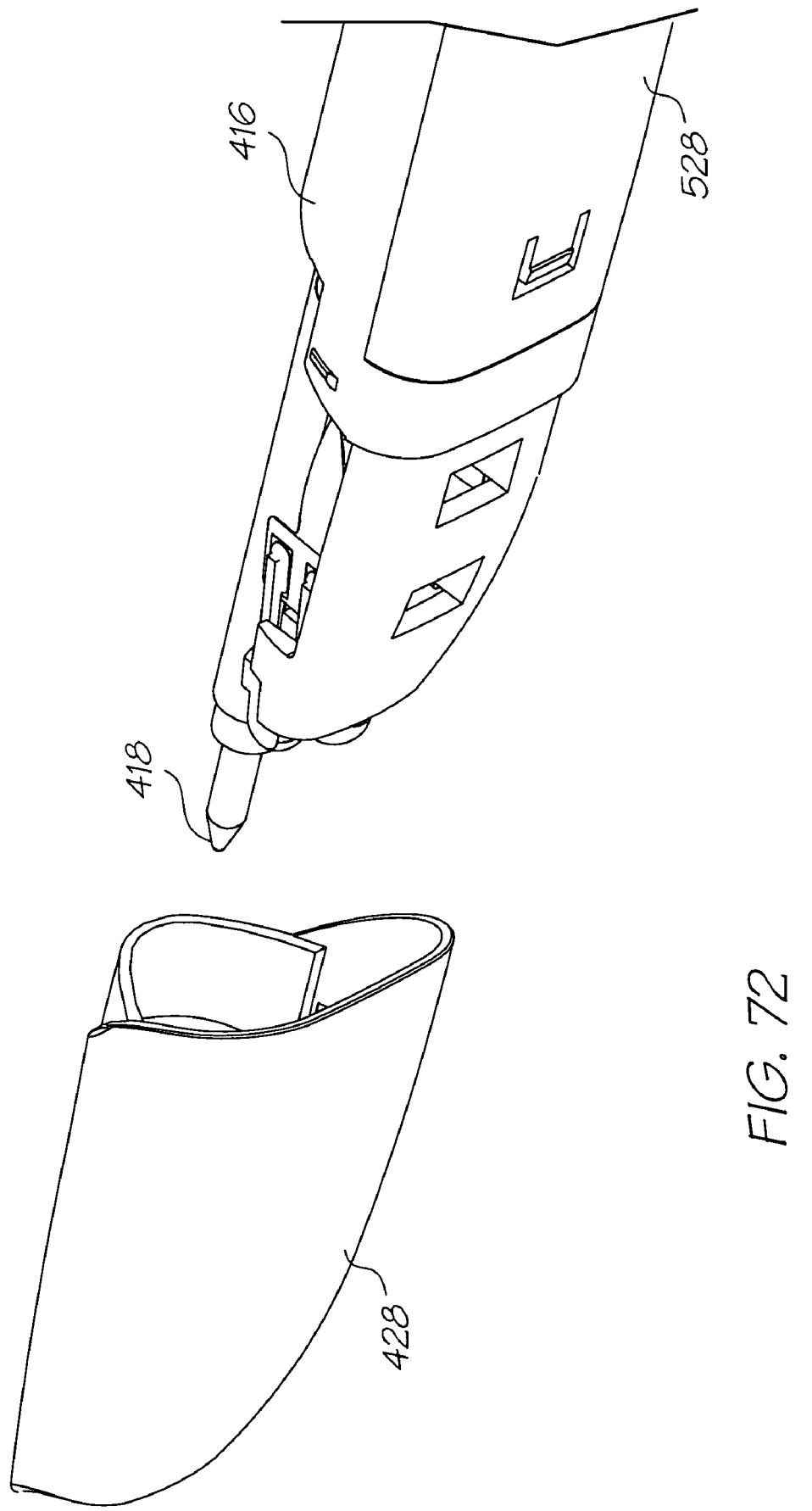
FIG. 72 is an enlarged partial perspective of the nib molding being inserted on the chassis molding.

As shown in FIG. 72, the nib molding 428 is offered up to the pen assembly and is permanently snapped into place against the chassis 416 and the base moldings 528 to form a sealed pen unit.

Tube Molding Assembly

As shown in FIG. 73, the tube molding 466 is slid over the pen assembly. The tube 466 is a transparent molding drafted from the centre to allow for thin walls. An aquagraphic print is applied to the surface with a mask used to retain a window 412, which looks through to the light pipe 448 in the pen during use. A location detail 656 on the chassis molding 416 provides positive feedback when the molding is pushed home. The user can remove the tube molding by holding the nib end and pulling without gaining access to the pen assembly.

Cap Insertion

Figure 74:
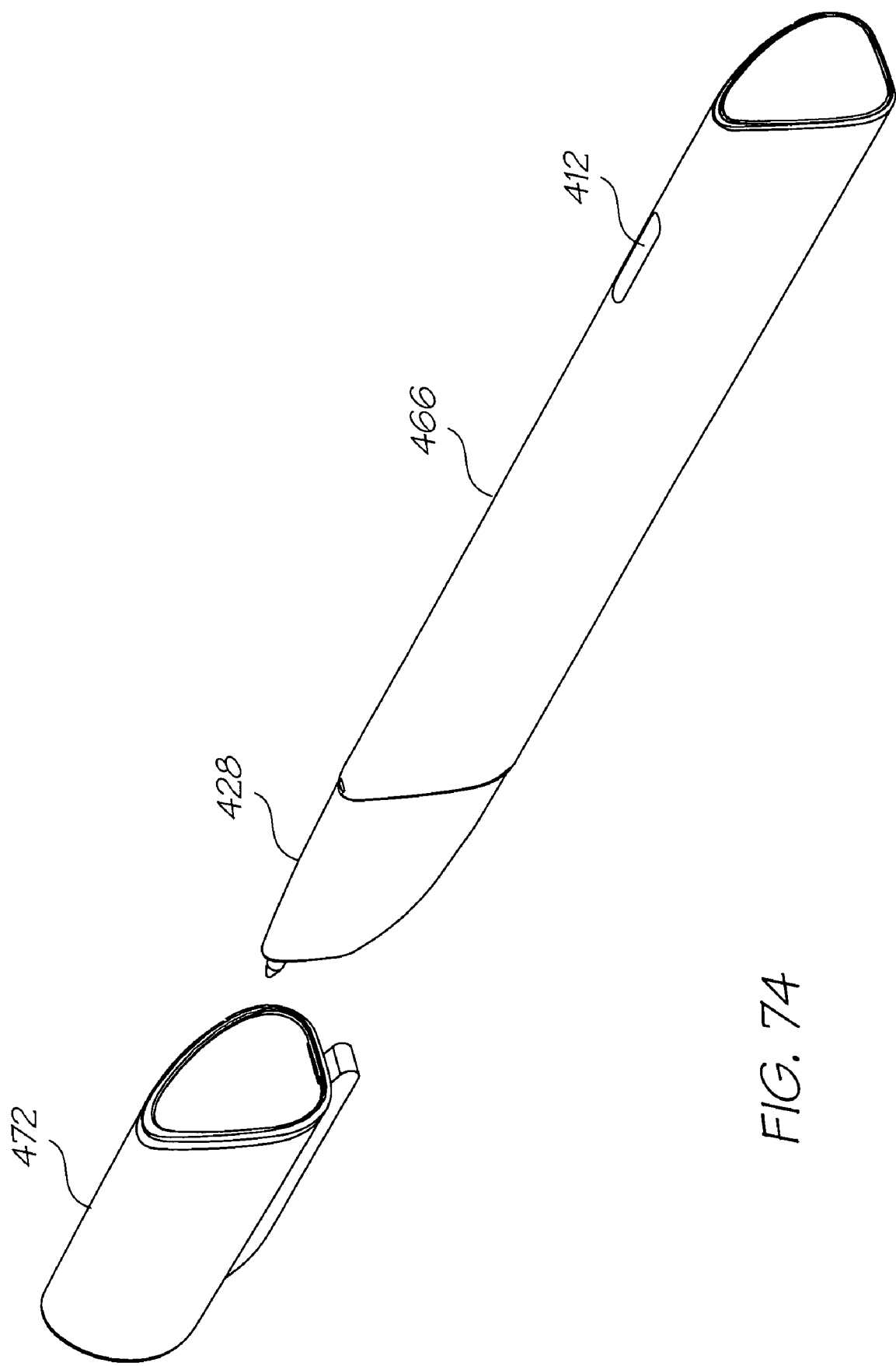
FIG. 74 is a perspective of the cap assembly being placed on the nib molding.

The cap assembly is fitted onto the pen to complete the product as shown in FIG. 74.

Netpage Pen Major Power States

Figure 75:
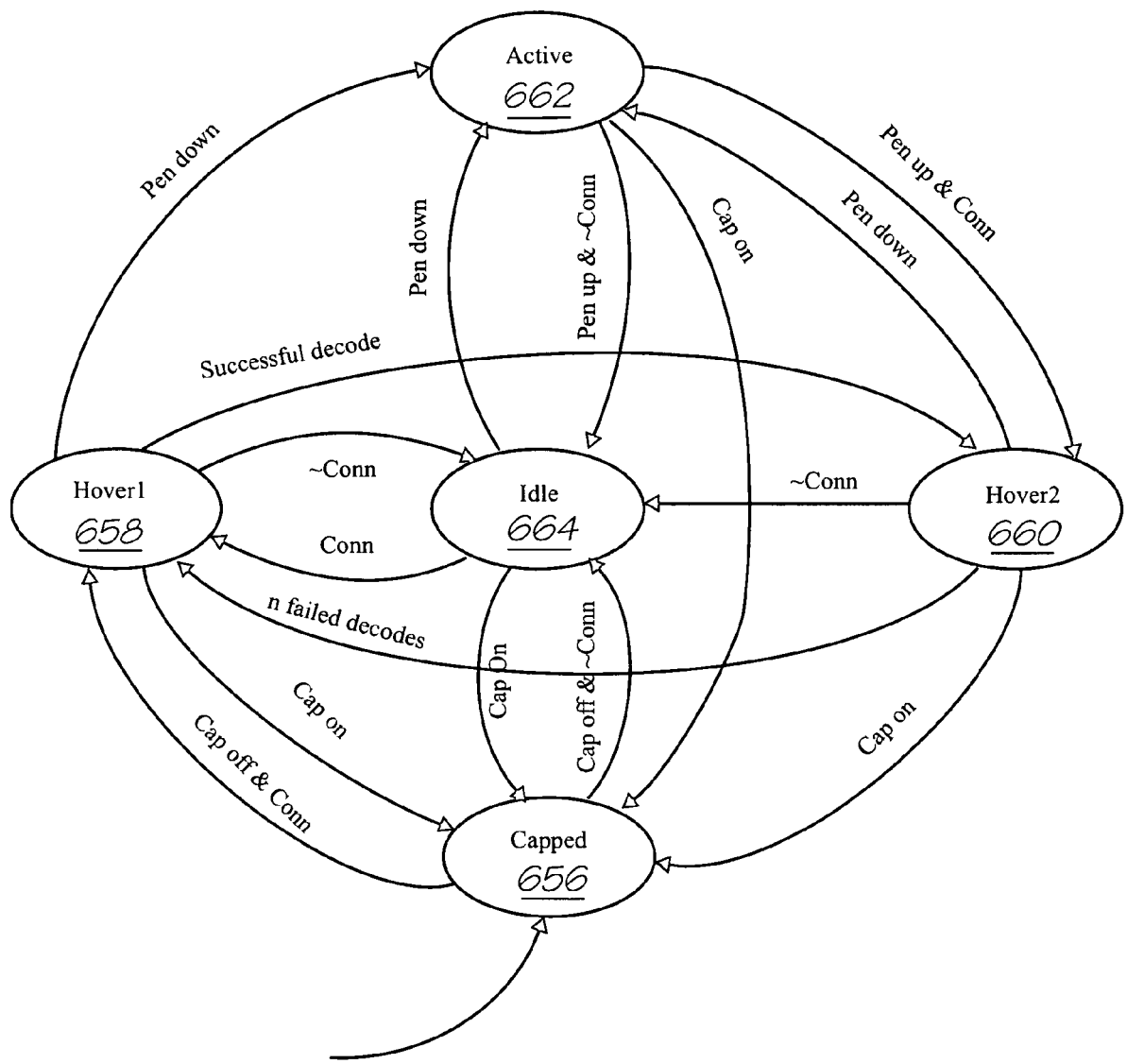
FIG. 75 is a diagram of the major power states of the pen.

FIG. 75 shows the various power states that the pen can adopt, as well as the pen functions during those power states.

Capped

In the Capped state 656, the Pen does not perform any capture cycles.

Corresponding Pen Bluetooth states are Connected, Connecting, Connection Timeout or Not Connected.

Hover1

In the Hover1 state 658, the Pen is performing very low frequency capture cycles (of the order of 1 capture cycle per second). Each capture cycle is tested for a valid decode, which indicates that the user is attempting to use the Pen in hover mode.

Valid Pen Bluetooth states are Connected or Connecting.

Hover2

In the Hover2 state 660, the Pen is performing capture cycles of a lower frequency than in the Active state 662 (of the order 50 capture cycles per second). Each capture cycle is tested for a valid decode, which indicates that the user is continuing to use the Pen in hover mode. After a certain number of failed decodes, the Pen is no longer considered to be in hover mode.

Valid Pen Bluetooth states are Connected or Connecting.

Idle

In the Idle state 664, the Pen is not performing any capture cycles, however, the Pen is active in as much as it is able to start the first of a number of capture cycles within 5 ms of a pen down event.

Valid Pen Bluetooth states are Connected or Connecting.

Active

In the Active state 662, the Pen is performing capture cycles at full rate (100 capture cycles per second).

Valid Pen Bluetooth states are Connected or Connecting.

Netpage Pen Bluetooth States

Figure 76:
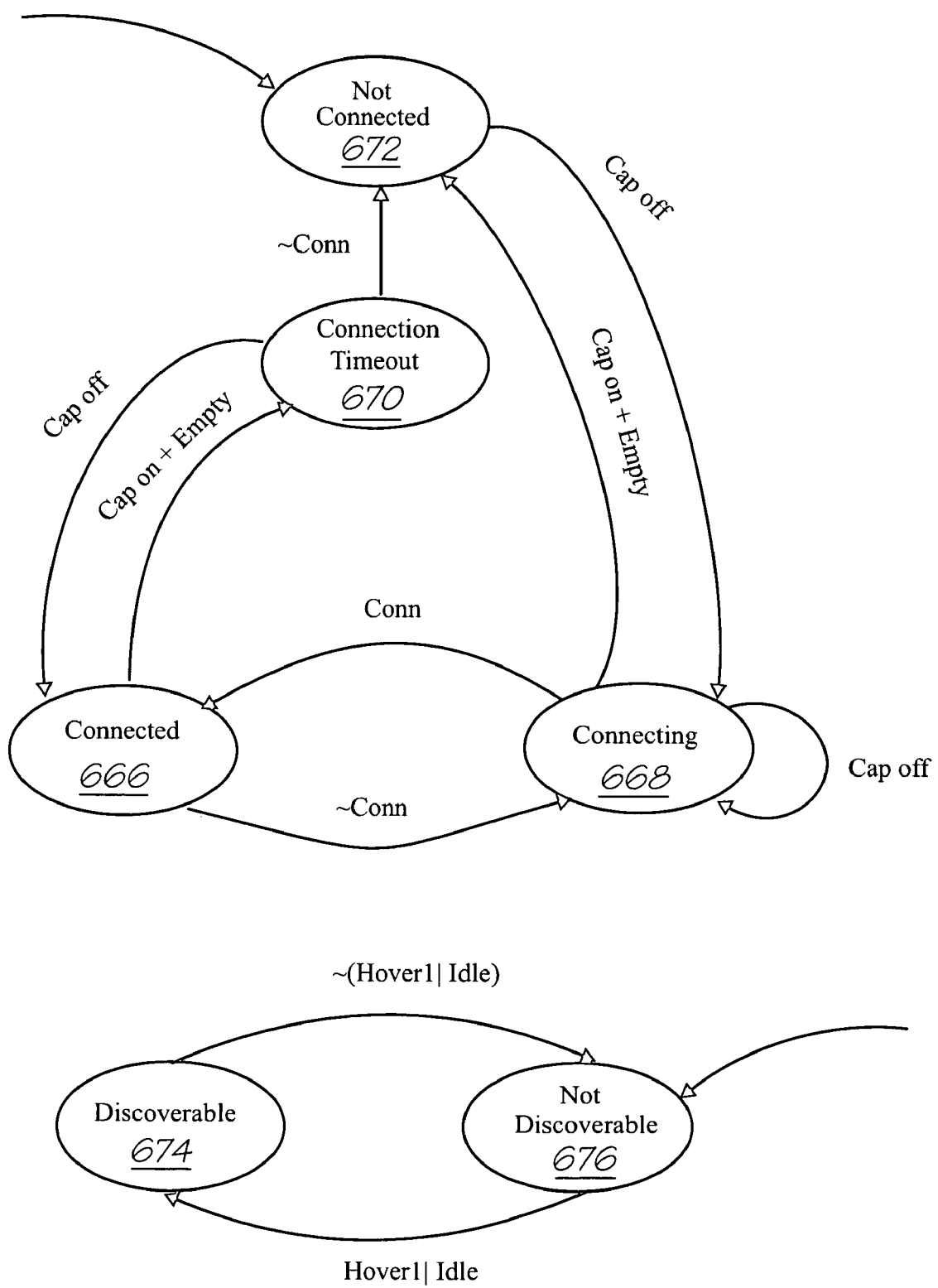
FIG. 76 is a diagram of the operational states of the Bluetooth module.

FIG. 76 shows Netpage Pen power states that are related to the Bluetooth wireless communications subsystem in order to respond to digital ink offload requirements. Additionally, the Pen can accept connections from devices in order to establish a Bluetooth Pairing.

Each of the possible Pen Bluetooth related states are described in the following sections.

Connected

In the Connected state 666 the primary task for the Pen is to offload any digital ink that may be present within Pen storage, or to stream digital ink as it is being captured. Whilst in the Connected state it should also be possible for other devices to discover and connect to the pen for the purposes of Bluetooth Pairing.

In order to reduce power consumption whilst connected, it is desirable to take advantage of the relatively low bandwidth requirements of digital ink transmission and periodically enter a Bluetooth low power mode. A useful low power mode will typically be Sniff mode, wherein the periodic Bluetooth activity required of the Pen is reduced based on the Sniff interval, with the Sniff interval being determined by the current bandwidth requirements of digital ink transmission.

Connecting

Whilst in the Connecting state 668, the Pen attempts to establish a connection to one of a number of known NAPs (Network Access Points) either to offload digital ink stored within Pen memory, or in anticipation of a sequence of capture cycles.

Upon entry into the Connecting state 668, the Pen attempts an Inquiry/Page of each device in round-robin fashion with a relatively high frequency. If the connection is unsuccessful, the frequency of Inquiry/Page is reduced successively in a number of steps in order to reduce overall power consumption.

An Inquiry can last for 10.24 s and is repeated at a random interval. Initially the Inquiry may be repeated on average at 5 s intervals for the first 3 attempts, followed by 30 s for the next 5 attempts and then 5 minute intervals for the next 10 attempts and 10 minute invervals for subsequent attempts.

Connection Timeout

In the Connection Timeout state 670, the Pen maintains the current Bluetooth connection by entering a Bluetooth low power Sniff state with relatively long sniff interval (e.g. 2.56 seconds) for a period of at least 2 minutes before disconnecting. Re-establishment of the connection is not attempted, should the connection be dropped before 2 minutes have elapsed.

Not Connected

In the Not Connected state 672, the Pen does not hold any digital ink in its internal memory, and is capped. There is no Bluetooth activity, and no Bluetooth connection exists.

Discoverable and Not Discoverable

The Pen is only discoverable 674 during the major states of Hover1 658 and Idle 664. The Pen periodically enters the inquiry scan and page scan states whilst in Hover1 658 or Idle 664, in order to respond to connection requests from other devices.

Cap Detection Circuit

Referring once again to FIG. 26, a cap detection circuit diagram is shown. As discussed above, the presence or absence of the cap assembly 472 on the nib molding 428 can directly determine the Pen power state and the Bluetooth state. The cap assembly 472 serves the dual purposes of protecting the nib 418 and the imaging optics 426 when the pen 400 is not in use, and signalling, via its removal or replacement, the pen to leave or enter a power-preserving state.

As described in the 'Pod Assembly' section above, the pen 400 has coaxial conductive tubes 498 that provide a set of external contacts—power contacts 678 and data contacts 680. These mate with contacts 516 in the pod 450 to provide the pen with charging power and a USB connection. When placed over the nib molding 428, the conductive elastomeric molding 522 short-circuits the pen's power contacts 678 to signal the presence of the cap.

The pen has three capping states:
cap on
cap off, not in pod
cap off, in pod

In the cap on state, the CAP_ON signal 682 is high. The pen will be powered off, subject to other pending activities such as digital ink offload, as described above in the NetPage Pen Bluetooth States section.

In the cap off, not in pod state, the CAP_ON signal 682 is low. The pen will be powered on.

In the cap off, in pod state, the CAP_ON signal 682 is low. The pen will be powered on.

The CAP_ON signal 682 triggers transitions to and from the Capped state 656, as described in the NetPage Pen Power States section above, via the power management unit 580 and the Amtel ARM7 microprocessor 574. (see Pen Design section above).

Figure 26:
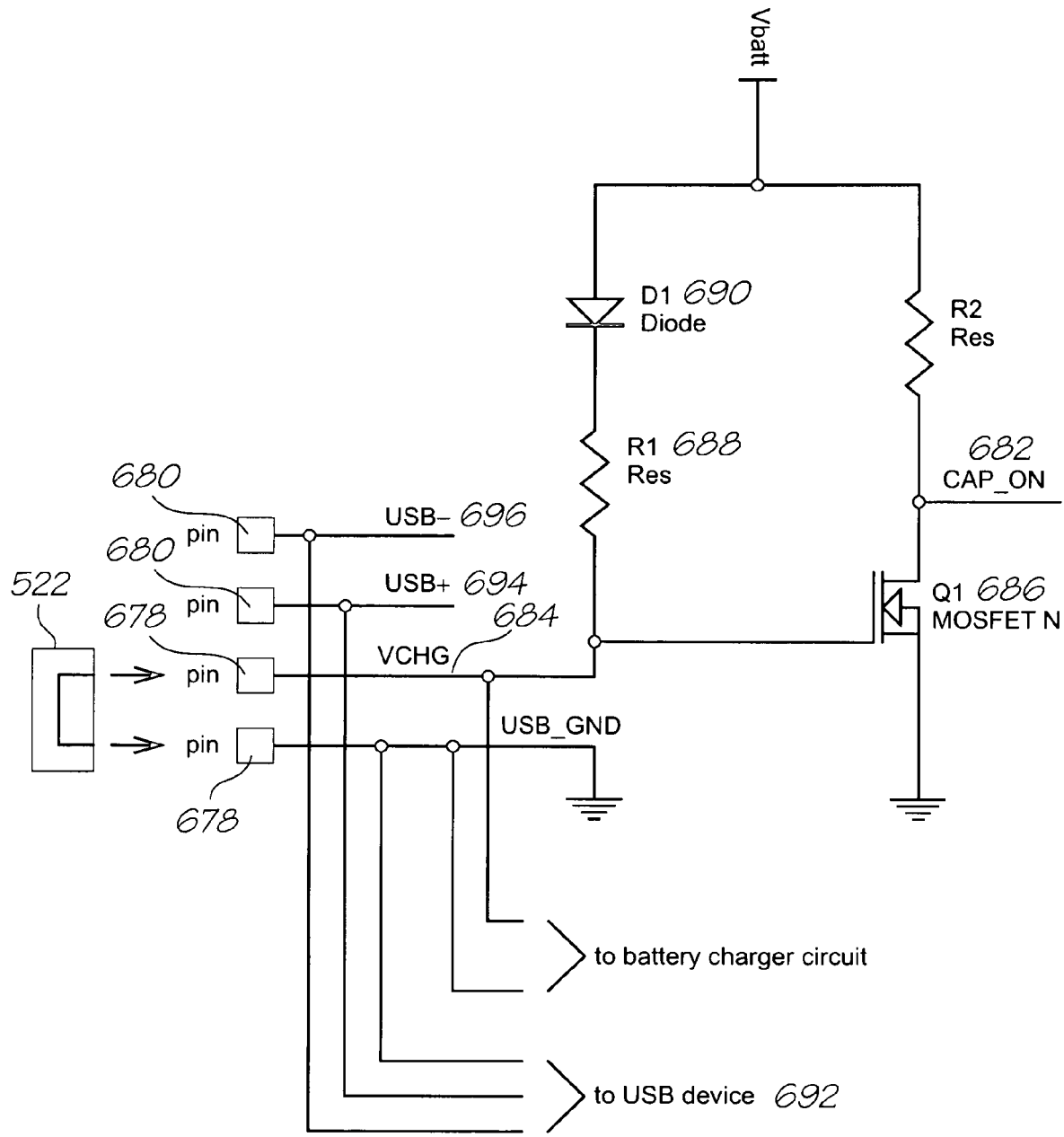
FIG. 26 is a circuit diagram of the pen USB and power CCT's.

The battery charger can use the VCHG signal 684 to charge the battery. The VCHG signal 684 can be connected to the USB VBUS voltage (nominally 5V) to allow the battery to be charged at up to 500 mA (based on the USB specification). The VCHG signal can also be connected to a higher voltage generated by boosting the USB VBUS voltage (maximum charging current would be lower than 500 mA). Alternatively, the VCHG signal can be connected to a different voltage, e.g. from a DC plug pack 632 (see Connection Options section) connected to the pod 450. In this case, the pen is a self-powered USB device from the point of view of the USB host 630. When the cap assembly 472 is removed, the CAP_ON signal 682 is pulled low via transistor Q1 686. The switching time of Q1, and hence the latency of cap removal detection, is a function of the stray capacitance of Q1 and the value of resistor R1 688. A value of 1 Mohm results in a latency of about 0.5 ms. The cap removal detection latency must be balanced against the discharge rate of the battery in the capped state. A value of 1 Mohm yields a trivial discharge rate of 3 $\mu$A. Diode D1 690 stops the battery being charged from the VCHG voltage 684 through R1 688. The external USB host 630 (see FIG. 61) is connected to the USB device 692 in the pen 400 via the USB 694 and USB 696 signals. Although the circuit in FIG. 26 is shown with reference to a four-wire USB interface, the cap detection function of the circuit only relates to the two-wire power interface, and the pen can have a two-pin external power interface rather than a four-pin external USB interface depending on product configuration.

The above description is purely illustrative and the skilled worker in this field will readily recognize many variations and modifications that do not depart from the spirit and scope of the broad inventive concept.

We claim:

1. A force sensor assembly comprising:
a housing;
a load bearing member movably mounted in the housing for receiving an input force to be sensed, the load bearing member being biased against the direction of the input force;
a light source;
a photo-detector for sensing levels of illumination from the light source; and,
circuitry for converting a range of illumination levels sensed by the photo-detector into a range of output signals; wherein,
the illumination level sensed by the photo-detector varies with movement of the load bearing member within the housing such that the output signal from the circuitry is indicative of the input force.

2. A force sensor assembly according to claim 1 wherein the light source is fixed to the housing for illuminating at least part of the load bearing member.

3. A force sensor assembly according to claim 2 wherein the photo-detector is mounted to the housing such that the load bearing member moves between the light source and the photo-detector.

4. A force sensor assembly according to claim 1 wherein the load bearing member has an aperture through which light from the light source can illuminate the photo-detector, the aperture being positioned between the light source and the photo-detector at part of the load bearing member's travel within the housing.

5. A force sensor assembly according to claim 4 wherein the load bearing member is biased with a spring, the spring having a spring constant equal to the maximum force the sensor is to sense, divided by the length in the direction of travel within the housing of the aperture.

6. A force sensor assembly according to claim 5 wherein the aperture is aligned with the light source and the photo-detector when the input force is the maximum force, and the load bearing member fully obscures the light source from the photo-detector when the input force is zero.

7. A force sensor assembly according to claim 1 wherein the light source is a LED.

8. A force sensor assembly according to claim 1 wherein the load bearing member has a maximum travel of 100 microns within the housing.

9. A force sensor assembly according to claim 1 wherein the force sensor is configured to sense a maximum force of 5 Newtons.

10. An electronic stylus comprising:
an elongate body;
a nib extending from one end of the elongate body;
a load bearing member movably mounted to the elongate body for receiving an input force caused by contact on the nib, the load bearing member being biased against the direction of the input force;
a light source;
a photo-detector for sensing levels of illumination from the light source; and,
circuitry for converting a range of illumination levels sensed by the photo-detector into a range of output signals; wherein,
the illumination level sensed by the photo-detector varies with movement of the load bearing member within the elongate body such that the output signal from the circuitry is indicative of the input force.

11. An electronic stylus according to claim 10 wherein the light source is fixed to the elongate body for illuminating at least part of the load bearing member.

12. An electronic stylus according to claim 11 wherein the photo-detector is mounted to the elongate body such that the load bearing member moves between the light source and the photo-detector.

13. An electronic stylus according to claim 1 wherein the load bearing member has an aperture through which light from the light source can illuminate the photo-detector, the aperture being positioned between the light source and the photo-detector at part of the load bearing member's travel within the elongate body.

14. An electronic stylus according to claim 13 wherein the load bearing member is biased with a spring, the spring having a spring constant equal to the maximum force the sensor is to sense, divided by the length in the direction of travel within the elongate body of the aperture.

15. An electronic stylus according to claim 14 wherein the aperture is aligned with the light source and the photo-detector when the input force is the maximum force, and the load bearing member fully obscures the light source from the photo-detector when the input force is zero.

16. An electronic stylus according to claim 10 wherein the load bearing member has a maximum travel of 100 microns within the elongate body.

17. An electronic stylus according to claim 10 wherein the nib of the electronic stylus is a ball point writing nib with a tubular ink cartridge extending from the nib toward the load bearing member such that the coupling is a detachable boot that fits over the end of the cartridge opposite the nib.

18. An electronic stylus according to claim 10 wherein the force sensor is configured to sense a maximum force of 5 Newtons.

19. An electronic stylus according to claim 10 wherein the output signal from the circuitry support a hand writing recognition facility.

20. An electronic stylus according to claim 10 wherein the light source is a LED.

* * * * *